US008175821B2

(12) United States Patent
Nagakubo et al.

(10) Patent No.: US 8,175,821 B2
(45) Date of Patent: May 8, 2012

(54) METHOD FOR MEASURING PHYSICAL QUANTITY DISTRIBUTION AND MEASUREMENT SYSTEM USING SENSOR FOR PHYSICAL QUANTITY DISTRIBUTION

(75) Inventors: Akihiko Nagakubo, Tsukuba (JP); Yasuo Kuniyoshi, Bunkyo-ku (JP); Hassan Alirezaei Abyaneh, Bunkyo-ku (JP)

(73) Assignees: The University of Tokyo, Tokyo (JP); National Institute of Advanced Industrial Science and Technology, Tokyo (JP)

( * ) Notice: Subject to any disclaimer, the term of this patent is extended or adjusted under 35 U.S.C. 154(b) by 509 days.

(21) Appl. No.: 12/440,923
(22) PCT Filed: Sep. 7, 2007
(86) PCT No.: PCT/JP2007/067532
§ 371 (c)(1),
(2), (4) Date: Mar. 11, 2009
(87) PCT Pub. No.: WO2008/032661
PCT Pub. Date: Mar. 20, 2008

(65) Prior Publication Data
US 2010/0049450 A1    Feb. 25, 2010

(30) Foreign Application Priority Data

Sep. 12, 2011  (JP) .................................. 2006-247420

(51) Int. Cl.
*G01L 1/00*   (2006.01)
*G01L 1/14*   (2006.01)
*G01L 1/18*   (2006.01)
*G01L 5/00*   (2006.01)
*G06F 19/00*  (2011.01)

(52) U.S. Cl. ................ 702/42; 73/760; 73/763; 73/774; 702/138; 702/189; 708/200

(58) Field of Classification Search ............... 73/379.01, 73/379.08, 432.1, 760, 763, 767, 774; 324/600, 324/629; 702/1, 33, 41, 42, 43, 57, 64, 65, 702/127, 138, 139, 187, 189; 708/100, 105, 708/131, 160, 200, 800, 801
See application file for complete search history.

(56) References Cited

U.S. PATENT DOCUMENTS 3,036,458 A * 5/1962 Vali ................................. 73/774
(Continued)

FOREIGN PATENT DOCUMENTS

AU           4877099 A        3/2000
(Continued)

*Primary Examiner* — Edward Cosimano
(74) *Attorney, Agent, or Firm* — Law Office of Katsuhiro Arai

(57) ABSTRACT

It is an object of the present invention to provide a measurement system that measures physical quantity distribution over the entire region using a sensor for physical quantity distribution (PQD sensor) that realizes high stretchability, flexibility, etc., in at least a partial region, in order to measure the physical quantity distribution that is regionally distributed in a two-dimensional or three-dimensional manner, as well as a method for measuring physical quantity distribution. Such measurement system comprises: a body for converting physical quantity distribution (PQDc body) structured in such a way that the condition of injection current changes according to the action of the target physical quantity; multiple electrodes arranged in such a way that they can supply injection current to the PQDc body and measure data of the electric potential distribution generated by the PQDc body as a result; a PQD sensor comprising the PQDc body, electrodes, and an electric signal processing unit that processes electrode signals; and a processing part that processes data with the PQD sensor; wherein the measurement method comprises a data acquisition procedure to cause electrodes to generate injection current and measure the electric potential distribution that generates in the PQDc body, which is used as measured data, and an estimation procedure to read the measured data and use the read data to obtain the distribution of the target physical quantity that acts upon the PQDc body.

13 Claims, 33 Drawing Sheets

U.S. PATENT DOCUMENTS

| | | | | |
|---|---|---|---|---|
| 3,137,834 | A * | 6/1964 | Pfann | 338/6 |
| 3,361,899 | A * | 1/1968 | Massell et al. | 708/800 |
| 3,433,060 | A * | 3/1969 | Rastogi et al. | 73/774 |
| 3,435,669 | A * | 4/1969 | Barzakov et al. | 702/42 |
| 3,453,873 | A * | 7/1969 | Lambert | 73/767 |
| 4,687,885 | A | 8/1987 | Talmage et al. | |
| 5,915,285 | A * | 6/1999 | Sommer | 73/865.7 |
| 6,333,736 | B1 * | 12/2001 | Sandbach | 345/178 |
| 6,369,804 | B1 | 4/2002 | Sandbach | |
| 6,437,258 | B1 * | 8/2002 | Sandbach | 178/18.05 |
| 6,492,980 | B2 * | 12/2002 | Sandbach | 345/173 |
| 6,501,465 | B2 * | 12/2002 | Sandbach | 345/173 |
| 7,460,964 | B2 | 12/2008 | Mizota et al. | |
| 2001/0043200 | A1 * | 11/2001 | Sandbach | 345/173 |
| 2002/0126100 | A1 * | 9/2002 | Sandbach | 345/173 |
| 2002/0126101 | A1 * | 9/2002 | Sandbach | 345/173 |
| 2003/0037966 | A1 * | 2/2003 | Sandbach | 178/18.05 |
| 2004/0125079 | A1 | 7/2004 | Kaneko et al. | |
| 2004/0252729 | A1 | 12/2004 | Shinoda et al. | |
| 2008/0271933 | A1 * | 11/2008 | Morimoto | 178/18.05 |

FOREIGN PATENT DOCUMENTS

| | | |
|---|---|---|
| CA | 1272393 A1 | 8/1990 |
| DE | 3685352 A1 | 6/1992 |
| DE | 10346905 A1 | 5/2004 |
| EP | 194861 A1 | 9/1986 |
| EP | 989509 A1 | 3/2000 |
| EP | 2060893 A1 * | 5/2009 |
| GB | 2341929 A1 | 3/2000 |
| JP | S60-37401 B2 | 8/1985 |
| JP | 61-208533 A1 | 9/1986 |
| JP | S63-174375 A1 | 7/1988 |
| JP | H07-1795 B2 | 1/1995 |
| JP | 2000-112640 A1 | 4/2000 |
| JP | 2003-028731 A | 1/2003 |
| JP | 2003-188882 A | 7/2003 |
| JP | 2004-245822 A1 | 9/2004 |
| JP | 2005-49331 A1 | 2/2005 |
| JP | 2005-114715 A | 4/2005 |

* cited by examiner

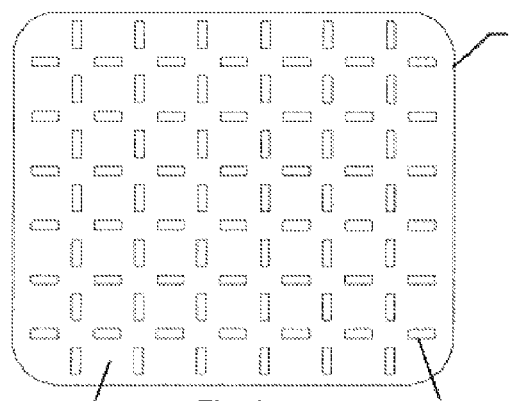
3A: Base medium    Fig. 2(a)    3B: Sensing element
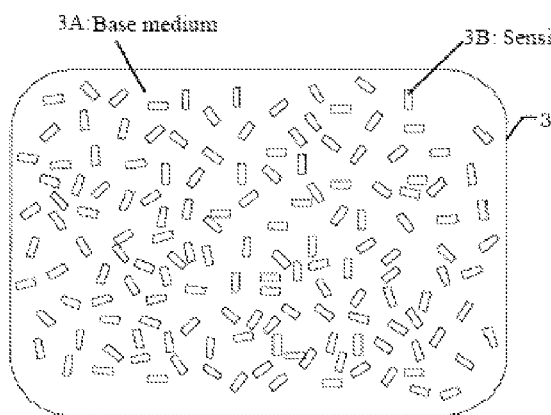
Fig. 2(b)
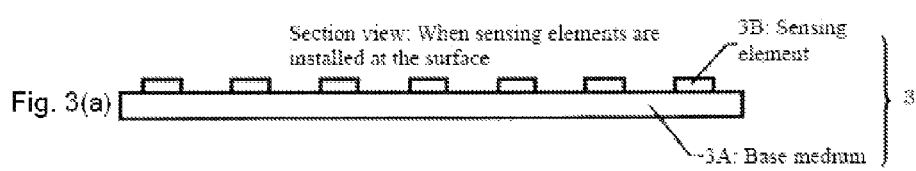
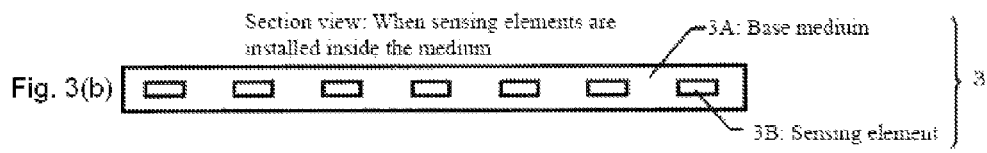

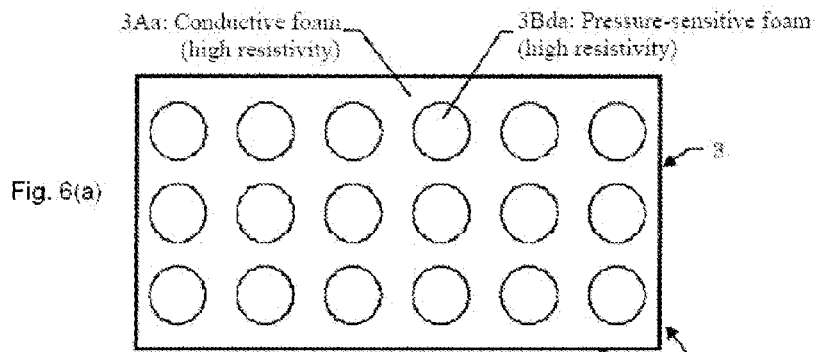
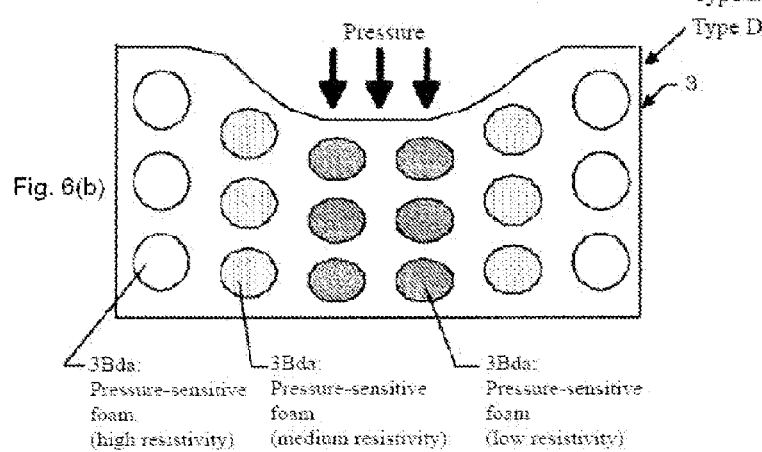
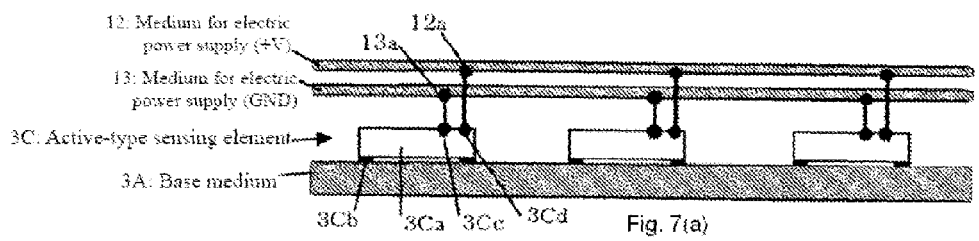
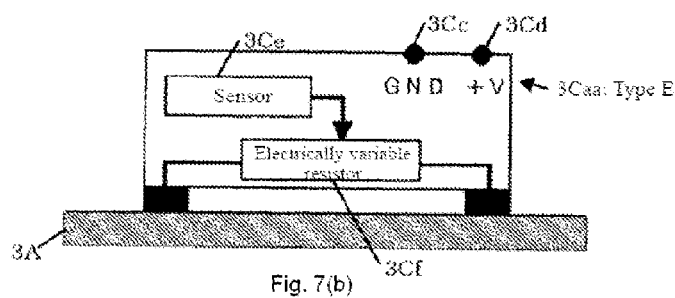

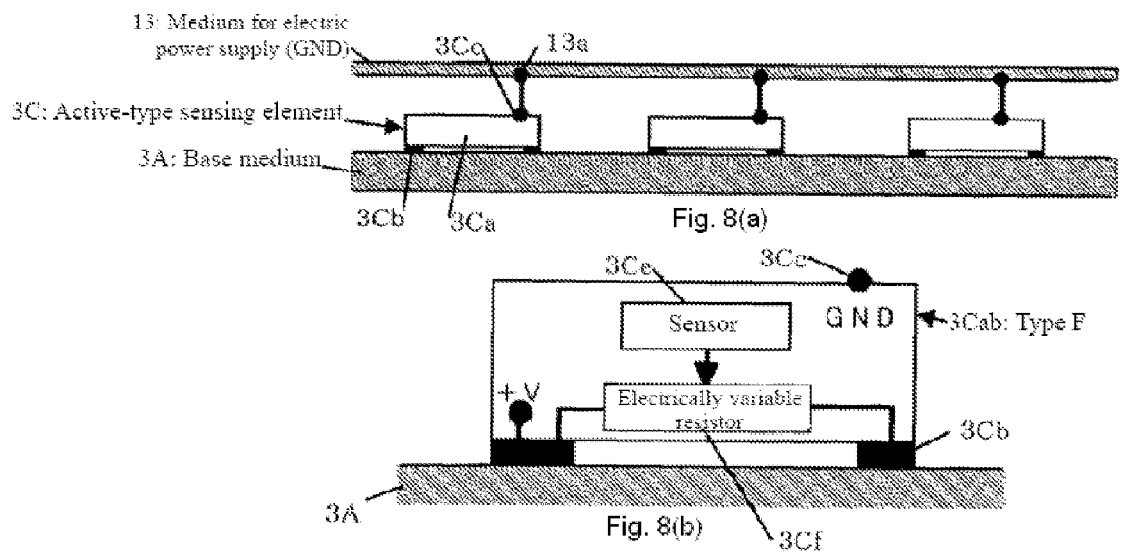
Fig. 8(a)
Fig. 8(b)
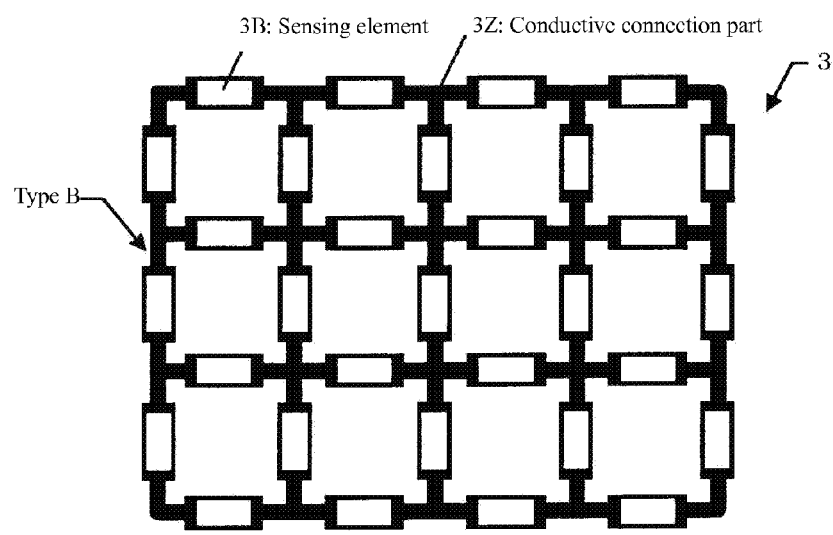
Fig. 9

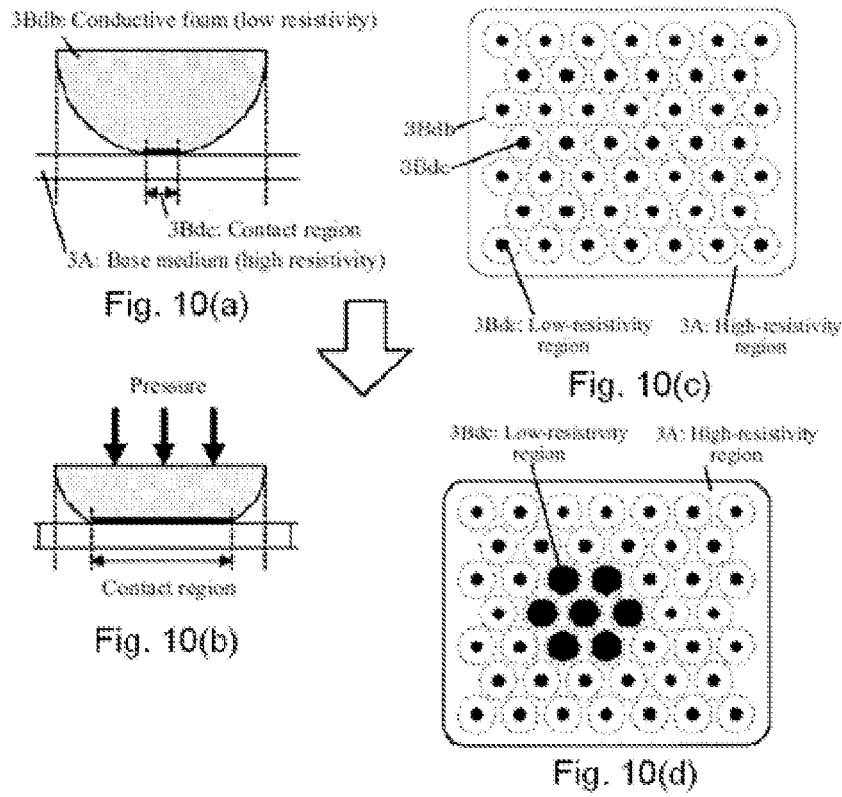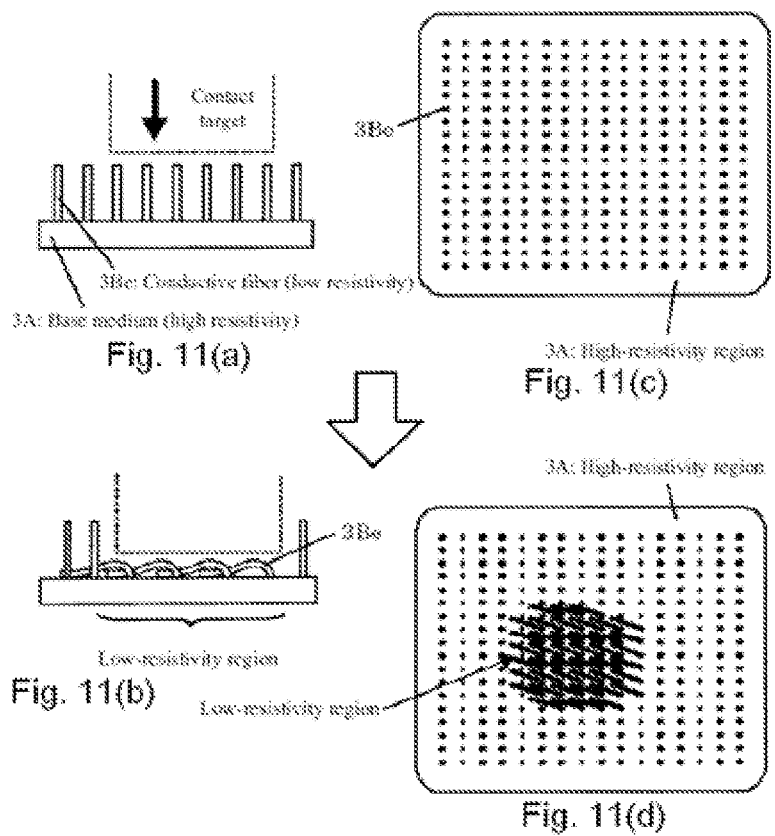

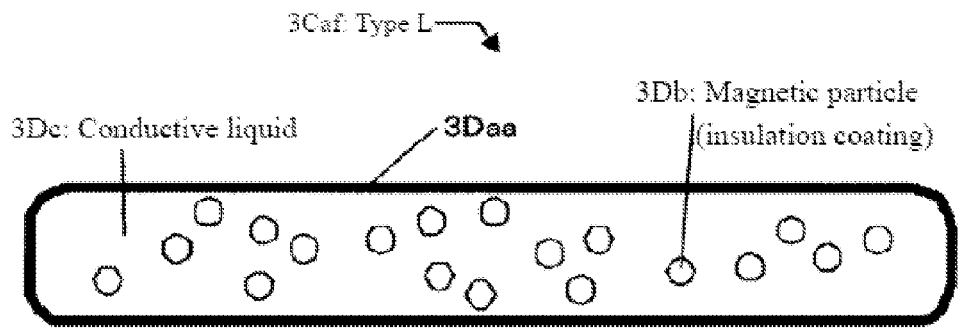
Fig. 15(a)
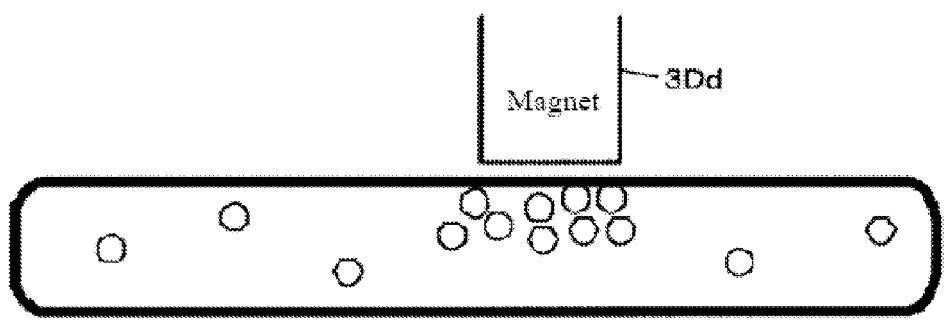
Fig. 15(b)
Fig. 16
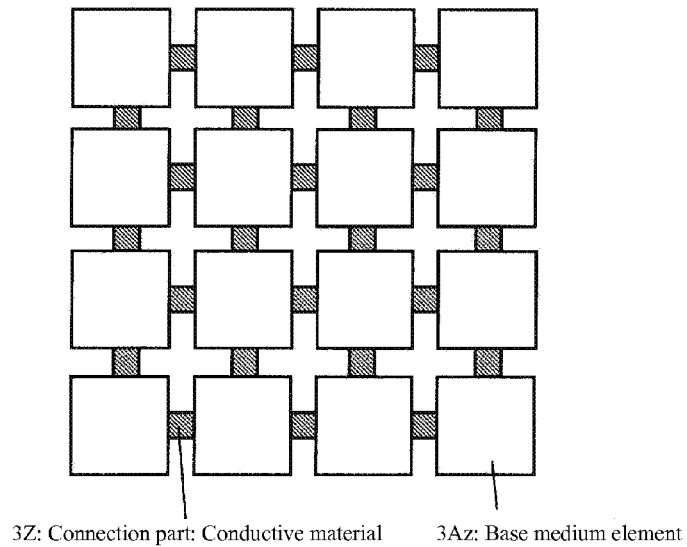

3Z: Connection part: Conductive material　　3Az: Base medium element

3Az: Base medium element

3Az: Base medium element

Sliding contact
3Az: Base medium element
3Y: Stretchable insulation sheet
Fixed by bonding 3X: Conductive medium    3Az: Base medium element Fig. 21
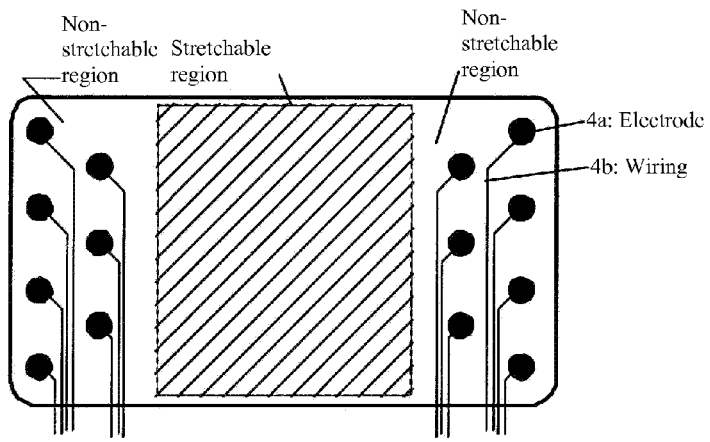
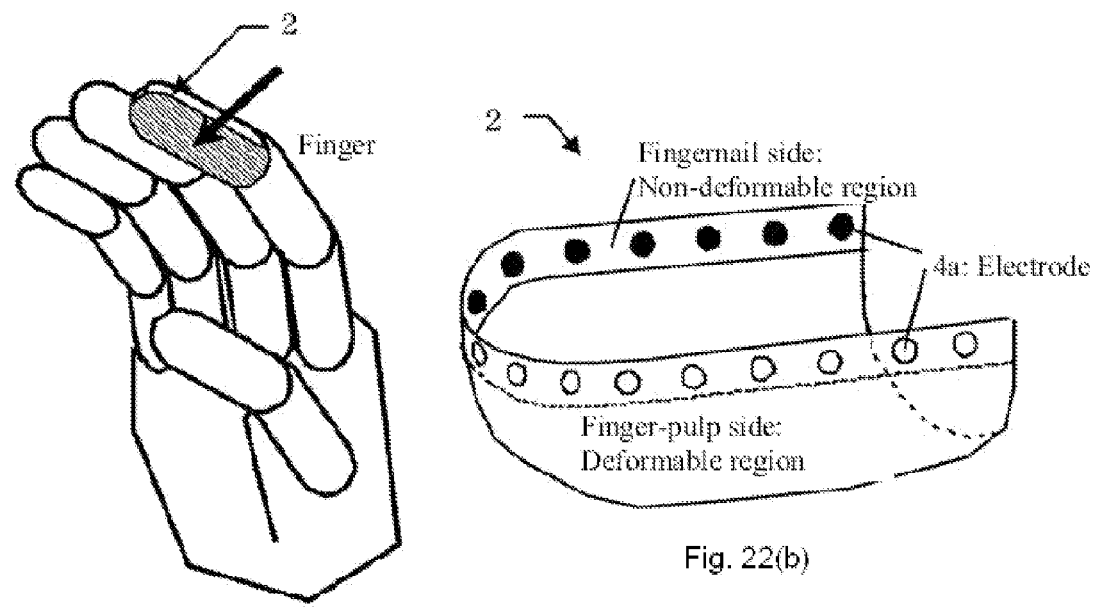
Fig. 22(a)
Fig. 22(b)

Fig. 23
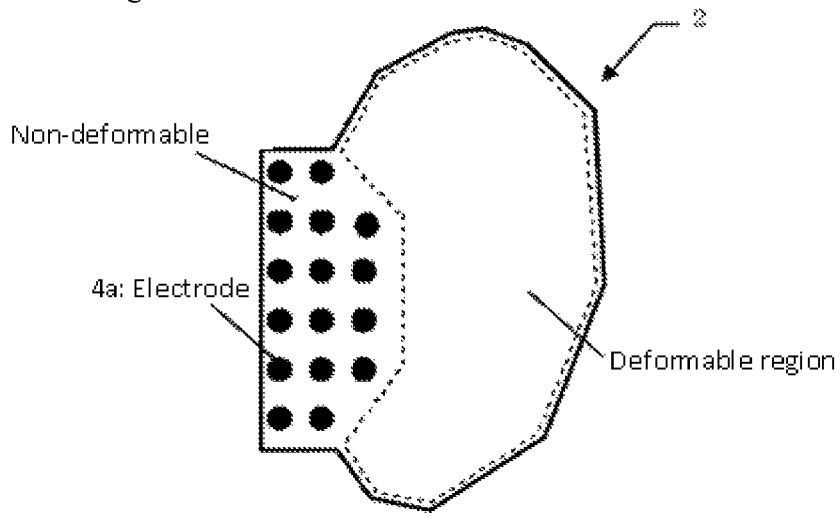
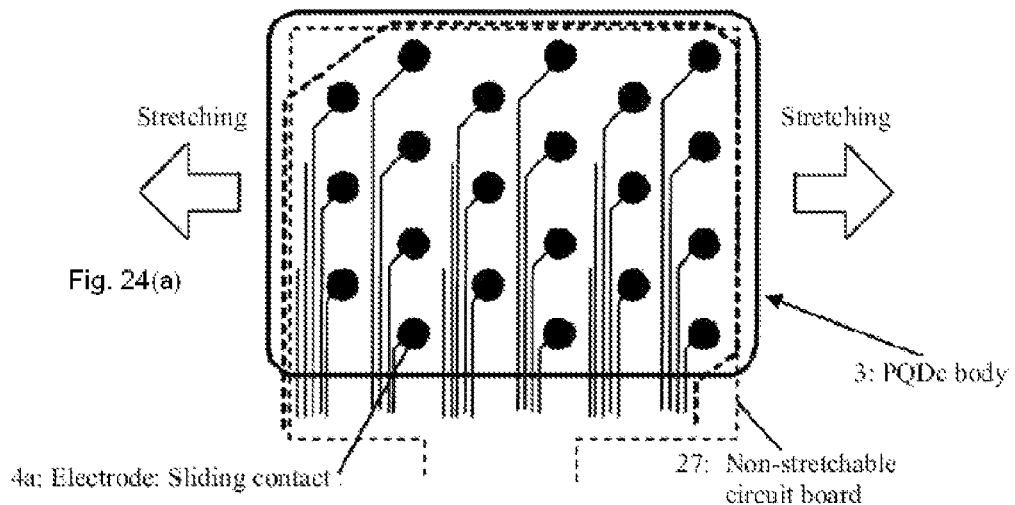
Fig. 24(a)
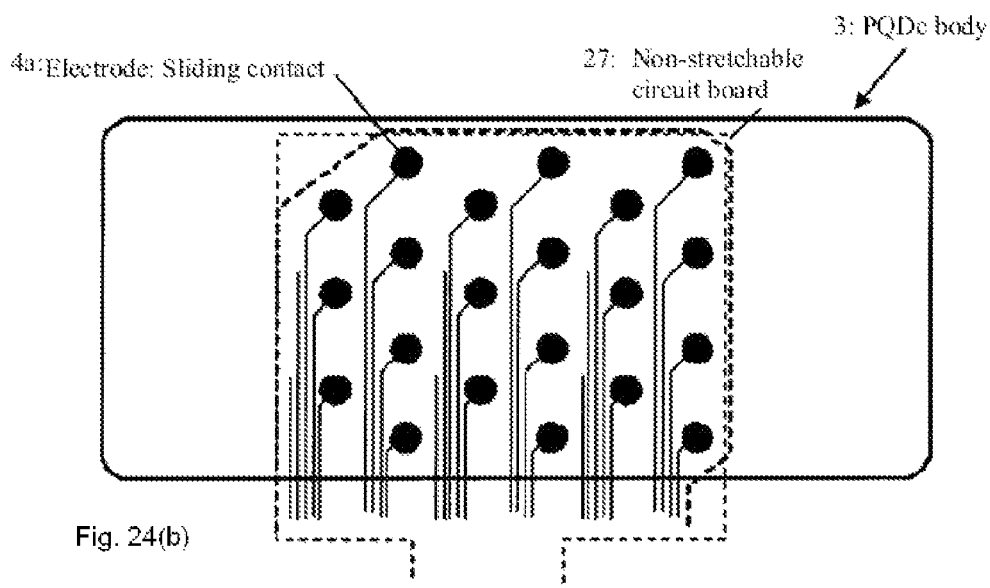
Fig. 24(b)

Fig. 27
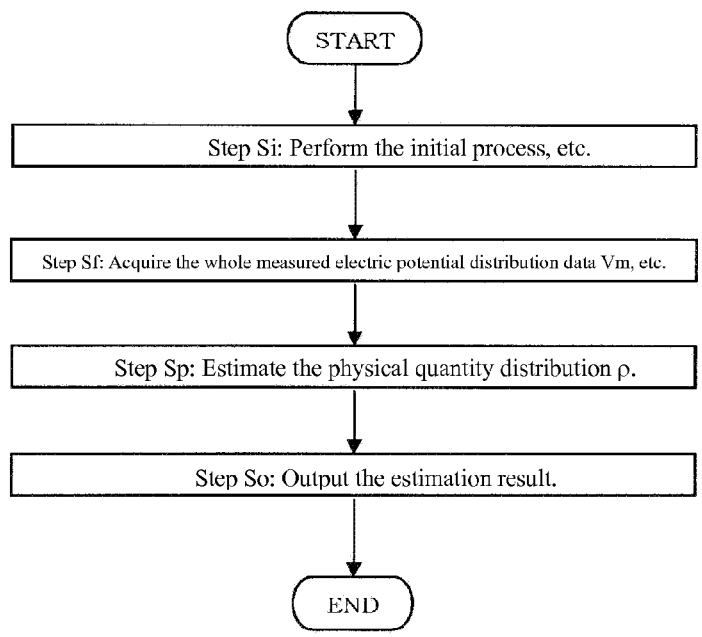
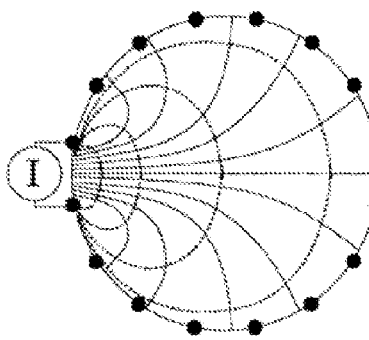
Fig. 28(a)
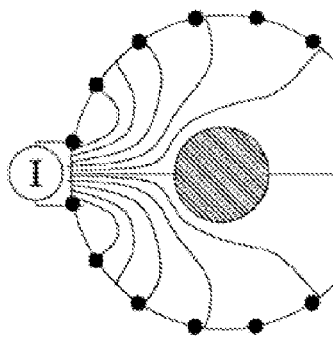
Fig. 28(b)
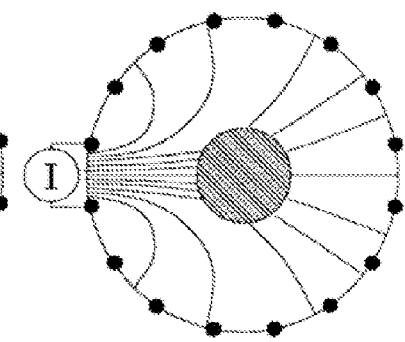
Fig. 28(c)
◀----- Current ——— Equipotential line Fig. 29
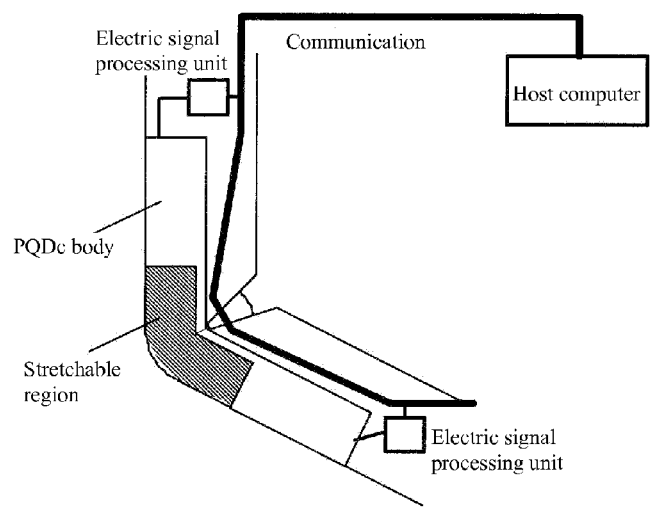
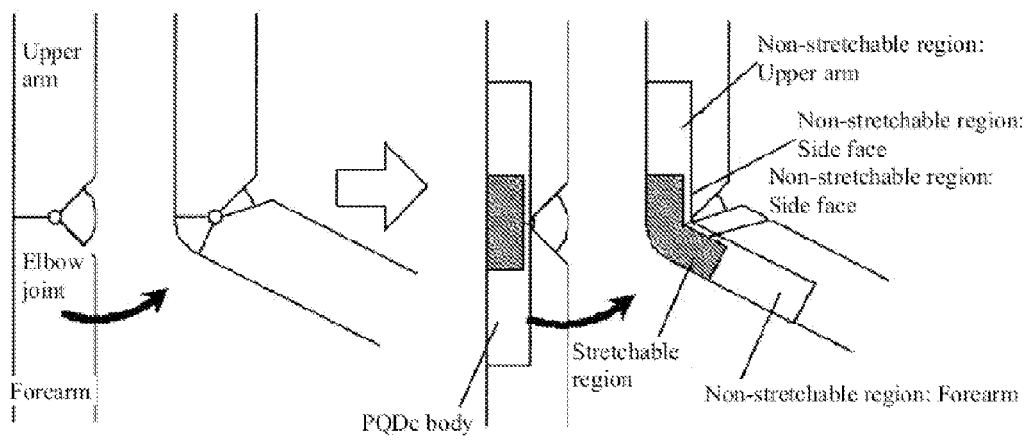
Fig. 30(a)　　　　　　　　　Fig. 30(b)

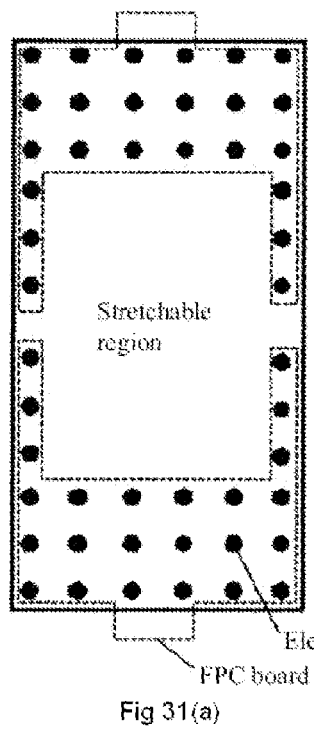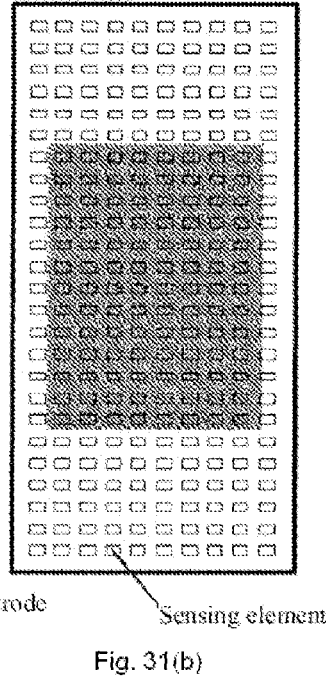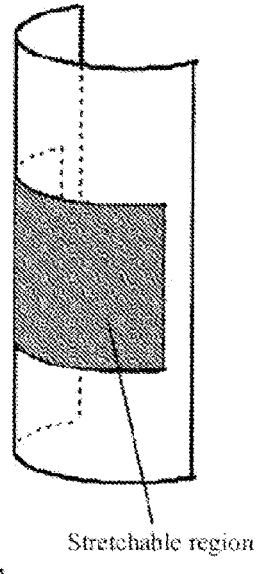
Fig 31(a)
Fig. 31(b)
Fig. 31(c)
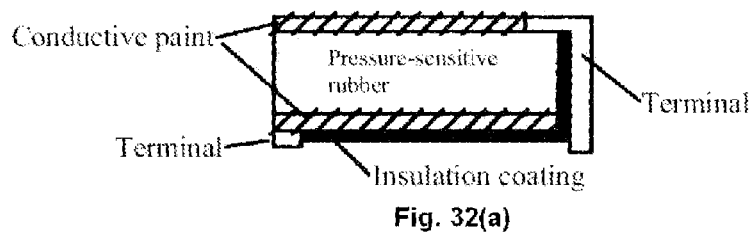
Fig. 32(a)
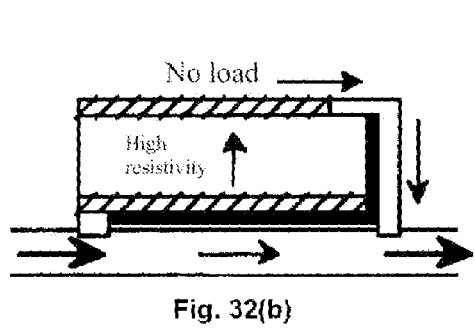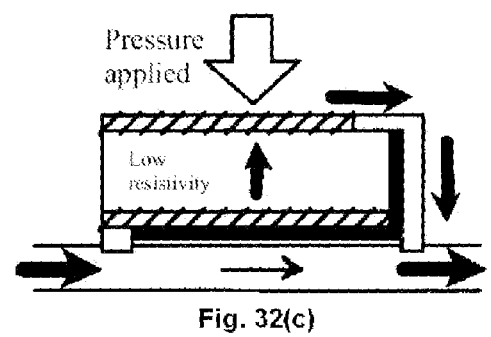
Fig. 32(b)
Fig. 32(c)

Fig. 53
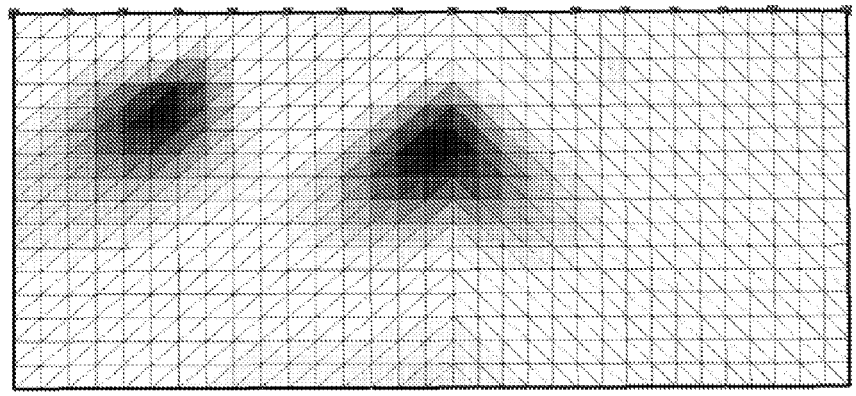
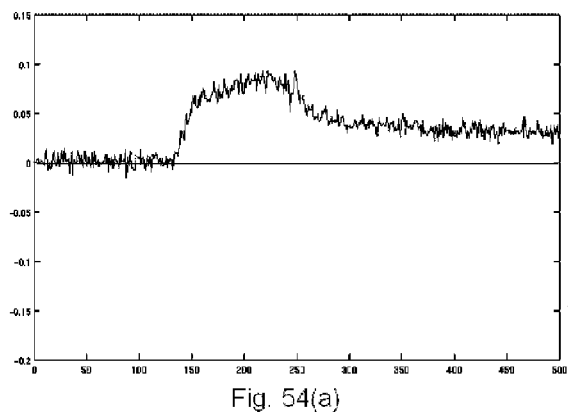
Fig. 54(a)
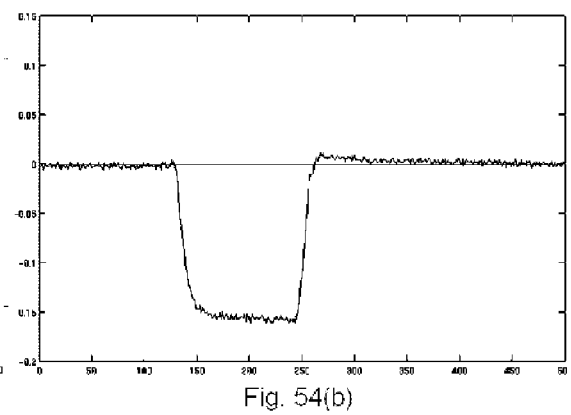
Fig. 54(b)
Fig. 55
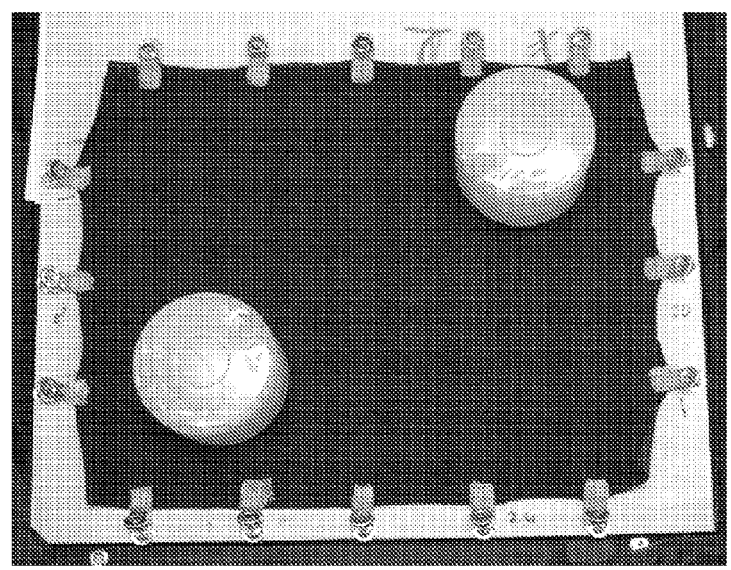

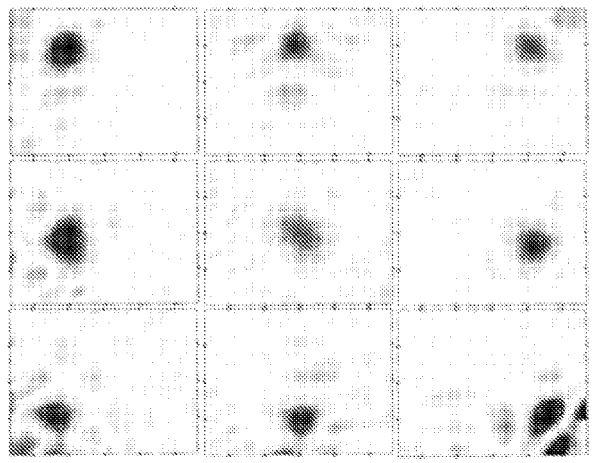
Fig. 58(a)
Fig. 58(b)
Fig. 58(c)
Fig. 59
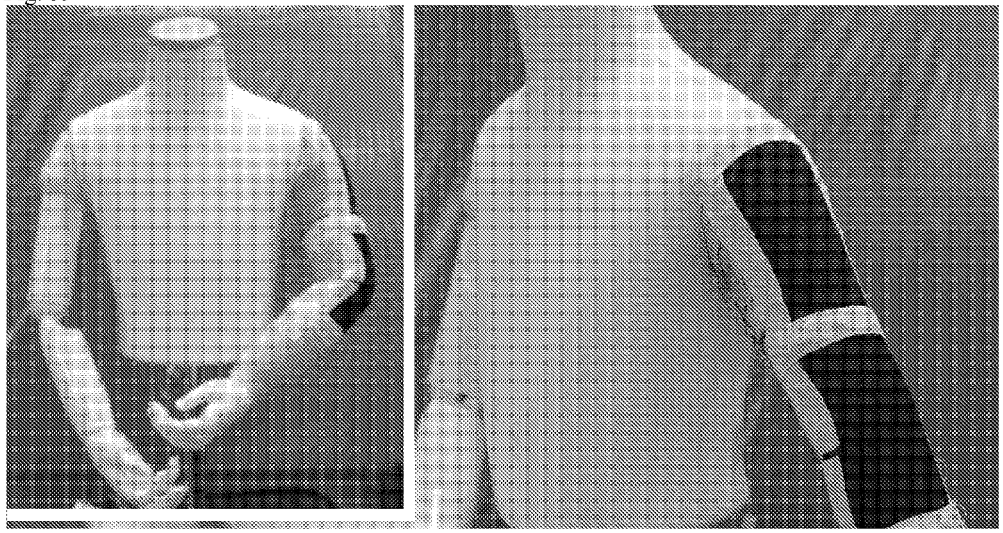

METHOD FOR MEASURING PHYSICAL QUANTITY DISTRIBUTION AND MEASUREMENT SYSTEM USING SENSOR FOR PHYSICAL QUANTITY DISTRIBUTION

This application is the U.S. National Phase under 35 U.S.C. §371 of International Application PCT/JP2007/067532, filed on Sep. 7, 2007, which claims priority to Japanese Patent Application No. 2006-247420, filed on Sep. 12, 2006. The International Application was published under PCT Article 21(2) in a language other than English.

TECHNICAL FIELD

The present invention relates to a tactile sensor to be equipped on humanoid robots, etc., where such sensor is a sensor for physical quantity distribution (hereinafter referred to as "PQD sensor") capable of measuring physical quantity distribution and also offering high stretchability and flexibility just like human skin. This PQD sensor can be applied not only for tactile sensing on robots, but also as a PQD sensor for measuring various physical quantities that are regionally distributed.

The present invention also relates to a method for measuring physical quantity distribution in which this PQD sensor can be applied and a measurement system that uses the PQD sensor offering high stretchability and flexibility.

PRIOR ART

Problems with Conventional PQD Sensors

There are needs to give tactile sensing ability, similar to that provided by human skin, to humanoid robots, etc. For this purpose, skin-like sensors are needed that can sense various physical quantities that distribute across the body surface.

Physical quantities that are sensed by these sensors include those sensed by human skin, such as contact, pressure, pinching, rubbing and other tactile sensations, as well as temperature and humidity, among others. Also, certain sensing functions not available to humans, such as an ability of the skin to sense the distance from an obstacle without contacting it, would also be effective in the case of humanoid robots, and therefore sensing of light, ultrasonic wave and various other physical quantities can also considered.

Among these distributional sensors, largest numbers of development cases have been reported in the areas of contact distribution sensors, pressure distribution sensors and temperature distribution sensors. These sensors generally comprise many sensing elements, arranged in a dispersed manner in a region, an electric signal processing part and computation processing part that process the data measured by sensing elements, and many wirings connecting the electric signal processing part and sensing elements, among others. For your information, a sensing element refers to an element that converts the target physical quantity at a given position to an electrical quantity such a voltage or resistivity. Since all these sensors basically have the same structure where the only difference is the type of sensing element, these sensors are hereinafter referred to as "sensors for physical quantity distribution," or "PQD sensors."

PQD sensors have traditionally presented the following problems because they use a very large number of sensing elements and wirings:

The applicable region is filled with many wirings, which prevents stretchability and flexibility High cost of implementing wirings because of the sheer number of wirings Direct application of external forces, etc., on the wirings and contact points across the region, which makes the sensor vulnerable to low reliability In particular, stretchability and flexibility are very important for humanoid robots, etc. At the elbows and shoulders, the body surface area changes significantly in the surroundings as the joint angle changes. With PQD sensors not offering flexibility, it is very difficult to cover these regions. In addition, sensing of pinching, rubbing and other actions associated with stretching and deformation of skin also require sensor stretchability and flexibility. It is also demanded that PQD sensors offer both the softness and sensing ability of human skin in order to improve their safety to the humans and environment. For this reason, too, sensor stretchability and flexibility are also important.

However, PQD sensors offering high stretchability and flexibility have not been realized so far, partly because stretchable conductive materials for wiring suitable for high-density wirings are not available, and partly because substantial reduction in the number of wirings is difficult to achieve with conventional constitutions.

Conventional Example

Mainstream Pressure Distribution Sensors

Here, specific problems pertaining to stretchability and flexibility are discussed by citing, as an example, pressure distribution sensors that are the most representative forms of PQD sensors. Pressure distribution sensors are used not only in the field of robotics, but also in various other fields such as measurement of pressure distribution on the sole and measurement of pressure distribution on a chair when a person is seated on it.

A representative example of constitution comprises a FPC (flexible printed circuit) board and pressure-sensitive resistors functioning as pressure sensing elements. Use of the FPC board and printable pressure-sensitive resistor ink, etc., lowers the wiring cost in mass production and also achieves thickness reduction and weight reduction. Also, the matrix-base wiring technology that allows for measurement of pressurized points corresponding to the square of n using 2n wirings is also used widely for the purposes of wire-saving. This wiring technology not only simplifies the FPC board wiring patterns, but it also reduces the number of connector terminals connecting the electric signal processing part and wirings, thereby contributing to size reduction and reliability improvement, as well.

However, FPC boards are not stretchable, and thus they are not adaptive to the shoulder, head and other slightly complex curved surfaces, although they are adaptive to simple curved surfaces such as cylindrical surfaces. Also in matrix-base wiring, the sensing elements arranged in both the row and column directions share the same wirings, which presents the problem of lack of shape flexibility because shapes are limited to the basic form of single rectangular solid.

To address the aforementioned problems, studies are conducted to develop methods for reducing wirings, as well as develop PQD sensors suitable for robots with the purpose of improving flexibility and stretchability.

Conventional Example

Wireless

For example, a method to transmit/receive energy and signals to/from individual sensing elements using a wireless method, instead of using wirings, is proposed (refer to Patent Literature 1). However, this method presents problems in terms of the development cost of a compact electronic device offering wireless communication and energy management functions, as well as the sizes and installation locations of sensing elements and host antenna, among others. Similar methods are proposed that use transmission and receiving of energy and signal using light.

Conventional Example

Patterns

When patterns are given to a skin-like material, the condition of patterns changes when the material deforms due to external force. A number of methods have been developed where this change is captured with a camera and analyzed in order to estimate the condition of external force without using direct wirings, etc. (refer to Patent Literature 2). However, these methods present problems in that the need for a long distance to capture image necessitates a relatively large space.

Conventional Example

Two-Dimensional Communication

A method to transmit/receive signals using a single common wiring, instead of wiring the sensing elements individually, is also proposed (refer to Patent Literature 3). Here, the sensing elements have a communication function and transmit data in a relay form with each pair of adjacent sensing elements communicating with each other. Two common wirings are additionally required to supply electric power to sensing elements. This method presents problems in terms of the development cost of a special sensing element having a communication function as well as the difficulty improving the detection density.

Conventional Example

Wave-Like, Stretchable Material Wiring

Take note that stretchability and flexibility can be achieved to some extent by implementing normal insulated conductive wirings in wave-like patterns or using coiled or spring wiring materials or wiring materials constituted by stretchable conductive glue or rubber. However, it is difficult to implement fine wirings, so physical interference occurs easily among wirings when the number of sensing points increases to a range of several tens to several hundreds. Accordingly, it is very difficult to improve the density of sensing elements by implementing high-density wirings like those used on FPC boards. Also, an attempt to increase the density to an unreasonable level is a cause of poor flexibility and stretchability. Furthermore, automation of production becomes difficult, unlike when FPC boards are used, and this increases the labor required in wiring implementation and adds to the wiring implementation cost to a significant degree.

[Patent Literature 1] Japanese Patent Laid-open No. 2003-28731

[Patent Literature 2] Japanese Patent Laid-open No. 2005-114715

[Patent Literature 3] Japanese Patent Laid-open No. 2003-188882

SUMMARY OF THE INVENTION

Problems to be Solved by the Invention

When humanoid robots, etc., are considered, stretchability and flexibility of PQD sensors are not necessarily required over the whole body surface.

With the arm, for example, the need for stretchability is low on the upper arm, forearm and other cylindrical parts although it is important around the elbow and other joints. In the case of the hand and fingers, fine tactile sensing ability and softness are required on the palm, but such requirement is low at the back of the hand. If stretchability and flexibility can be realized this way, or specifically at least in certain regions, utility of PQD sensors for robots, etc., should improve dramatically.

To meet the above request, the present invention addresses the measurement of physical quantity distribution over a two-dimensional or three-dimensional region. It is an object of the present invention to provide a measurement system for measuring physical quantity distribution over the entire region by using a PQD sensor capable of achieving large deformability characterized by high stretchability and flexibility in at least partial regions, as well as a method for measuring physical quantity distribution to obtain the physical quantity distribution using such measurement system.

Means for Solving the Problems

An overview of the present invention is explained.

With conventional PQD sensors, their structure of wirings for many sensing elements filling the measurement region has a negative effect on flexibility and stretchability. Accordingly, the present invention introduces a structure whereby sensing elements are not individually wired, but many sensing elements are connected altogether using a single conductive body. For example, this structure can be such that a conductive rubber sheet or foam is used as the aforementioned conductive body and many sensing elements are placed on top. This way, physical characteristics associated with excellent stretchability and flexibility can be achieved.

However, connecting the sensing elements altogether causes the data of many sensing elements to be mixed. Under the present invention, information of the target physical quantity distribution among this mixed data is estimated by computation based on the inverse problem analysis method. An overview of the principles of this computation is described below.

First, a conductive body with resistivity distribution is used. When current is supplied between two arbitrary points on the conductive body, it flows diffusely across the conductive body, normally covering the entire region. Since the conductive body has resistivity distribution, the region through which the current passes generates electric potential distribution. FIGS. 28($a$), 28($b$), and 28($c$) are schematic drawings of the flow of current that generates when current is supplied between two points on the conductive body, as well as equipotential lines.

To this conductive body, sensing elements are introduced that are structured in such a way that when the target physical quantity acts upon the sensing element, the quantity of current flowing near the sensing element is changed. If many of such sensing elements are installed in a dispersed manner over the conductive body, change in the physical quantity acting upon each sensing element causes the current quantity around the sensing element to change, thereby changing the electric potential distribution. These sensing elements can be achieved using, for example, strain gages, pressure-sensitive resistors and other elements whose resistivity changes according to external force. Based on the above, the target physical quantity distribution can be grasped indirectly by measuring the electric potential distribution of the conductive body. FIGS. 28(a), 28(b), and 28(c) show how the electric potential distribution changes, FIG. 28(a) shows a uniform resistivity distribution, FIG. 28(b) shows a change in electric potential distribution in the low-resistivity region at the center, and FIG. 28(c) shows a change in electric potential distribution in the high-resistivity region at the center.

By the way, an attempt to measure this electric potential distribution over the entire region of the conductive body leads to wiring problems pertaining to measurement electrodes and wirings similar to those encountered with conventional sensors. For this reason, electrodes and wirings for electric potential measurement are arranged only in partial regions, such as the boundary of the conductive body. These regions are referred to as "regions for electric potential measurement," while regions where electrodes and wirings are not implemented are referred to as "regions not for electric potential measurement."

When the voltages of electrodes in a region for electric potential measurement are measured, it generally seems that only the physical quantity distribution in the region can be measured. However, the current flowing through the conductive body is flowing diffusely across the conductive body and thus the current that flows into this region for electric potential measurement is one that has passed the various regions away from the electrodes. In other words, the electric potential distribution in the region for electric potential measurement is also affected by changes in the condition of current flowing in other regions not for electric potential measurement. For this reason, changes in the physical quantity distribution in a region not for electric potential measurement cause some changes in the electric potential distribution in the region for electric potential measurement. This means that the electric potential measured in the region for electric potential measurement contains information to some extent regarding the physical quantity distribution in the region not for electric potential measurement.

Accordingly, the injection point of the current to be supplied through the conductive body is changed to allow the current to flow through the conductive body in multiple patterns in order to measure the electrode voltage in each pattern. The values measured this way include information regarding the physical quantity distributions in regions not for electric potential measurement, where such information reveals different conditions of physical quantity distribution. For this reason, comparing and analyzing the measured electrode electric potentials in an integrated manner permits estimation to some extent of the physical quantity distribution in each region not for electric potential measurement. Such estimation calculation can be performed using the general inverse problem analysis method. This way, the target physical quantity distribution can be estimated in regions where electrodes are not installed, even when the measurement of electric potential distribution is performed in partial regions. Although complete values cannot be achieved because information is available only partially, selection of an appropriate number and arrangement of electrodes allows for estimation with a small margin of error well within a practical range.

This region for electric potential measurement can be a boundary or partial region of the conductive body, which eliminates the effects of the electrodes and wirings in most regions of the conductive body. Accordingly, a PQD sensor having high flexibility and stretchability over most regions can be realized. Take note that in the following text, "stretch" refers to stretching or deformation of a body for converting physical quantity distribution (hereinafter referred to as "PQDc body") of sheet-like or three-dimensional shape.

The points made above are briefly summarized below:
Connect many sensing elements altogether on a single conductive body to eliminate complex individual wirings.
Because the conductive body has resistivity distribution, supplying current between two appropriate points on the conductive body generates electric potential distribution.
When the target physical quantity changes at a sensing element, the condition of current flowing near that sensing element changes.
When the target physical quantity distribution changes, the condition of current flow changes and consequently the electric potential distribution also changes.
Electric potential distributions generated by multiple injection current patterns are measured in the region for electric potential measurement.
By implementing inverse problem analysis on the measured values, the target physical quantity distribution can be estimated over all regions including regions where electrodes are not installed.
By installing electrode in partial regions for electric potential measurement, stretchability and flexibility are ensured over most regions where electrodes are not installed.
Based on the above, a PQD sensor having high stretchability and flexibility in partial regions can be realized.

The specific means for solving the problems are as follows:
(1) A method for measuring physical quantity distribution, characterized by using a measurement system comprising:
a body for converting physical quantity distribution (PQDc body) having a regional shape upon which a target physical quantity acts, equipped with a base medium, and structured in such a way that the condition of injection current flowing through the base medium changes according to the change in an action of the physical quantity;
at least six electrodes connected to the base medium;
a sensor for physical quantity distribution (PQD sensor) having the PQDc body, electrodes, and wirings that connect the electrodes and a processing part;
an electric signal processing part connected to the wirings of the PQD sensor;
a computation processing part capable of communicating data with the electric signal processing part; and
a processing part comprising the electric signal processing part and computation processing part;
wherein a measurement method executed by the processing unit comprises: a measurement procedure to issue commands to the electric signal processing part to generate at least four patterns of injection current using at least two of the electrodes and use the electrodes to measure an electric potential distribution, which generates in the base medium for use as measured data; and an estimation procedure to read the measured data and perform an estimation calculation where the data is used to obtain the target physical quantity distribution that acts upon the PQDc body.
(2) A method for measuring physical quantity distribution according to (1) above, characterized in that, when externally acquired complete shape data θa can be acquired in the estimation procedure, the estimation procedure estimates target physical quantity distribution ρ from the θa and whole measured electric potential distribution data Vm.

(3) A method for measuring physical quantity distribution according to (1) above, characterized in that, when whole measured electric potential distribution data Vm containing μ-computable information can be acquired in the estimation procedure, the estimation procedure performs a process equivalent to computation of model information μ from the Vm and estimates target physical quantity distribution ρ from the Vm.

(4) A method for measuring physical quantity distribution according to (1) above, characterized in that, when externally acquired shape-complement data θp can be acquired in the estimation procedure, the estimation procedure performs a process equivalent to computation of model information μ from whole measured electric potential distribution data Vm and the θp and estimates target physical quantity distribution ρ from the Vm and θp.

(5) A method for measuring physical quantity distribution according to (3) above, wherein such method is characterized in that in (3) above, the estimation procedure comprises a frame-type flow containing step Si to acquire externally acquired complete shape data θa and then store the θa in a memory, step Sf to acquire whole measured electric potential distribution data Vm, and step Sp to estimate target physical quantity distribution ρ from the θa and Vm.

(6) A method for measuring physical quantity distribution according to (3) above, wherein such method is characterized in that in (3) above, the estimation procedure comprises a frame-type flow containing step Sf to acquire externally acquired complete shape data θa and whole measured electric potential distribution data Vm, and step Sp to estimate target physical quantity distribution ρ from the Vm and θa.

(7) A method for measuring physical quantity distribution according to (4) above, wherein such method is characterized in that in (4) above, the estimation procedure comprises a frame-type flow containing step Sf to acquire whole measured electric potential distribution data Vm, and step Sp to estimate target physical quantity distribution ρ from the Vm.

(8) A method for measuring physical quantity distribution according to (4) above, wherein such method is characterized in that in (4) above, the estimation procedure comprises a frame-type flow containing step Si to acquire whole measured electric potential distribution data Vm, compute model information μ from the Vm, and then store the μ in a memory, step Sf to acquire whole measured electric potential distribution data Vm, and step Sp to estimate target physical quantity distribution ρ from the Vm and stored μ.

(9) A method for measuring physical quantity distribution according to (5) above, wherein such method is characterized in that in (5) above, the estimation procedure comprises a frame-type flow containing step Si to acquire externally acquired shape-complement dataθp and then store the θp in a memory, step Sf to acquire whole measured electric potential distribution data Vm, and step Sp to estimate target physical quantity distribution ρ by referencing the Vm and storedθp.

(10) A method for measuring physical quantity distribution according to (5) above, wherein such method is characterized in that in (5) above, the estimation procedure comprises a frame-type flow containing step Si to acquire externally acquired shape-complement dataθp and whole measured electric potential distribution data Vm, compute model information μ from the Vm and θp, and then store the μ in a memory, step Sf to acquire whole measured electric potential distribution data Vm, and step Sp to estimate target physical quantity distribution ρ by referencing the Vm and stored μ.

(11) A method for measuring physical quantity distribution according to (5) above, wherein such method is characterized in that in (5) above, the estimation procedure comprises a frame-type flow containing step Sf to acquire externally acquired shape-complement dataθp and whole measured electric potential distribution data Vm, and step Sp to estimate target physical quantity distribution ρ from the Vm and θp.

(12) A measurement system, characterized by comprising:
a sensor for physical quantity distribution (PQD sensor) comprising a body for converting physical quantity distribution (PQDc body) having a base medium, at least six electrodes connected to the base medium, and wirings connecting the electrodes; and
a processing part comprising an electric signal processing part and a computation processing part; and containing a measurement procedure and an estimation procedure;
wherein the base medium is an electrically continuous conductive body, has an electric impedance distribution relative to direct current or alternating current;
wherein the PQDc body has a regional shape upon which a target physical quantity acts and is structured in such a way that the condition of injection current flowing through the base medium changes according to the change in the distribution of the target physical quantity;
wherein the electric signal processing part generates at least four patterns of injection current for the base medium via at least two of the electrodes and measures the voltage value, as measured data, in each of the injection current patterns; and
wherein the estimation procedure executed by the computation processing part uses the measured data to estimate the target physical quantity distribution that acts upon the PQDc body.

(13) A measurement system according to (12) above, characterized by having a program to execute the method for measuring physical quantity distribution according to any one of (1) to (11).

(14) A measurement system according to (12) above, characterized in that the PQDc body is a conductive knitted fabric.

Effects of the Invention

With the measurement system and method for measuring physical quantity distribution that allow for the physical quantity distribution to be obtained over all regions of the PQD sensor, despite the fact that electrodes and wirings are arranged in partial regions of the PQD sensor, regions without electrodes and wirings can be realized where significant deformation, etc., can be added to the PQD sensor, and this has the effect of realizing high deformability at least in partial regions when measuring the regionally distributed physical quantity.

Based on the above, it becomes possible to sense the tactile distribution and pressure distribution in areas of large surface area change, such as joints of humanoid robots. Also, realization of stretch distribution sensors makes it possible to perform tactile sensing of rubbing, pinching, etc.

In addition, these sensors can be used as sensors exhibiting excellent reliability and other characteristics for measuring thickness, bendability, adaptability for curved surface, external force, etc.

Furthermore, the method for measuring physical quantity distribution that can compensate for the estimation error of physical quantity distribution caused by a large deformation of the PQD sensor, has the effect of improving the estimation accuracy even when the PQD sensor undergoes a large deformation.

By making the PQDc body using a conductive knitted fabric, the PQDc body can be installed on measurement surfaces of all shapes in a manner ensuring good measurement accuracy.

BRIEF DESCRIPTION OF THE DRAWINGS

FIGS. 2(a) and 2(b) are Explanation drawings, each showing a configuration of a dispersed-type PQDc body conforming to the present invention.

FIGS. 3(a) and 3(b) are Section views, each explaining a configuration of a dispersed-type PQDc body conforming to the present invention.

FIGS. 6(a) and 6(b) are Examples of a block-shaped conductive foam conforming to the present invention, where many spherical pressure-sensitive foams are embedded.

FIGS. 7(a) and 7(b) are Constitutional drawings of a configuration of a PQDc body conforming to the present invention, where sensing elements comprising active elements are used.

FIGS. 8(a) and 8(b) are Constitutional drawings of a configuration conforming to the present invention, where one electric power supply for active-type sensing elements is connected to a base medium.

FIG. 9 is a Constitutional drawing of a connected type conforming to the present invention, where sensing elements and connection parts are connected in a matrix shape.

FIGS. 10(a), 10(b), 10(c) and 10(d) are Examples of a structure of a contact type conforming to the present invention, where semispherical conductive forms are placed on a base medium.

FIGS. 11(a), 11(b), 11(c) and 11(d) are Examples of a contact type conforming to the present invention, where many conductive fibers are erected on a surface of a planar base medium.

FIGS. 15(a) and 15(b) are Explanation drawings of a PQDc body of a structure conforming to the present invention, where many magnetic particles having insulation coating are placed in a bag in which conductive liquid is filled.

FIG. 16 is a Constitutional drawing of a base medium of a partially connected structure type conforming to the present invention, where base medium elements are connected by conductive materials.

FIGS. 19(a) and 19(b) are Constitutional drawings of a base medium of a dispersed structure type conforming to the present invention, where base medium elements of arbitrary shapes are arranged on a conductive sheet with a distance provided in between.

FIG. 21 is a Constitutional drawing of an example of a rectangular PQDc body conforming to the present invention, where the PQDc body has non-stretchable and stretchable regions.

FIGS. 22(a) and 22(b) are Constitutional drawings of a PQDc body for fingertip conforming to the present invention.

FIG. 23 is a Constitutional drawing of a PQDc body of ear shape conforming to the present invention.

FIGS. 24(a) and 24(b) are Constitutional drawings of an example of a fully stretchable PQDc body conforming to the present invention, where an electrode and stretchable PQDc body are contacted in a sliding manner to generate electrical continuity between the two.

FIG. 27 is a Figure showing a constitution of a type conforming to the present invention, where a frame is implemented only once based on a frame-type flow.

FIGS. 28(a), 28(b) and 28(c) are Figures, each showing a schematic view of a flow of current that generates when current is supplied between two points on a conductive body with resistivity distribution, as well as equipotential lines.

FIG. 29 is a Constitutional drawing of an example of a stretchable pressure distribution sensor conforming to the present invention.

FIGS. 30(a) and 30(b) are Figures, each explaining a stretch condition of a pressure distribution sensor conforming to the present invention provided at an elbow joint.

FIGS. 31(a), 31(b), and 31(c) are Figures, each explaining an electrode arrangement and stretchable region of a pressure distribution sensor conforming to the present invention.

FIGS. 32(a), 32(b), and 32(c) are Figures, each explaining a structure of a sensing element used for a pressure distribution sensor conforming to the present invention.

FIG. 53 is a Resistivity distribution diagram based on actual estimation in the condition in FIG. 52.

FIGS. 54(a) and 54(b) are Graphs, each showing how a resistivity in a horizontal direction changes over time when pressure is applied in a surface direction to a conductive rubber and also to a conductive knitted fabric conforming to the present invention.

FIG. 55 is a Photograph image of a condition where a weight of 300 g is placed at each of two points on a rectangular PQDc body constituted by a conductive knitted fabric conforming to the present invention.

FIGS. 58(a), 58(b) and 58(c) are Resistivity distribution diagrams, each based on actual estimation in the condition in FIG. 57.

FIG. 59 is a Photograph image of a condition where a conductive knitted fabric conforming to the present invention is installed on an elbow.

DESCRIPTION OF THE SYMBOLS

Figure 1:
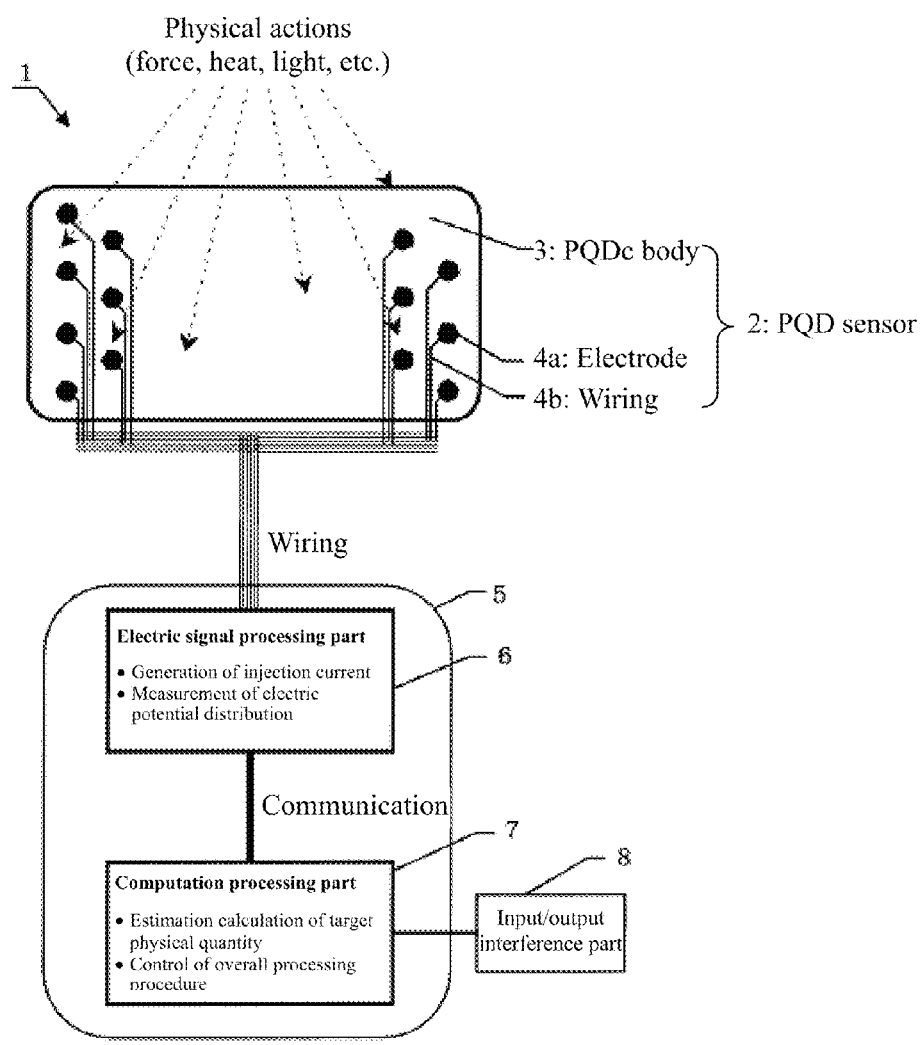
FIG. 1 is a Constitutional drawing of a measurement system conforming to the present invention.

1 Measurement system
2 PQD sensor
3 PQDc body
4a Electrode
4b Wiring
5 Processing part
6 Electric signal processing part
7 Computation processing part
8 Input/output interface part

BEST MODE FOR CARRYING OUT THE INVENTION

The method for measuring physical quantity distribution and the measurement system using a PQD sensor to implement such method, proposed under the present invention, are explained.

(System Overview)

An overview of the system proposed by the present invention is explained.

FIG. 1 shows a constitutional drawing of a measurement system conforming to the present invention. A measurement system 1 basically comprises a PQD sensor 2, processing part 5, and wirings connecting the two, where the processing part 5 comprises an electric signal processing part 6, computation processing part 7, etc. The computation processing part 7 is connected to an input/output interface part 8. The processing part has the electric signal processing part equipped with a function to generate injection current and measure electric potential distribution, the computation processing part equipped with a function to estimate the target physical quantity distribution, as well as wirings and communication means for electrically connecting the two.

The PQD sensor 2 has a PQDc body 3, and electrodes 4a and wirings 4b, and this is a part affected by physical operations. The PQDc body 3 has a conductive body with internal resistivity distribution, and this PQDc body 3 has multiple electrodes 4a installed in it. The electrodes 4a are connected to the electric signal processing part 6 via wirings 4b. The electric signal processing part 6 has a function to supply current to the conductive body via the electrodes 4a. Since the conductive body has resistivity distribution, electric potential generates due to the current from the electrodes. The PQDc body is structured in such a way that when the physical quantity distribution acting upon the PQDc body changes, the electric potential distribution of the conductive body also changes. Also, the electric signal processing part 6 has a function to measure via the electrodes 4a the electric potential distribution generating in the conductive body. Specification of the electrodes used to supply current, and the electrodes used to measure the voltage, etc., are controlled by commands from a measurement program comprising a measurement procedure, where the program is executed by the computer inside the electric signal processing part 6 or by the computation processing part 7. Measurement data sampled by the electric signal processing part 6, etc., is passed by means of communication, etc., to the computation processing part 7 that performs estimation calculation. The estimation program comprising an estimation procedure, which is executed by the computation processing part 7, estimates the target physical quantity distribution based on these measurement data, etc.

The foregoing explained an overview of the system. The following provides a detailed explanation of the PQDc body, arrangement of electrodes, electric signal processing part, measurement program comprising a measurement procedure, and estimation program comprising an estimation procedure, in this order.

(Configuration of PQDc Body)

The configuration of the PQDc body 3 is explained.

The PQDc body 3 has a two-dimensional or three-dimensional region and the target physical quantity acts upon this region. The PQDc body has an electrically continuous conductive body in it, and this conductive body has resistivity distribution. This conductive body is hereinafter referred to as "base medium." For your information, "resistivity" here refers to resistivity relative to direct current (DC) and alternating current (AC), or specifically electric impedance. Various materials can be used as the conductive body constituting the base medium, such as conductive rubbers and conductive foams comprising rubber, urethane, etc., mixed with metal, carbon and other fillers and powders, as well as conductive resins constituted by polymer materials.

The electrodes 4a are placed at two or more appropriate positions on the base medium. When current is supplied between these electrodes 4a, the current not only advances straight between the electrodes, but it also flows in a manner diffusing across the entire conductive body. If the injected current is DC or when the current signal frequency is sufficiently low, the current flows over a wide range or the entire region of the conductive body. Due to resistivity distribution, an electric potential gradient occurs along the path of current flow according to the Ohm's law, and consequently electric potential distribution occurs in the regions through which the current passes. The current supplied to the base medium to generate such electric potential distribution is hereinafter referred to as "injection current." The injection current may be DC or AC.

The PQDc body 3 is structured in such a way that it changes the condition of this current flow according to change in the target physical quantity distribution. When the condition of current flow is changed, the electric potential distribution of the base medium also changes. Multiple electrodes are placed on the base medium and these electrodes are used to measure the change in electric potential distribution, and the measured data is used to estimate the target physical quantity distribution. Mechanisms by which to change the condition of the current flowing through the base medium are largely divided into the following two methods:

(1) Method to change the resistivity distribution of the PQDc body according to the distribution of the target physical quantity acting upon the PQDc body;
(2) Method to input/output current according to change in the target physical quantity via a different medium from points inside the base medium.

The former method is hereinafter referred to as "resistivity distribution type," while the latter method is referred to as "current I/O type." The mechanisms and configurations by which to realize these methods are extremely diverse. Configurations of the resistivity distribution type and current I/O type are explained using examples.

(Resistivity Distribution Type)

The resistivity distribution type is explained.

The resistivity distribution type represents a structure where the resistivity distribution of the PQDc body changes according to change in the distribution of the target physical quantity that acts upon the PQDc body. This way, the electric potential distribution of the base medium is changed. A representative example of this structure is described below.

(1) Dispersed Type

The dispersed type is the most basic configuration of the PQDc body, where the basic structure comprises sensing elements dispersed across the inside or surface of the regionally distributed base medium.

FIGS. 2(a) and 2(b) are explanation drawings of a configuration of a dispersed-type PQDc body conforming to the present invention. FIG. 2(a) is a plan view of an example where sensing elements are orderly arranged on the base medium, while FIG. 2(b) is a plan view of an example where sensing elements are randomly arranged on the base medium. FIGS. 3(a) and 3(b) are explanation drawings providing section views of two examples. FIG. 3(a) is a section view where sensing elements are installed on the surface, while FIG. 3(b) is a section view where sensing elements are installed on the inside.

The base medium 3A comprises a conductive material with resistivity distribution, and can achieve high flexibility and stretchability using conductive rubber, conductive foam, net-like conductive material, or porous conductive material, etc. The sensing element 3B uses a material that causes the resistivity between its terminals to change according to change in the target physical quantity that acts upon the sensing element 3B.

Figure 4A:
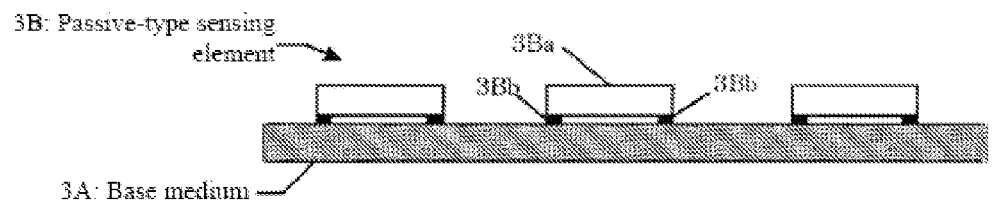
FIGS. 4(a) and 4(b) are Section views of a configuration of a PQDc body using passive-type sensing elements conforming to the present invention.
Figure 4B:
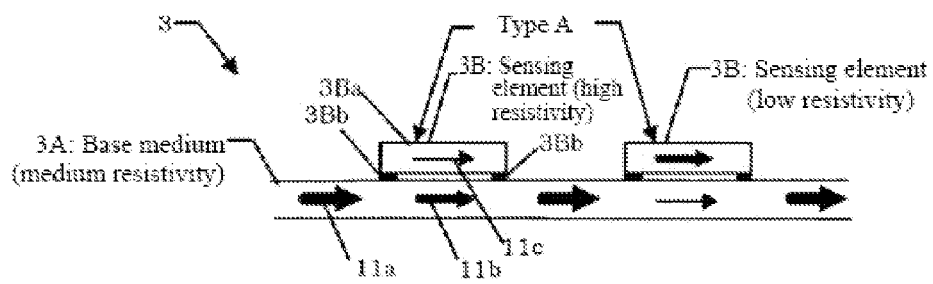

FIGS. 4(a) and 4(b) show section views of a configuration of a PQDc body using passive-type sensing elements. FIG. 4(a) is a section view based on a combination of a base medium and passive-type sensing elements, while FIG. 4(b) is an explanation drawing of a path of current flow via sensing elements. The passive-type sensing element has a sensing element body 3Ba and electrodes 3Bb. The passive-type sensing element shown in FIG. 4(b) is a type A sensing element. In the example given in FIG. 4(b), the base medium 3A is constituted so that it has a resistivity of medium level. The path of current flow changes as shown in FIG. 4(b) according to whether the resistivity of the sensing element 3B contacting this base medium 3A is high or low. When the terminals of this sensing element 3B are connected to the base medium 3A, a parallel resistor is formed between the terminals of the sensing element 3B and base medium 3A. In this case, changing the value of resistivity between the terminals of the sensing element 3B changes the value of this parallel resistor. As shown in FIG. 4(b), if the resistivity of the sensing element 3B is greater than that of the base medium 3A, then more current flows to the base medium. If the resistivity of the sensing element 3B is smaller than that of the base medium 3A, then more current flows to the sensing element. This way, the resistivity of the base medium around the sensing element can be changed.

Passive-type elements whose resistivity value changes when the physical quantity changes include various types including strain gages (detecting strain), pressure-sensitive resistors (detecting pressure), CdS (calcium sulfide, which detects light quantity) and platinum (detecting temperature). Also, passive-type elements whose electric impedance, or resistivity to AC, changes include pressure-sensitive capacitors (detecting pressure) and coils (detecting coil deformation).

Many of these elements are basically of a type where the value of resistivity between the two terminals changes.

Figure 5A:
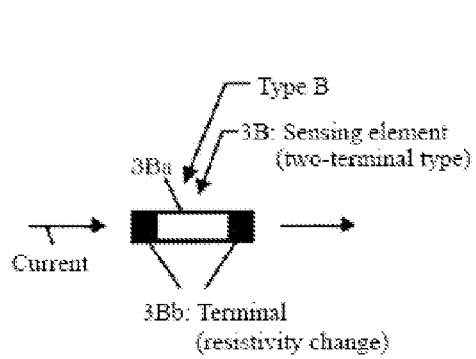
FIGS. 5(a) and 5(b) are Explanation drawings of terminal-type sensing elements conforming to the present invention.
Figure 5B:
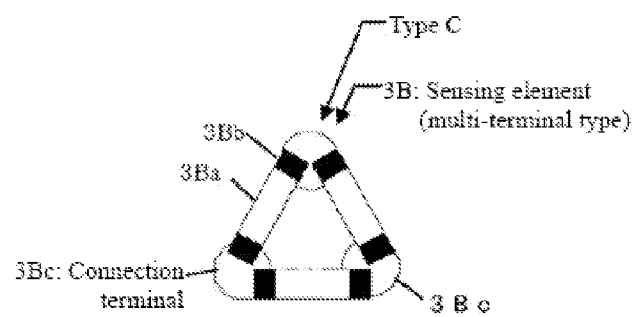

FIGS. 5(a) and 5(b) are explanation drawings of terminal-type sensing elements. FIG. 5(a) shows an example of a two-terminal type sensing element, while FIG. 5(b) shows an example of a three-terminal type sensing element. As shown in FIG. 5(a), the two-terminal type sensing element is a type A sensing element, where a sensing element body 3Ba with a resistivity characteristics between its terminals 3Bb is provided and the current flowing between the terminals in the direction of the arrow can be influenced according to change in the resistivity value, but the current flowing in the direction vertical to the arrow receives little influence. Accordingly, in cases where the required characteristics must be such that bias relative to the direction of current is small, several methods can be considered such as structuring a three-terminal type sensing element by connecting two-terminal type sensing elements in a triangle form as shown in FIG. 5(b), or forming a multi-terminal sensing element by combining multiple sensing elements. The constitution shown in FIG. 5(b) comprises a type C sensing element with electrodes 3Bb connected to both ends of the sensing element body 3Ba via connection terminals 3Bc. It is also possible to achieve pseudo-characteristics without bias by aligning the sensing elements not uniformly in the same direction, but randomly in various directions, with respect to the base medium. In this case, the small region covering multiple sensing elements must have a resolution much lower than the desired level. Also, a parallel resistance circuit can be formed regionally by attaching circular-shaped pieces of pressure-sensitive resistors, etc. If small coils are embedded in the base medium, deformation of a coil changes the impedance around the coil. In this case, too, the entire coil makes contact electrically with the base medium, instead of producing contact between two points. By installing many such small pieces on the base medium, a dispersed-type PQDc body can also be constituted.

In addition to a sheet-like structure the dispersed-type PQDc body may also have a three-dimensional structure comprising a conductive foam, etc. A structure where many sensing elements are embedded in a three-dimensional base medium can be considered. Examples include a structure where many pressure-sensitive foams are embedded in a block-shaped conductive foam.

FIGS. 6(a) and 6(b) show an example of embedding many spherical pressure-sensitive foams (high resistivity) 3Bda in a block-shaped conductive foam (low resistivity) 3Aa. FIG. 6(a) shows a section view before operating pressure is applied, while FIG. 6(b) is a section view after operating pressure is applied. When the entire block deforms due to operating pressure, it changes, for example, to a pressure-sensitive foam (high resistivity) 3Bda, pressure-sensitive foam (medium resistivity) 3Bda or pressure-sensitive foam (low resistivity) 3Bda. In other words, a PQDc body can be constituted whose resistivity distribution changes according to the deformation when deformation is added to the entire block by means of compression or stretching. Needless to say, two-terminal or multi-terminal type sensing elements can be used here. A constitution where many aforementioned coils are embedded is also possible.

Sensing elements can be arranged in an orderly manner or in a random manner, as shown in FIGS. 2(a) and 2(b). Also, sensing elements may be installed on the surface of the base medium or inside the base medium, as shown in FIGS. 3(a) and 3(b).

With the dispersed-type PQDc body, it is also possible to use active elements, instead of passive elements, as sensing elements. When active elements are used, the types of target physical quantities can be increased significantly. For example, as shown in FIGS. 7(a) and 7(b) a structure where the output of internal state of the element is changed to resistivity value can be obtained by mounting an electrically variable resistor, etc., in the sensing element. As for the electric power supply for active-type sensing elements, two additional conductive media for electric power supply are used. A medium used for electric power supply, such as these, is hereinafter referred to as "medium for electric power supply." If the PQDc body has a sheet shape, for example, a total of three conductive media including a base medium and two media for electric power supply may be layered.

FIGS. 7(a) and 7(b) are constitutional drawings, each showing a configuration of a PQDc body using active sensing elements. The example shown in FIG. 7(a) comprises a medium for electric power supply (+V) 12, medium for electric power supply (GND) 13, and base medium 3A, between which is provided a body 3Ca of an active-type sensing element 3C having terminals 12a, 13a, 3Cc, 3Cd, 3Cb connected to each medium. As shown in FIG. 7(b), the sensing element 3C is a type E element (3Caa) where an electrically variable resistor 3Cf is driven by a sensor 3Ce. The sensor 3Ce operates by sensing pressure or other physical quantity and changes the resistivity value of the electrically variable resistor 3Cf.

It is also possible to use only one medium for electric power supply (GND) as long as the electric power supply +V can be ensured from the base medium. FIGS. 8(a) and 8(b) are constitutional drawings of a configuration where an electric power supply +V for active-type sensing elements is connected to the base medium and the electric power supply GND is connected to a medium for electric power supply. In the example shown in FIG. 8(a), the same symbols already mentioned earlier are not explained. The sensing element in FIG. 8(b) is a type F element (3Cab).

Normally, electric potentials such as 0 V and 5 V are given to the two injection current terminals of the base medium. If a combination of 3 V and 5 V is used, the electric potential distribution covers a range of 3 to 5 V, which means that if the sensing element is an active element that can be driven at 3 to 5 V, then the electric power supply +V can be ensured from the base medium. However, the current consumption of the active-type sensing element must be kept sufficiently small in order to minimize its impact on the electric potential distribution.

(2) Contact Type

The dispersed-type PQDc body has independently functioning sensing elements, but there is also a structure where the base medium functions as part of the sensing element.

According to this structure, the conductive materials are made to contact the base medium regionally to change the resistivity around the conductive materials. This structure is hereinafter referred to as "contact type."

For example, assume a structure comprising semispherical conductive foams placed on a base medium. FIGS. 10(a), 10(b), 10(c) and 10(d) show an example of such structure, where FIG. 10(a) is a section view explaining a contact configuration in a normal condition where operating pressure is not applied to semispherical conductive foams 3Bdb (low resistivity) which is in contact with a base medium (conductive medium 3A: high resistivity) at a contact region 3Bdc, while FIG. 10(c) is a plan view showing the uniformity of overall resistivity distribution. Since the resistivity of the base medium is higher than that of the conductive foam, in a normal condition the current mainly flows to the sheet. When the foam is crushed by pressure, however, the area of contact between the foam and sheet increases and consequently the quantity of current flowing through the foam of lower resistivity increases. Accordingly, the apparent resistivity around the conductive foam can be changed according to the pressure. FIG. 10(b) shows this condition, where the section view illustrates how the conductive foam deforms under operating pressure and the contact region widens as a result. FIG. 10(d) is a plan view showing the lower resistivity around the pressurized region in this condition. One feature of this structure is that by changing the shape of the semisphere, the relationship of pressure and resistivity distribution can be determined as desired.

When a structure is adopted where conductive fibers, etc., are embedded vertically in a base medium, a very sensitive contact distribution sensor can be realized. FIGS. 11(a), 11(b), 11(c), and 11(d) show an example of erecting many conductive fibers on the surface of a planar base medium, where FIG. 11(a) is a section view showing the non-contact condition before contact with the contact target occurs, while FIG. 11(c) is a plan view showing the uniformity of overall resistivity distribution in the condition in FIG. 11(a). When the contact target contacts the PQDc body, multiple fibers collapse and as a result, the conductive fibers 3Be contact the base medium 3A or conductive fibers contact each other, thereby causing electrical short-circuit in the surrounding area and lowering the resistivity distribution in the contact region. FIG. 11(b) is a section view showing a condition where conductive fibers 3Be (low resistivity) have been collapsed by the contact target, while FIG. 11(d) is a plan view showing the lower resistivity around the contact region. Conventional sensitive contact distribution sensors are prone to false detection due to detecting stretching and bending of the sensor itself. According to the aforementioned structure, however, it is possible to realize a sensor resistant to false detection even on a stretched or a convexly bent surface.

(3) Continuous Type

The continuous type refers to a PQDc body where the resistivity distribution of the base medium itself changes as the base medium directly receives the action of the target physical quantity. For example, metals such as platinum undergo significant change in electrical resistivity due to temperature. Accordingly, nets and other shapes made of platinum themselves function as a PQDc body whose resistivity distribution changes according to the temperature distribution. Pressure-sensitive resistors comprising conductive particles dispersed in rubber, paint, etc., are also continuous-type materials subject to changing resistivity distribution according to the deformation distribution. In a sense, the continuous type is characterized as a dispersed-type structure encasing numerous small sensing elements inside.

(4) Connected Type

The dispersed type and contact type are based on the concept of parallel resistance connection. However, a single regional PQDc body can be constituted by connecting the terminals of sensing elements of terminal type, such as those used in the dispersed type, either directly or using connection parts made of a conductive material. Such structure based on serially connected sensing elements is hereinafter referred to as "connected type." FIG. 9 is a constitutional drawing of a connected type where sensing elements and connection parts are connected in a matrix shape. The connected type basically has a net-like structure and the network of sensing elements itself can be regarded as the base medium.

(5) Others (1) to (4) explained representative examples of PQDc body configurations, but there are many more PQDc bodies that are difficult to categorize.

FIGS. 15(a) and 15(b) are explanation drawings of a PQDc body structured in such a way that many particles of magnetic material 3Db whose surface is insulation-coated by resin, etc., are filled in a freely movable manner in a bag 3Daa filled with conductive liquid 3Dc. FIG. 15(a) is a section view explaining a PQDc body, while FIG. 15(b) is a section view explaining a PQDc body when a magnet 3Dd is brought closer thereto.

When a magnet 3Dd is brought closer to this PQDc body, magnetic bodies are attracted around the magnet. Since the particles are encased in an insulator, the apparent electrical resistivity increases around the region where the particle density is high. Accordingly, the distribution of magnetic force can be estimated from the resistivity distribution. Many configurations can be considered, like this one, which are difficult to categorize. The sensing element in FIG. 15(a) is a type L element (3Caf).

(Current I/O Type)

The current I/O type is explained.

The current I/O type is based on the principle where the condition of current flow in the base medium is changed by inputting/outputting current through another conductive medium different from the base medium from points inside the base medium region.

For example, one terminal of the sensing element, which is structured so that the quantity of current flowing between its terminals changes according to the acting physical quantity, is connected to the base medium, while the other terminal is connected to another conductive medium different from the base medium. When many such sensing elements are installed in the region, the condition of current flowing through the base medium near sensing elements changes according to the target physical quantity distribution, and as a result the electric potential distribution also changes. This medium for inputting/outputting current is hereinafter referred to as "medium for current I/O." The medium for current I/O basically is fully conductive.

With a PQDc body of two-dimensional sheet shape, for example, its structure may be such that the base medium and medium for current I/O are layered on top of each other and the sensing elements are sandwiched between the two, with both ends of each sensing element connected to the base medium and medium for current I/O, respectively. As for the method to change the quantity of current flowing between the sensing element terminals, possible methods include one where the value of resistivity between the terminals is changed according to the detected quantity, one where the quantity of current flowing between the terminals is controlled directly, and one where the electric potential at the terminal connected to the base medium is controlled according to the detected quantity. FIG. 12 to FIG. 14(c) are explanation drawings showing configurations of various I/O-type PQDc bodies where sensing elements are provided between, and connected to, the base medium and medium for I/O. Except for a medium for current I/O 15 and sensing elements of types I, J and K, the same symbols used in FIGS. 7(a) and 7(b) and FIGS. 8(a) and 8(b) are not explained in the examples shown in FIG. 12 to FIG. 14(c).

Figure 12:
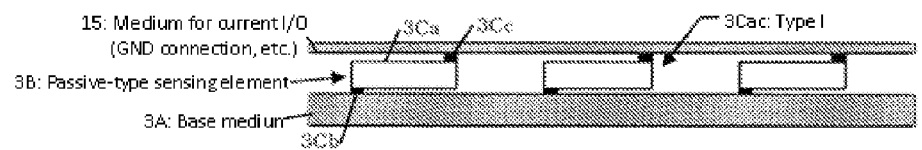
FIG. 12 is a Figure explaining a current I/O type conforming to the present invention, where terminals of a passive-type sensing element are connected to a base medium and medium for current I/O.

When the resistivity between the sensing element terminals changes, one terminal is connected to the base medium, while the other terminal is connected to the medium for current I/O, using the passive sensing element where the value of resistivity between the two terminals changes according to the detected quantity as explained in connection with the dispersed type. The medium for current I/O is connected to GND. FIG. 12 shows an example where the terminals of this sensing element are electrically connected to the base medium and medium for current I/O. The sensing element in FIG. 12 is a type I element (3Cac). The injection current is set in such a way that the voltage of the electrode for current injection becomes higher than the GND voltage, in order to bring the electric potential distribution of the base medium higher than that of the GND. This way, current flows out of the base medium through the medium for current I/O according to the resistivity value of the sensing element. As a result, the physical quantity acting upon the sensing element changes, which then changes the resistivity value of the sensing element and consequently changes the electric potential distribution of the base medium.

Figure 13A:
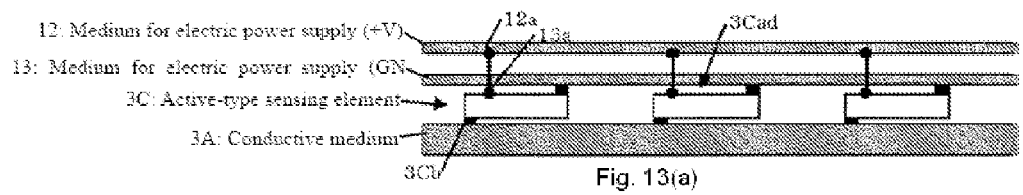
FIGS. 13(a) and 13(b) are Figures, each showing an example of a current I/O type conforming to the present invention, where terminals of an active-type sensing element are connected to a base medium and two media for I/O.
Figure 13B:
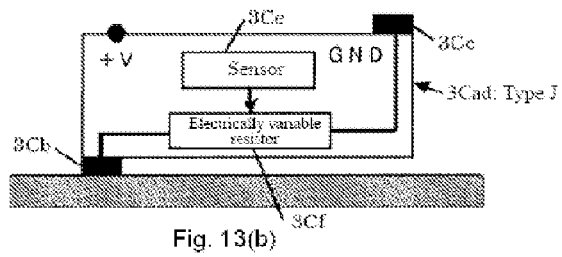

Also, an active-type sensing element requiring an electric power supply can also be used if two media for electric power supply are available, as is the case with the dispersed type. FIGS. 13(a) and 13(b) show an example where the terminals of the sensing element are connected to the base medium and two medium for I/O, where FIG. 13(a) shows a general view, while FIG. 13(b) shows a single unit view of the active-type sensing element. The sensing elements in FIGS. 13(a) and 13(b) are type J elements (3Cad) where an electrically variable resistor 3Cf is driven by a sensor 3Ce. Electric power is supplied from the two media for electric power supply to the active-type sensing element whose resistivity between the two terminals changes according to the detected quantity. The structure may be such that one terminal of the sensing element is connected to the medium for electric power supply (GND), while the other terminal is connected to the base medium. In this case, the medium for electric power supply (GND) also functions as a medium for current I/O.

Figure 14A:
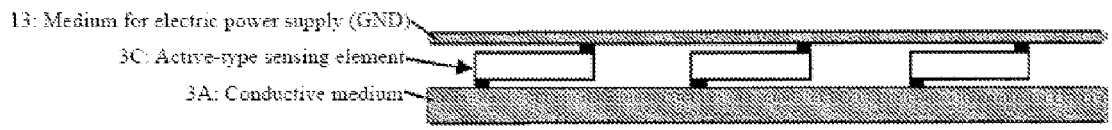
FIGS. 14(a), 14(b), and 14(c) are Figures, each showing an example of a current I/O type conforming to the present invention, where terminals of an active-type sensing element are connected to a base medium and medium for electric power supply.
Figure 14B:
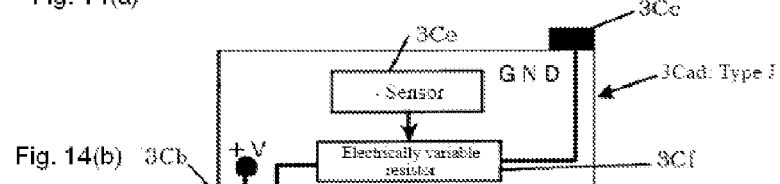

Another feature similar to the dispersed type is that by adopting a structure that acquires the electric power supply +V for the sensing terminal, the active-type sensing element requires only one medium for electric power supply for GND. As is the case with the dispersed type, the electric potential distribution of the base medium is caused to match the input range of +V of the sensing element. FIGS. 14(a), and 14(b) show an example where the terminals of an active-type sensing element are connected to the base medium and medium for electric power supply (GND), where FIG. 14(a) shows a general view, while FIG. 14(b) shows a single unit view of the active-type sensing element whose I/O current is changed by the electrically variable resistor in the element. The sensing element in FIG. 14(b) is a type J element (3Cad).

Figure 14C:
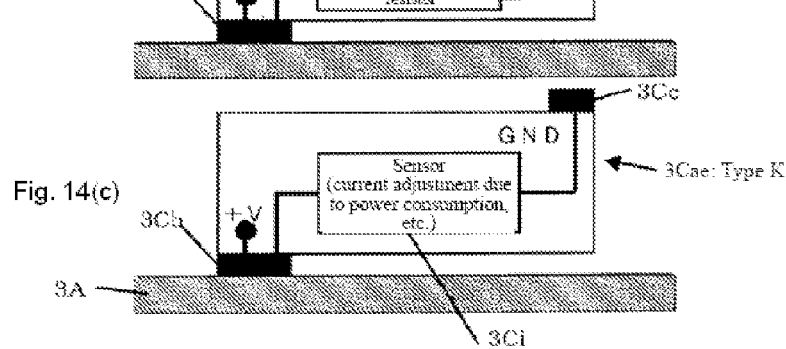

It is not always necessary to use electrically variable resistors, like the one in FIG. 14(b), for the active-type sensing element, and any implementation method can be used as long as the current I/O matches the detected quantity. If +V is acquired from the base medium, for example, the quantity of current flowing out of the base medium can be changed using a structure where the current consumption of the active-type sensing element is proportional to the detected quantity. FIG. 14(c) is a single unit view of an active-type sensing element (a type K element (3Cae)) whose current consumption changes by a sensor 3Ci according to the detected quantity. It is also possible to adopt a method whereby the output terminal of an active-type sensing element of voltage-output type is connected to the base medium in order to change the electric potential distribution of the base medium.

One feature of the current I/O type is that compared to the dispersed type, etc., of the resistivity distribution type, the electric potential distribution changes more when the resistivity value of the sensing element changes. With the dispersed type, the smaller the region occupied by the sensing element, the smaller the impact on the electric potential distribution becomes. With the current I/O type, however, the electric potential distribution can be influenced regardless of the size of the sensing element. This explains another major feature that, not only greater sensor sensitivity, but also greater flexibility and stretchability can be achieved by reducing the area occupied by the sensing element.

The foregoing presented examples of configurations, including those of the dispersed type, where sensing elements are divided into individual elements. However, configurations using a continuously structured sensing element can also be considered. This structure can be realized by sandwiching a continuous type between the base medium and medium for current I/O. For example, three sheets are layered including a conductive sheet constituting the base medium, pressure-sensitive rubber sheet corresponding to the sensing element, and conductive sheet constituting the medium for current I/O. The sheet constituting the medium for current I/O has no resistivity and is connected to GND. In a no-load condition, the resistivity of the pressure-sensitive rubber sheet is sufficiently higher than the resistivity of the base medium sheet. The injection current for the base medium uses 1 V and 5 V. When no external force is acting upon this structure, the injection current for the base medium mainly flows to the base medium and little current flows to the pressure-sensitive rubber sheet. Once pressure is applied to a given point on the layered sheets, however, the resistivity of the pressure-sensitive rubber sheet around that point drops and therefore current flows out to the medium for current I/O through the pressure-sensitive rubber sheet. As a result, the condition of current flowing through the base medium changes and consequently the electric potential distribution can be changed. This structure is considered very effective in the measurement of external force stimulation over a narrow region, among others, because even when acting pressure generates in a narrow range, a relatively large change occurs in the electric potential distribution.

As explained above, the current I/O type is considered very effective when active sensing elements requiring an electric power supply are used or in the case of measurement over a narrow region, among others.

(Compositing of PQDc Bodies)

Compositing of PQDc bodies is explained.

First, various PQDc body configurations such as the dispersed type and contact type are hereinafter referred to as "configuration elements." The PQDc body need not be always constituted by a single configuration element, but multiple configuration elements can also be combined. For example, a single composite PQDc body can be constituted by electrically connecting a small dispersed-type piece with a small contact-type piece. This is effective when measuring multiple target physical quantities in the region of a single PQDc body. Even when there is only one target physical quantity, it may still be effective to change the configuration according to the balance of sensitivity, stretchability, durability, etc. In these cases, the PQDc body is constituted by more than one configuration element.

Even when multiple configuration elements are used, the overall base medium of the PQDc body is still a single electrically coupled structure. Accordingly, the base medium need not be always divided into configuration elements, and multiple configuration elements may share the base medium. For example, a structure can be considered where sensing elements are arranged according to the dispersed-type configuration in the right half of one conductive rubber sheet, while conductive foams are arranged according to the contact-type configuration in the left half of the sheet.

On the other hand, the base medium in the region of one configuration element may be constituted by multiple base media made of different materials, respectively. For example, it is possible to use contact or other means to electrically connect a non-stretchable conductive film constituting the area near the outer periphery of the region, with a stretchable conductive rubber constituting the inner region. By arranging contact-type semispherical foams on this composite base medium, a structure can be constituted where the region of one configuration element is constituted by two types of base medium materials. This example is characterized by the ability to accommodate electrodes and wirings in the region of conductive film at the outer periphery or improve strength and durability by using the film region to affix a pedestal.

The base medium constituted by one material is hereinafter referred to as "base medium element." This means that the base medium is constituted by one or more base medium elements. The most general combination is one where one base medium element is combined with one configuration element. Representative examples of physical composition of base medium elements are explained below.

(1) Connected Structure

The connected structure is constituted by means of connecting the side faces of base medium elements.

Figure 17:
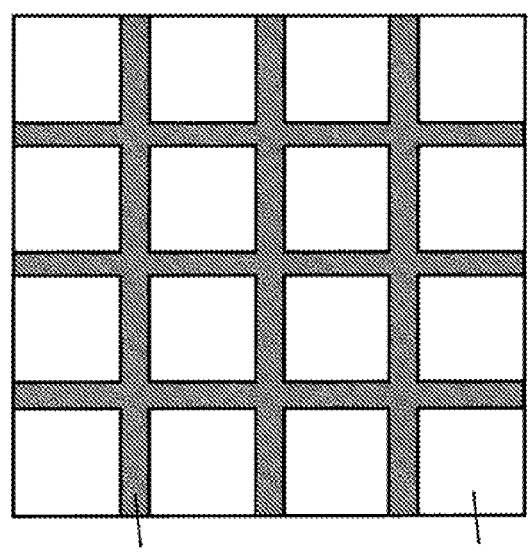
FIG. 17 is a Constitutional drawing of a base medium of an all-side connected structure type conforming to the present invention, where base medium elements are connected by conductive materials in a manner that the conductive materials surround a periphery of the base medium.

FIG. 16 is a constitutional drawing of a base medium of partially connected structure type where the base medium elements are connected by conductive materials. FIG. 17 is a constitutional drawing of a base medium of all-side connected structure type where the base medium elements are connected by conductive materials surrounding the periphery of the base medium.

The examples shown in FIGS. 16 and 17 are formed by means of connecting the side faces of base medium elements. In the case of partial connection, as shown in FIG. 16, the connection part (3Z: conductive material) need not have electrical resistivity. If all sides are contacted, as shown in FIG. 17, however, the connection part uses a material with electrical resistivity. Take note that in the example shown in FIG. 17, current will flow only through the connection parts if the connection parts are made of a material that does not have electrical resistivity.

Although the examples shown in FIGS. 16 and 17 are those of two-dimensional structures, a base medium or PQDc body of three-dimensionally connected structure can also be constituted by means of three-dimensionally connecting base medium elements, in which case the surfaces of base medium elements are connected. A three-dimensional structure can be realized by means of layering rectangular-solid base medium elements in a block form.

(2) Superposed Structure

Figure 18A:
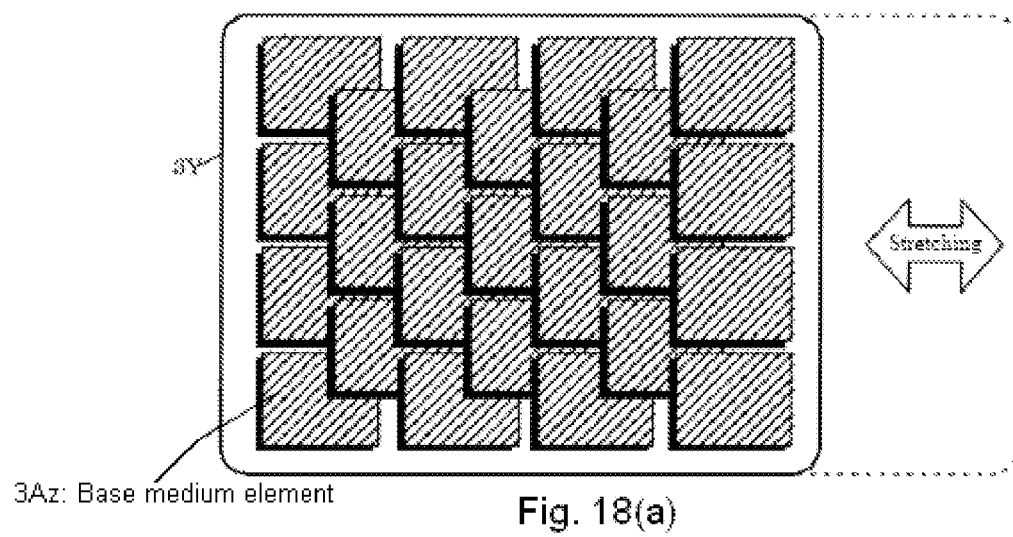
FIGS. 18(a), 18(b), and 18(c) are Constitutional drawings of a base medium of a superposed structure type conforming to the present invention, where multiple base medium elements are installed on an insulation sheet and the elements are partially overlapped and affixed.
Figure 18B:
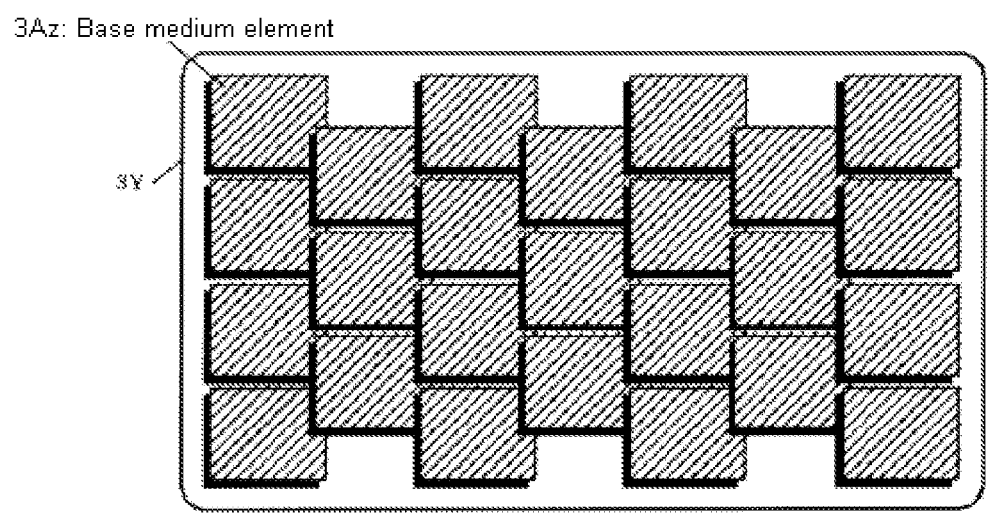
Figure 18C:
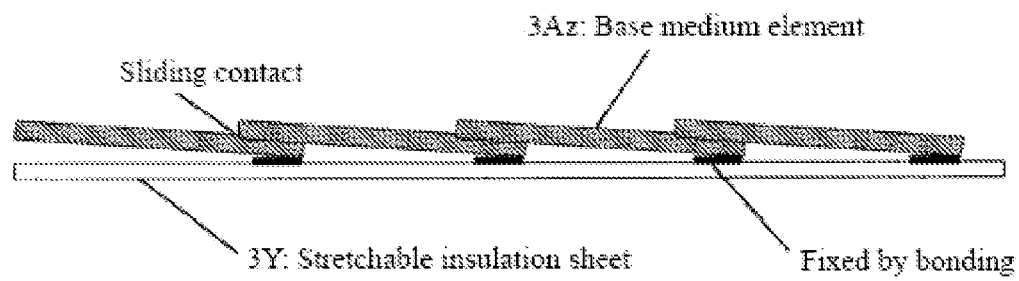

The superposed structure refers to a structure where multiple base medium elements are attached in an overlapping manner onto an insulation material in a scale-like pattern. The base medium elements contact with one another to provide electrical continuity. FIGS. 18(a), 18(b) and 18(c) are constitutional drawings of a base medium of superposed structure where multiple base medium elements 3Az are attached onto an insulation sheet 3Y and the base medium elements are partially overlapped with one another and affixed. This structure is explained in further detail later on in the section on the superposed and deformable type. Although the base medium element is a quadrangular plane in FIGS. 18(a), 18(b), and 18(c), the base medium element can have any shape. A three-dimensional structure can also be realized by placing many bead-shaped conductive bodies into a bag.

(3) Dispersed Structure

The dispersed structure refers to a structure where multiple base medium elements are dispersed on a conductive material.

Figure 19A:
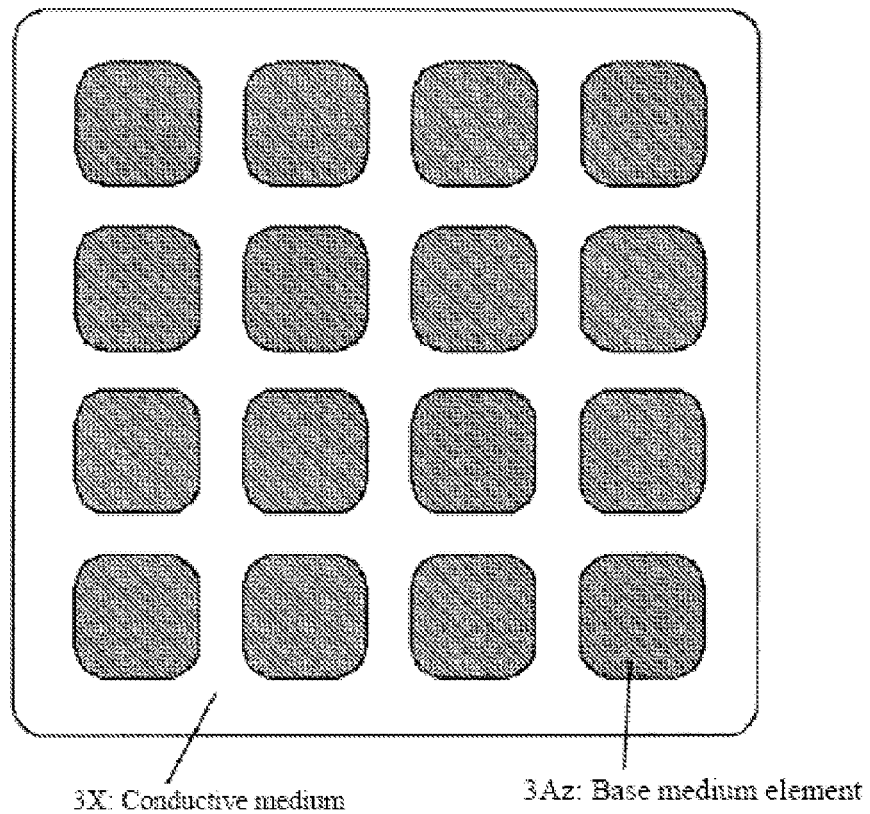
Figure 19B:
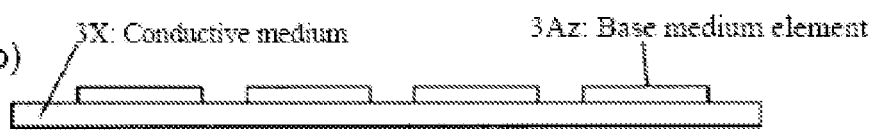

FIGS. 19(a) and 19(b) are constitutional drawings of a base medium of dispersed structure where base medium elements of an arbitrary shape are arranged on a conductive sheet with a space provided in between. FIG. 19(a) is a plan view of this base medium of dispersed structure, while FIG. 19(b) is a side view of the structure. The base medium elements are connected by contact, conductive glue or other means to provide electrical continuity. The conductive material must have a resistivity distribution. In addition to the aforementioned attaching configuration, a structure where base medium elements are embedded in a conductive material is also referred to as a dispersed structure. A three-dimensional structure takes the form of this embedded structure.

(Stretchable Implementation of PQDc Body)

How to add stretchability and flexibility to a PQDc body is described.

Stretchability and flexibility of a PQDc body are largely classified into stretchability and flexibility based on material and stretchability and flexibility based on structure. Material stretchability and flexibility are realized by using for the base medium a material offering high stretchability and flexibility such as a conductive rubber or conductive foam. On the other hand, structural stretchability and flexibility are realized by improving the stretchability and flexibility through adopting a base medium of net-like structure or porous structure by providing holes. With the latter method, stretchability can be added to a PQDc body made of a non-stretchable material or difficult-to-stretch material. Also, flexibility and stretchability can be further improved by combining the former method with the latter method. Several examples of structurally improving stretchability and flexibility are explained below.

(1) Superposed and Deformable Type

The superposed and deformable type is a composite superposed structure where an insulation material for attaching elements is stretchable. Various materials, such as rubber sheet, can be used for this stretchable insulation material.

FIGS. 18(a), 18(b) and 18(c) are constitutional drawings of a superposed and deformable type where base medium elements are affixed in a partially overlapping manner onto a stretchable insulation sheet. FIG. 18(a) shows a plan view of the PQDc body when the stretchable sheet is contracted, FIG. 18(b) is a plan view of the PQDc body when the stretchable sheet is stretched, and FIG. 18(c) is a side view of FIG. 18(b).

In the example shown in FIGS. 18(a), 18(b), and 18(c), the bottom of one side of a quadrangular planar base medium element 3Az is adhered as the bonding part onto the stretchable insulation sheet 3Y. The contact part, which is the bottom of the opposite side of the aforementioned bonded side of the base medium element, is constituted in such a way that it electrically contacts the top of the opposite side of the contact part of the adjacent PQDc body element. This means that, as shown in FIGS. 18(*a*), 18(*b*) and 18(*c*), multiple elements are attached in a scale-like pattern with the elements overlapping with one another. The base media are contacted by the contact parts to provide electrical continuity.

With the superposed and deformable type, the base medium elements retain electrical contact by overlapping with one another and thus can move when stretched to provide regional stretchability. Accordingly, this is an effective method to add high stretchability to non-stretchable or difficult-to-stretch conducive materials. As described in connection with the superposed structure, the PQDc body element need not be planar and can have any shape.

(2) Dispersed and Deformable Type

This is a composite dispersed structure where a stretchable conductive material such as a conductive rubber sheet is used. This is another effective method to add stretchability to conventional non-stretchable PQDc bodies.

(3) Net-Like Structure Type

Stretchability and flexibility can be added by using a net-like material pattern. For example, conductive fibers, fiber-like conductive resins, etc., can be woven into a net-like or mesh form. This also includes structures where fibers are entwined, such as cotton wool, steel wool, etc. Needless to say, greater stretchability and flexibility can be achieved if the material is stretchable.

(4) Porous Structure Type

Figure 20:
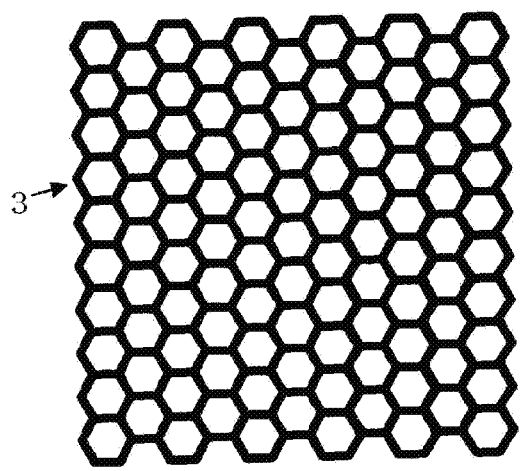
FIG. 20 is a Constitutional drawing of a PQDc body of a porous structure type conforming to the present invention, where many holes are provided in the PQDc body.

With a structure constituted by a difficult-to-stretch sheet having many holes, stretchability and flexibility can also be added in the same manner with a net-like structure, although the degree of stretchability and flexibility is somewhat limited. For example, a structure constituted by a formed conductive sheet, etc., with many holes can be considered. FIG. 20 is a constitutional drawing of a porous-structure PQDc body constituted by a PQDc body with many holes provided in it.

Although sheet resins virtually have no stretchability, forming them into a structure having narrow parts often results in local bendability, which increases the overall deformability. The same is true with three-dimensional shapes. If a porous sheet or block made of stretchable material is used, greater stretchability can be obtained. Here, too, use of a stretchable material such as conductive rubber sheet or conductive foam provides even greater stretchability and flexibility.

The aforementioned methods can be used to add stretchability and flexibility to the base medium or increase its stretchability and flexibility. Since the base medium only needs to be a large single conductive body, one prominent feature of the present invention is that it offers significantly improved configuration freedom compared to conventional structures having many wirings. In addition, use of a net-like structure or porous structure not only increases stretchability and flexibility, but it also helps constitute a structure that is lightweight and offers excellent heat discharge performance, ease of wiring, maintenance, etc.

(Electrode and Wiring Configuration)

The electrode and wiring configuration is explained.

The PQDc body has electrodes 4*a* for injecting current and measuring electric potential distribution. The estimation accuracy of target physical quantity changes according to the number and arrangement of electrodes. Although the estimation accuracy changes according to the arrangement of electrodes, a general trend is for the accuracy to improve as the number of electrodes increases. Conversely, the number of electrodes can be reduced if lower accuracy is acceptable. At least two electrodes are used for injecting current, so the remaining electrode or electrodes are used to measure the electric potential distribution. In other words, at least three electrodes are required. If the number of electrodes is insufficient, on the other hand, measurement data cannot be obtained that provides electric potential distribution, in which case a resolution significantly higher than the number of electrodes cannot be achieved. For this reason, it is considered that at least around six electrodes are needed to estimate physical quantity distribution at a resolution significantly higher than the number of electrodes. Accordingly, the present invention adopts six or more electrodes. In actual use, it is desirable to use around 10 electrodes or more.

The estimation accuracy tends to improve as more electrodes are arranged in a more uniform and more evenly dispersed manner. Under the present invention, however, the basic structure limits electrodes and wirings to a partial region to ensure a region of high stretchability and flexibility.

Figure 39:
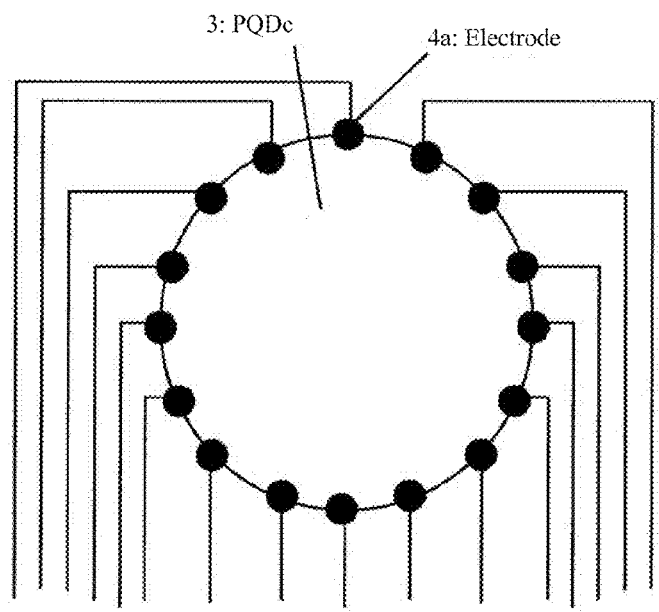
FIG. 39 is a Constitutional drawing of a circular PQDc body conforming to the present invention, where electrodes are arranged at a boundary of the PQDc body.

The most basic arrangement for installing electrodes in a partial region is a configuration where electrodes are arranged at the boundary of the PQDc body. FIG. 39 is a constitutional drawing of a circular PQDc body having electrodes arranged at its boundary. In the example shown in FIG. 39, 16 electrodes are arranged. If the PQDc body has a circular shape, as shown in FIG. 39, electrodes are arranged around the boundary of the PQDc body. If the PQDc body has a quadrangular shape, electrodes are arranged on each side. If the PQDc body has a three-dimensional shape, electrodes are installed at the surface. It is considered that in a configuration where the PQDc body is surrounded by electrodes at its boundary, the accuracy increases proportionally to the number of electrodes. This conclusion is derived by analogy from EIT explained later.

Figure 40:
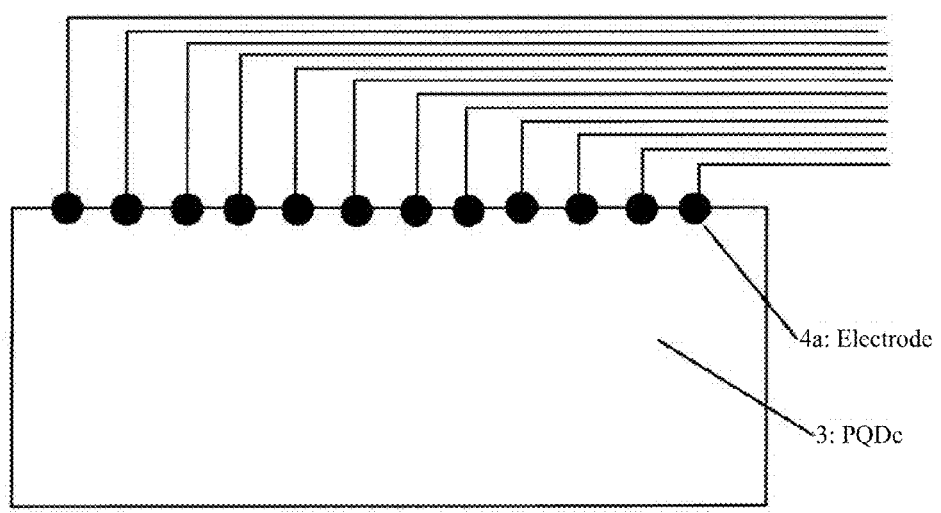
FIG. 40 is a Constitutional drawing of a rectangular PQDc body conforming to the present invention, where electrodes are arranged unevenly along one side of the PQDc body.

Also, electrodes can be arranged unevenly in a partial region. FIG. 40 is a constitutional drawing of electrodes arranged unevenly on one side of a rectangular PQDc body. In this case, electrodes are not surrounding the PQDc body at its boundary, and accordingly the estimation accuracy becomes higher at points closer to the electrodes and lower at points farther away from the electrodes. This structure is effective when the PQDc body has an open end and requires high flexibility and deformability.

The most basic constitution is one where electrodes are arranged at the boundary of the PQDc body, as shown in FIGS. 39 and 40. However, electrodes need not always be arranged at the boundary, and if possible they should be selectively arranged in the inner region of the PQDc body because it enables estimation at higher accuracy. FIG. 21 is a constitutional drawing of a rectangular PQDc body having non-stretchable regions near both ends and a stretchable region near the center, where electrodes and wirings are provided in the non-stretchable regions. Since the stretchable region is limited to some extent, electrodes are dispersed in the non-stretchable regions. Such PQDc body has a large area near the center and is stretchable, and thus is effective when the sensor is installed at the elbow joint or knee joint, as shown in FIG. 29. At the same time, this PQDc body tends to offer greater accuracy than when electrodes are arranged simply at the boundary of the PQDc body.

FIG. 23 is a constitutional drawing of a PQDc body of ear shape, where electrodes are arranged unevenly in the non-deformable region near the base of the ear. When designing ears with tactile sensing ability for a robot simulating a human head, it is necessary to ensure that the ears have flexibility and deformability, although their base should remain relatively hard. Here, a constitution such as this one functions effectively.

The present invention is based on the concept of limiting the electrodes to partial regions and increasing the stretchability and flexibility in regions where no electrodes or wirings are present. Accordingly, increasing the stretchability decreases the number of electrodes and limits the arrangement of electrodes, meaning that, simply put, the estimation accuracy and stretchability are mutually exclusive. Accordingly, specific examples of efficiently achieving the two characteristics are given below.

When installing a PQDc body of a tactile distribution sensor on a robot's elbow or knee, it is normally difficult to install electrodes in the applicable region because bending the elbow joint generates a significant stretching difference between the front face and back face of the elbow. However, the side face of the elbow generates virtually little stretching even when the elbow angle changes. In other words, stretching occurs in limited regions at the front and back of the elbow. FIG. 30 (a) shows a robot's elbow joint, while FIG. 30 (b) shows a rectangular PQDc body attached to near the elbow. In FIG. 30 (b), the shaded area near the elbow joint is stretched as the elbow is bent. When FIG. 30 (b) is viewed carefully, it is found that the forearm, upper arm and side face passing the joint center do not stretch even when the elbow is bent. Accordingly, it is possible to arrange electrodes on the upper arm, forearm and side face in a manner surrounding the stretchable region, as shown in FIG. 31 (a). In particular, the upper arm and forearm have relatively large non-stretchable regions, and thus electrodes are selectively arranged in a manner covering these regions. This way, the electric potential distribution can be measured more accurately while accommodating greater stretching around the elbow joint, possibly improving the estimation accuracy. Needless to say, a similar constitution can be applied for the knee joint, etc.

Next, installation of a tactile distribution sensor, etc., at the fingertip of a robot is considered. The pulp of the fingertip must have flexibility and high sensitivity because this area is used to pinch or otherwise contact objects. On the other hand, such requirements are relatively low on the fingernail side of the fingertip. Therefore, high flexibility can be ensured by providing a region for electrodes and wirings on the fingernail side while eliminating electrodes and wirings on the pulp side of the finger, as shown in FIGS. 22(a) and 22(b). With conventional fingertip sensors that require wirings on the pulp of the finger, realizing such high flexibility is difficult. According to the present invention, however, a fingertip tactile sensor that is significantly different from conventional sensors can be realized. FIGS. 22(a) and 22(b) are constitutional drawings of a PQDc body used for fingertips. FIG. 22(a) is an imaginary view of the PQDc body for fingertips installed at the fingertip, while FIG. 22(b) is a perspective view of the PQDc body for fingertips. In FIG. 22(b), electrodes are arranged on the fingernail side, while no electrodes are arranged on the pulp of the finger, where this constitution can easily provide flexibility and deformability on the pulp side.

Figure 25:
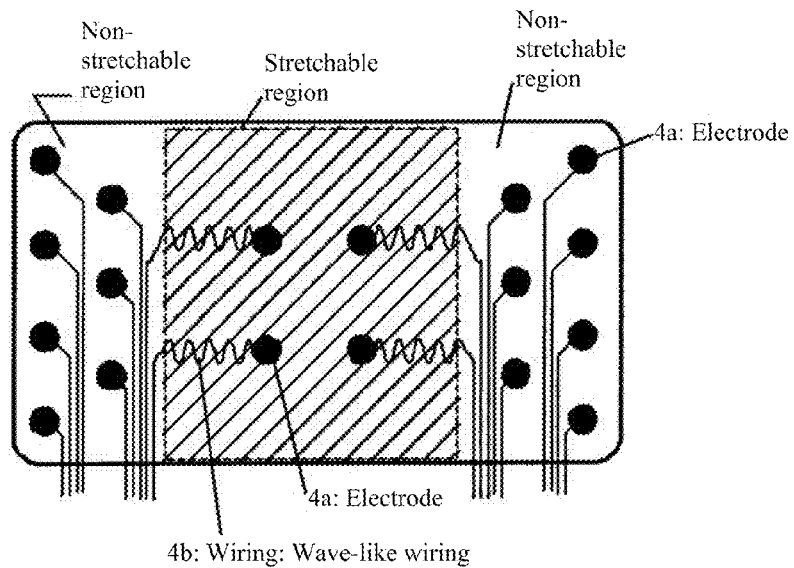
FIG. 25 is a Constitutional drawing of an example conforming to the present invention, where stretchable wave-like wirings are implemented in a stretchable region.

The foregoing explanation assumed not implementing electrodes and wirings inside the stretchable region. To increase accuracy, however, it is desirable to provide electrodes also in the stretchable region if permitted by the situation. If both the stretchability and wiring requirements are to be satisfied, stretchability can be realized by implementing wirings in wave-like patterns or using stretchable conductive materials, etc., although the number of wirings cannot be increased too much, partly because these wirings take time to implement, and partly because use of a large number of wirings presents problems such as interference among wirings. However, there are cases where a small number of wirings can be implemented with sufficient ease. Without doubt, the estimation accuracy should increase if at least several electrodes are provided in the stretchable region. FIG. 25 is a constitutional drawing of a case where, on the rectangular PQDc body shown in FIG. 21, four electrodes are provided in the stretchable region near the center and the electrodes are wired in wave-like patterns in a stretchable manner.

Also, a constitution where the entire PQDc body is stretched is possible by electrically connecting the PQDc body and electrodes by means of sliding contact. FIGS. 24(a) and 24(b) show a constitutional drawing of a fully stretchable PQDc body providing electrical continuity via contact, where the structure is constituted by electrodes and stretchable PQDc body that are electrically connected by means of sliding contact. In FIGS. 24(a) and 24(b), electrodes and wirings are provided on a non-stretchable circuit board 27, and the non-stretchable circuit board 27 is installed on a stretchable PQDc body to electrically connect the electrodes and PQDc body by means of sliding contact. FIG. 24(a) is a plan view showing a PQDc body in a contracted state, while FIG. 24(b) is a plan view showing the PQDc body stretched to the left and right from the condition in FIG. 24(a).

To maintain electrical connection, this structure must be operated under a condition where the PQDc body is constantly pressed toward the electrodes.

(Details of Measurement)

Details of measurement are described.

First, a representative example is given to provide an overview of measurement. The base medium has multiple electrodes installed on it, and these electrodes are connected to an electric signal processing part 6 via wirings. The electric signal processing part 6 receives a command from a measurement program comprising a measurement procedure and applies voltage between the specified electrodes to supply injection current, and then measures the generated electric potential distribution using all electrodes. Multiple different combinations of electrodes are used to supply injection current, and the voltage value of electric potential distribution is measured for each combination. Thus measured voltage values and data regarding injection current are sent by means of communication, etc., to the computation processing part for estimation that performs estimation calculation, and then passed on to an estimation program comprising an estimation procedure. Based on the above, details of measurement are explained in greater depth.

Injection current is injected into the base medium using two or more electrodes. Current is supplied by giving an electric potential difference between the electrodes, or by directly controlling the quantity of current of the electrodes. In the latter case, an electric potential difference is generated between the electrodes because the base medium has electrical resistivity. Accordingly, the voltage and current values of electrodes are set in such a way that an electric potential difference is generated between at least two of the electrodes.

This injection current must be supplied to the PQDc body through paths of current flows of multiple patterns. If current is injected by combining only two electrodes, the quantity of current flowing through the base medium changes uniformly even when the electric potential difference changes between the electrodes for current injection, and normally the path of current flow itself does not change. In a case where two electrodes are combined, therefore, the pattern of path of current flow is changed by changing the combined electrodes.

If injection current is supplied based on a combination of three or more electrodes, on the other hand, changing the balance of electric potential difference among the electrodes changes the direction of current flow even when the combined electrodes remain the same. For example, assume that the three electrodes a, b and c for current injection have voltage values of 5 V, 5 V and 1 V, respectively. In this case, current flows from a and b to c, but not between a and b. If voltage values of 3 V, 1 V and 5 V are given to the same electrodes, however, current flows from a and c to b, and also from c toward a. In other words, the path of current flow changes when the relative ratio pattern of electric potential difference among the electrodes for current injection becomes different, even when the combined electrodes remain the same. Accordingly, when there are three or more electrodes for current injection, the pattern of path of injection current flow is changed by changing the combined electrodes or setting the injection current so as to change the relative ratio pattern of electric potential difference among the electrodes. Under the present invention where use of electrodes in the inner region is assumed, injecting current using three or more electrodes may prove effective.

The greater the number of injection current patterns, the greater the estimation accuracy of target physical quantity distribution becomes, as a rule. This is because the quantity of information that can be used for physical quantity estimation increases in regions where no electrodes are present. It should be noted, however, that injecting current through similar paths will not improve the estimation accuracy. Although no specific rules exist regarding the minimum number of injection current patterns, it is desirable to have six or more patterns, in line with the minimum number of electrodes, partly because data from various directions is required, and partly because the number of electrodes provides a rough guide for determining the number of patterns.

Normally, electric potential is measured for all electrodes excluding the electrodes for current injection. Of course, electric potential can be measured only for certain electrodes, or for all electrodes including the electrodes for current injection, if necessary. It is also possible to measure the electric potential difference between electrodes, instead of measuring the voltage values of individual electrodes.

(Electric Signal Processing Part and Computation Processing Part for Measurement)

The electric signal processing part 6 and computation processing part for measurement 7 are described.

The electric signal processing part 6 has a function, among others, to inject current to specified electrodes, measure the voltage values of specified electrodes, and transmit measured results, etc., to the computation processing part for estimation 7 by means of communication, etc., according to commands received from a measurement program comprising a measurement procedure and executed by the computation processing part for measurement 7. The computation processing part for measurement 7 may be installed externally to the electric signal processing part 6, or the electric signal processing part 6 may have dual roles to also serve as the computation processing part for measurement 7. In the former case, the constitution is such that commands are sent to the electric signal processing part 6 by means of communication, etc. In the latter case, generally a single-chip microcomputer, etc., is implemented that can measure voltage and also control current input and output.

If the DC resistivity component of the base medium or sensing element reacts to the target physical quantity, the implementation should assume DC injection current and measurement voltage. If the AC resistivity component reacts to the target physical quantity, on the other hand, injection current is given as signals of sine waves or other appropriate waveforms and when voltage values are measured, these signals are measured as waveforms or electrode signals by converting them to DC using a filter circuit, etc. Measured signal waveforms undergo signal processing by a FFT, filter, etc., using a program in the electric signal processing part 6 or computation processing part 7, to be converted to data such as signal intensity.

As long as the aforementioned functions are implemented, the electric signal processing part 6 and computation processing part for measurement 7 can be implemented in any manner. The following explains this implementation using specific examples, to show its feasibility.

Current is injected using the voltage output or current output of a DA (digital-analog) converter, or if the target is DC resistivity, via a simple DO (digital out) output, among others. If AC signals are handled, waveforms are output from a DA converter, or a waveform generation circuit is used. Since relatively large current quantity may be required for injection current, a circuit may be added to allow for drawing of large current using a buffer circuit, etc.

Generally measurement of electric potential uses an AD (analog-digital) converter, etc. The input impedance of an AD converter must be sufficiently high so as to reduce the impact on electric potential measurement. It is also effective to provide a buffer circuit of high input impedance, such as an operational amplifier, before the AD converter. Also, electric potential may be measured simultaneously using all electrodes for electric potential measurement, or a method to measure electric potential using the electrodes individually or in groups of smaller numbers is also effective in order to minimize the impact of the input impedance of the AD converter. In these cases, the applicable electrodes may be specified in the measurement program or implemented directly in the electric signal processing part 6.

Also, the measurement program comprising a measurement procedure issues commands to each electrode to connect to a DA converter, AD converter, or neither. This switching is generally implemented using an analog switch.

As mentioned above, a general configuration is one where the electric signal processing part 6 receives commands from the computation processing part for measurement 7. Since this measurement procedure is not very complex, equivalent processing can be performed using a FPGA or logic circuit, etc. Accordingly, the explanation includes cases where a FPGA or logic circuit, etc., is used.

(Measurement Program)

The measurement program comprising a measurement procedure is described.

First, the ith pattern among N number of injection current patterns is referred to as "pattern i" ($1 \leq i \leq N$).

Two or more electrodes for current injection are set for pattern i, and the applied voltage value or current value is set for each electrode. The electrodes for voltage measurement are also numbered.

The above data set is provided for patterns 1 to N. These data sets are sent to the electric signal processing part 6 as commands by means of communication, etc. All data sets may be sent at once, or each data set may be sent for each pattern number at an appropriate measurement timing.

The number of injection current patterns is at least six, and the injection current settings ensure generation of electric potential difference between at least two electrodes. If injection current is set by voltage value, for example, at least two of the electrodes for current injection have different voltage values. If injection current is set by current value, on the other hand, at least two electrodes have a current value other than "0." In general, voltage is measured using all electrodes excluding the electrodes for current injection, and voltage is measured using at least four electrodes among the total electrodes of minimum six, less the minimum two electrodes for current injection. Take note that in a constitution where all electrodes are always used to measure the voltage value, no commands are necessary from the measurement program comprising a measurement procedure.

The following defines certain expressions used in connection with current injection and electric potential measurement required in the subsequent explanations. First, the total number of electrodes is given as M, while the number of injection current patterns is given as N. The data relating to measured voltage in a given injection current pattern is expressed as the measured electric potential distribution data vm, while the measured electric potential distribution data in injection current pattern i is given as vmi. Since "$1 \leq i \leq N$," there are N number of vmi from vm1 to vmN. All of these vmi data from vm 1 to vmN is expressed as the whole measured electric potential distribution data Vm. Similarly, the data relating to injection current is given as the injection current data a, while the injection current data in injection current pattern i is given as the injection current data ai, and accordingly there are N number of injection current data from a1 to aN and all of these ai data from a1 to aN is expressed as the whole injection current data A.

Implementation examples of vm, a, Vm, A, etc., are also given. For example, the measured electric potential distribution data vm consists of two elements of evm and vvm, where vm is indicated as vm=[evm, vvm], etc. Here, evm and vvm are vectors, each comprising M number of components, where evm is binary data indicating whether or not each electrode is set for electric potential measurement, and the measured voltage value is set in vvm. The whole measured electric potential distribution data Vm can be indicated as Vm=[vm1, vm2, . . . , vmN], etc. Similarly, the injection current data a comprises two elements of ea and aa, where a is indicated as a=[ea, aa], etc. Here, ea is binary data indicating whether or not each electrode is set for current injection, while aa is the value of voltage or current to be impressed on the electrode for current injection, where the whole injection current data A is indicated as A=[a1, a2, . . . , aN], etc.

(Overview of ρ Estimation)

An overview of the calculation to estimate the target physical quantity distribution ρ is explained.

Under the present invention, the target physical quantity distribution that acts upon the PQDc body is estimated from the whole measured electric potential distribution data Vm, etc., acquired by the electric signal processing part 6, but essentially the implementation method is not limited in any way as long as the ρ estimation calculation is feasible based on Vm, etc. Still, several specific examples of estimation methods are explained below to show that such calculation is actually feasible. First of all, ρ estimation methods are largely classified into the following two types:

(1) Direct ρ estimation method: ρ is estimated directly from Vm, A, etc.
(2) Through-γ estimation method: First the resistivity distribution γ is estimated from Vm, A, etc., and then γ is converted to ρ.

The ρ estimation calculation is hereinafter abbreviated as "ρ estimation" and the γ estimation calculation, as "γ estimation." What is referred to as EIT is a type of γ estimation technique used in the through-γ estimation method. EIT has relatively limited use configurations, and it does not include the ρ estimation or γ estimation under the present invention. However, it basically represents a similar technique. Also, the direct ρ estimation method can be understood easily when the method is examined based on the γ estimation technique. Accordingly, EIT is explained before explaining the ρ estimation or γ estimation under the present invention are explained.

The following introduces the unique mathematical expression of "ans←func<x, y, z>" for the purpose of convenience. This indicates that the calculation routine func references the data x, y and z in < > to calculate the result as ans. The number of referenced data in < > is arbitrary. If there are two reference data, the above expression becomes ans←func<x, y>. If there is only one reference data, the expression becomes ans←func<x>. Various implementation examples can be considered for this process, such as a case where the function func that returns ans using the parameters x, y and z is implemented as a=func(x, y, z), case where ans, x, y and z are used as global variables and referenced or assigned from within func, and case where an object is defined that comprises elements including the variables ans, x, y and z, routines to access these variables and process routine func( ), etc. Under the present invention, any implementation method can be used as long as an equivalent calculation is feasible. Also note that "~" indicates an inverse matrix. For example, "Y~" indicates an inverse matrix of matrix Y, while "(A+B)~" indicates an inverse matrix of (A+B).

(About EIT)

EIT (Electric Impedance Tomography) is a technique to estimate the resistivity distribution γ of a conductive body. This technique was developed to substitute CT (Computed Tomography) scan for medical use in order to mainly provide estimate tomographic images of the human chest.

The calculation principles of EIT can be easily understood from the visual cone intersection method, CT scan and other similar methods that are used widely. The visual cone intersection method is a technique to estimate the shape of an object from the object's silhouette alone. When light is irradiated onto an object, the generated silhouette provides some information regarding the shape of the object. Of course, one silhouette alone only reveals a sectional shape of the object. By irradiating light from various angles to measure many sets of silhouette data and analyzing these silhouettes in a comprehensive manner, however, the object's shape can be estimated in greater detail. Under the visual cone intersection method, images of an object are captured from various directions using multiple cameras and the obtained silhouettes alone are used to estimate the three-dimensional shape of the object based on the above principle.

Now, use of X-ray instead of light is considered. When X-ray is used, shadows with different degrees of gradation, not simple shadows, can be obtained according to the transmissivity of X-ray. As mentioned above, X-ray is irradiated onto the object from various directions to measure many sets of gradation shadows and these shadows are analyzed in a comprehensive manner, to estimate the external shape as well as internal structure of the object. This is the principle of CT scan for medical use. In CT scan, X-ray is irradiated from around the torso, for example, to measure one-dimensional gradation shadows and analyze these shadows by inverse problem analysis to calculate tomographic images of the human body.

Current can be used instead of light or X-ray. The human body is conductive and has electrical resistivity distribution. Accordingly, supplying current through the torso, etc., generates an electric potential gradient along the path of current flow because of the resistivity distribution, and consequently an electric potential distribution occurs in the region through which the current passes. Normally, current flows diffusely across the conductive body, and therefore electric potential can also be observed on the body surface. Since the overall electric potential distribution changes according to the resistivity distribution, the electric potential distribution on the body surface also changes to some extent according to the resistivity distribution in the human body. In a sense, this electric potential distribution on the body surface is equivalent to the shadow created by light. Accordingly, the resistivity distribution in the human body can be estimated and the position or shape of an internal organ can be grasped by supplying current from various directions to measure the electric potential distributions generated on the body surface, and then analyzing the measured distributions in a comprehensive manner. This technique is referred to as "EIT," which was developed to substitute CT scan in order to mainly provide estimate tomographic images of the human chest. While CT scan uses X-ray to calculate tomographic images of the human body based on the X-ray transmissivity distribution in the body, EIT uses current to calculate tomographic images of the human body based on the resistivity distribution. In reality, around 16 electrodes are attached to the body surface around the chest to compute tomographic images representing the lung, heart and other internal organs in the chest.

EIT is described in further detail. First, multiple electrodes are arranged over a conductive body having a given resistivity distribution in a manner surrounding the conductive body at the boundary. In a representative example, around 16 electrodes are arranged at the boundary of a circular conductive body. In the case of a three-dimensional structure, electrodes are arranged on the surface. When current is supplied between two electrodes, the injection current not only advances straight between the electrodes, but also flows diffusely across the conductive body. If the injection current is DC or when the current signal frequency is sufficiently low, basically the current flows over the entire region of the conductive body. Due to the resistivity distribution, an electric potential gradient is generated along the path of current flow according to the Ohm's law. Accordingly, the electric potential distribution can be observed in the region though which the current passes. This electric potential distribution is measured using the electrodes installed at the boundary of the conductive body. The measured electric potential provides partial information regarding electric potential distribution but it also provides information that is somewhat influenced by the resistivity distribution in the inner region. Also, current is injected through different paths based on different electrode combinations and the generated electric potential distributions are measured. By repeating the above steps, electric potential distribution data is measured for multiple injection current patterns.

The resistivity distribution $\gamma$ of the conductive body is estimated from the aforementioned whole injection current data A and whole measured electric potential distribution data Vm. In general, a mathematical problem of obtaining the electric potential distribution v from the injection current a and resistivity distribution $\gamma$ corresponding to a single injection current pattern can be computed directly. Specifically, such mathematical problem can be computed by applying the finite element method, etc., to an electromagnetic model of the conductive body, and is therefore considered as a forward problem. In EIT, an inverse of this problem is calculated, or specifically the resistivity distribution $\gamma$ of the conductive body is calculated from the whole measured electric potential distribution data Vm and whole injection current data A. Various implementation methods can be used to calculate this inverse problem, such as analytical methods, methods that use a forward model iteratively, methods using linear approximation, and learning type methods using a neural network, etc. These methods are explained in detail in the next section.

In a representative example of EIT, a standard constitution is one where the measurement target is assumed as a two-dimensional circular conductive body and 16 to 32 electrodes are arranged evenly around the circumference of the conductive body. A frequently used pattern of injection current is to inject current between two adjacent electrodes and change the electrode combination sequentially around the circle in order to generate injection current patterns of the same number as the electrodes. Then, the electric potential distribution corresponding to each injection current pattern is measured using the electrodes. In general, the resistivity distribution is estimated via inverse problem analysis by calculating a forward problem model iteratively. For example, a predicted resistivity distribution $\gamma i$ is set and the predicted electric potential distribution Vi that is generated in the electrodes when current is injected to this $\gamma i$ is calculated using a forward problem, and then $\gamma i$ is updated using the least square method, etc., so as to bring this Vi closer to the measured Vm. By iterating this procedure, $\gamma i$ becomes closer to the actual resistivity distribution as Vi becomes closer to Vm. The target current can be either DC or AC, so the resistivity distribution in EIT indicates a resistivity distribution relative to AC, or specifically an electric impedance distribution.

The differences between the present invention and EIT are clarified:
(1) In EIT, the conductive body is not a part of the apparatus, but is given as a measurement target, a good example of which is the human body. Under the present invention, on the other hand, the conductive body is a part of the apparatus and also an artificial part constituted in such a way that the condition of its current flow changes when the target physical quantity acts upon the conductive body. This is the major difference between the present invention and EIT.
(2) In EIT, there is a tacit assumption that the electrodes are arranged on the surface of, but not inside, the human body, etc., to perform measurement in a non-invasive manner. Under the present invention, however, electrodes are assumed to be arranged in the inner region to improve the accuracy or stretchability.
(3) In EIT, the shape of the sensing region of the conductive body is fixed. Under the present invention, however, the shape of the sensing region is expected to change due to stretching and thus processes that account for this shape change, such as inverse problem analysis, are included.
(4) In EIT, only the resistivity distribution $\gamma$ is estimated. Under the present invention, the target physical quantity distribution $\rho$ is estimated.

($\gamma$ Estimation)

Various methods of $\gamma$ estimation are described.

The $\gamma$ estimation used by the through-$\gamma$ estimation method under the present invention estimates the resistivity distribution $\gamma$ from the voltage measured in a partial region inside the base medium. Unlike EIT, the present invention also assumes arrangement of electrodes in the inner region, and also encompasses cases where the shape of the sensing region of the conductive body changes due to stretching of the PQDc body. Accordingly, $\gamma$ estimation is explained by expanding the estimation using EIT.

First, a case where an electromagnetic model of a conductive body is explicitly used is described. A conductive body can be modeled electromagnetically based on the Maxwell's equation as long as data is available regarding the shape and resistivity distribution $\gamma$ of the conductive body. For example, "$\nabla \cdot (\sigma \nabla \phi) = 0$" ($1/\sigma$: electric impedance, $\phi$: electric potential) can be derived from the Maxwell's equation, and this can be used to build a mathematical calculation model using the FEM (finite element method), BEM (boundary element method), etc. One relatively simple technique is to connect the resistivities of two terminals in a mesh pattern to approximate the result. In this case, the local condition can be expressed by a linear equation by using, for example, the Ohm's law, in which case the overall condition is expressed by simultaneous linear equations using a matrix and vectors such as "Y*vv=aa." Y is a matrix based on mesh structure data derived from the resistivity distribution γ and conductive body shape, vv is a vector indicating the electric potential at a grid point of mesh, and aa is a vector indicating the value of current flowing into/out of a grid point of mesh. When the inverse matrix Y~ of this Y is calculated, "vv=Y~*aa" is obtained. This is an approximation calculation formula for the electric potential distribution vv that generates when aa is given as a condition for current flow to the resistivity distribution γ. Here, aa should reflect the injection current, while Y should reflect the information obtained from the mesh model representing the resistivity distribution and shape of the conductive body. The foregoing is only one example of an electromagnetic model, and the electric potential distribution data v generating at a given electrode position on the conductive body can be obtained through various modeling techniques from the resistivity distribution γ, information μ relating to the shape of the conductive body and electrode positions, and injection current data a. This is hereinafter expressed by "v←fr<γ, a, μ>," which is regarded as a forward problem. Take note that μ is regarded as an expression of arbitrary data having enough information needed to build an electromagnetic model and determine the electrode positions, because the expression pattern varies according to the electromagnetic modeling method, mesh constitution, and so on. This information is hereinafter referred to as "model information μ." Basically, the injection current data a represents the electrode on the conductive body into which current is injected, and the value of current input or output to/from the electrode. Or, a may represent the value of voltage impressed on the electrode. When "Y*vv=aa" is used, for example, it is sufficient that either the aa or vv element is a variable. In the case of Y'*[vv1, vv2]=[aa1, aa2] where vv1 and aa2 are variables, the expression can be rephrased as Y'*[vv1, aa2]=[aa1, vv2], meaning that current can be injected by means of voltage impression. Take note that in EIT, generally the shape of the PQDc body does not change, or in other words μ is constant, and thus normally μ is not explicitly expressed. However, sometimes μ changes according to the shape change as explained later, and therefore μ is explicitly expressed under the present invention.

Under the present invention and EIT, multiple injection current patterns, such as N number of patterns, are assumed. All of these multiple injection current data of a1, a2, . . . , aN is integrally expressed as whole injection current data A=[a1, a2, . . . , aN]. Also, the electric potential distribution data corresponding to a1, a2, . . . , aN, respectively, are given as v1, v2, . . . , vN, all of which is integrally expressed as whole electric potential distribution data V=[v1, v2, . . . , vN]. These are calculated by v1←fr<γ, a1, μ>, v2←fr<γ, a2, μ>, . . . , vN←fr<γ, aN, μ>. All of these N number of calculations are integrally expressed as V←Fr<γ, A, μ>. This represents a forward problem calculation for computing the whole electric potential distribution data V from the resistivity distribution γ, whole injection current data A and model information μ.

On the other hand, the calculation of the resistivity distribution γ from the whole measured electric potential distribution data Vm, whole injection current data A and model information μ is expressed as γ←Ir<Vm, A, μ>. This is regarded as an inverse problem of the forward problem V←Fr<γ, A, μ>. Take note that the whole measured electric potential distribution data Vm is expressed as Vm=[vm1, vm2, . . . , vmN], where the element vmi (1≦i≦N) is the electric potential distribution data measured by the electrodes when the injection current ai, which is each element of the whole injection current data A, is given to the conductive body.

In relatively many cases the same values are always used for the whole injection current data A and model information μ. This is generally the case with EIT. In this case, implementations are also possible where A and μ are given as internal variables of Ir and Fr or embedded into the applicable process routines. Accordingly, some implementations may be interpreted as not explicitly referencing A or μ, and therefore more general formats should be to express the forward problem calculation as V←Fr<γ> and inverse problem calculation as γ←(Ir<Vm>. However, A and μ are explicitly expressed in the subsequent explanation for the purpose of greater clarification. It is hereby specified that in all cases explained below, an expression where A and μ are omitted represents the upper-level expression format.

The calculation of γ←Ir<Vm, A, μ> can be performed mainly using two methods: a method to compute γ analytically, and a method to compute γ as an approximate solution. The former method generally involves difficult calculations, so normally the latter method of approximate solution is often used. Among various types of this method, the method to solve an inverse problem by utilizing a forward problem of Fr iteratively is most generally used. For example, an appropriate value of predicted resistivity distribution γi is set, and then the whole computed electric potential distribution data Vi corresponding to γi is obtained by Vi←Fr<γi, A, μ>. When γi is changed appropriately and Vi is computed again, Vi can be brought slightly closer to Vm. In other words, iterating the changing of γi, computation of Vi and comparison of Vm and Vi allows Vi to be brought gradually closer to Vm and consequently the resistivity distribution γ can be estimated. This method is hereinafter referred to as "forward model iteration type method."

As for the method to update this γi, the gradient method is generally used. Among others, the method based on the least square method is widely used. For example, the increment of γ is given as δγ, which is obtained by δγ=(Jt*J)~*Jt*(Vm−Vi) (J: Jacobian matrix ∂Fr/∂γ at γi, Jt: transposed matrix of J, ( )~: inverse matrix), after which δγ is added to γi to update γi. Also, the end of iteration is determined based on a condition for determining whether the square sum of errors e=(Vm−Vi)* (Vm−Vi) satisfies "e<e0" where e0 is a set value, or condition for determining whether the number of iterations has reached the specified count. Various other calculation methods can also be used, such as the conjugate gradient method. A method to update γi only once, instead of updating it iteratively, is also used.

γi can also be updated using the method explained below. For example, a random value is set for each element of the increment of γi, or δγ, and then these random values are added to γi to obtain Vi←Fr<γi, A, μ>. Next, random values are again given to δγ to obtain γt=γi+δγ, and then Vt←Fr<γt, A, μ> is obtained. If Vt is closer to Vm than Vi, Vt is assigned to Vi. If not, Vi is not changed and new random values are set again to δγ to calculate Vt. By repeating the above steps, Vi can be gradually brought closer to Vm. This method is characterized as being effective in parallel calculations and resistant to producing a local solution, although the number of calculation steps is very large. Use of random values is an overly simplified method, and the calculation can be made more efficient by limiting the applicable scope of random values or combining the gradient method, among others. Evolutionary computing, etc., is similar to these calculation methods. Under the present invention, use of these extreme methods is also assumed for inverse problem calculation.

A technique based on linear approximation is also used frequently. First, for the convenience of expression V←Fr<γ, A, μ> is expressed by the function V=Fr(γ). Here, A and μ are assumed as constant and therefore omitted. In general, linear approximation of the non-linear approximation equation Fr(γ) near γ0 sometimes causes a change by a very small amount δγ from γ0, which can be expressed by F(γ0+δγ)=Fr(γ0)+L*δγ. L is obtained by L=(Jt*J)~*Jt (J: Jacobian matrix ∂Fr/∂γ at γ0), for example. If the resistivity distribution is assumed to have shifted by δγ from γ0, then Vm=F(γ0+δγ) holds water. If the electric potential distribution at γ0 is given as V0, then V0=Fr(γ0) holds water. Accordingly, the above expression can be rephrased as δγ=L~*(Vm−V0). This gives δγ, so the resistivity distribution is estimated as γ0+δγ. This method is hereinafter referred to as "linear approximation type method."

Also, it is not always necessary to calculate the model information μ based on an electromagnetic model, and instead μ can also be inverse-analyzed directly from Vm and A alone. For example, assume that the resistivity distribution γk is known and the whole electric potential distribution data corresponding to A of this γk is given as Vk. Vk corresponding to γk is obtained by actual measurement, simulation, etc. If multiple sets of γk and corresponding sets of Vk are provided, an inverse problem analysis system where the system, when these Vk and A are input, outputs the corresponding γk, can be established by, for example, the learning type method using a neural network, etc. Systems like this one compute the estimate resistivity distribution γ corresponding to each new input of whole measured electric potential distribution data Vm. In other words, γ←Ir<Vm, A> is established through learning. Such inverse problem analysis system is interpreted as having through learning, inside the analysis system, those calculations corresponding to conductive body modeling using model information μ. Such method is hereinafter referred to as "learning type method." Needless to say, data corresponding to model information μ can also be given as an input under the learning type method, to implement γ←Ir<Vm, A, μ>. Also, A can be omitted, if constant, to establish such learning system as γ←Ir<Vm>.

A quasi-learning type method where γ is estimated using a database is also conceivable. For example, a database is created that stores representative resistivity distributions γk and corresponding whole electric potential distribution data Vk, to achieve an implementation that, when whole measured electric potential distribution data Vm is input, finds Vk closest to this Vm and outputs γk corresponding to the Vk that has been found. Sample cases stored in the database are acquired based on measured values or simulation, as is the case with the learning type method. Another general method is to select multiple candidates of Vk close to Vm and then estimate the synthesized values and interpolated values based on these γk candidates.

In addition to the above, analytical approaches based on the d-bar method, as well as the back-projection method, layer-stripping method, Calderon's approach and moment methods, etc., are being studied. To simplify the explanation, ways to stabilize calculations, such as regularization, are omitted.

As evident from the foregoing, various methods can be used to estimate the resistivity distribution γ from Vm. When estimating γ in the through-γ estimation method, essentially any implementation method can be used as long as the resistivity distribution γ can be estimated based on whole measured electric potential distribution data Vm. Any method can be selected from among various calculation methods according to the desired accuracy, calculation speed, etc.

(Through-γ Estimation Method)

The through-γ estimation method is described.

The through-γ estimation method can be used when ρ←Tpr(γ) that uniquely converts γ to ρ can be set. First, γ is estimated from Vm and A, etc., using γ←Ir<Vm, A, μ>, etc., as explained in the explanation of γ estimation. Based on the estimated γ, γ is converted to ρ via ρ←Tpr(γ) to estimate the target physical quantity distribution ρ. Since this method is based on γ estimation, it must be possible to at least create a resistivity-distribution type model of the conductive body.

For your reference, a simple example of ρ←Tpr(γ) is given. In the case of a pressure distribution sensor explained in connection with a contact-type PQDc body, for example, a relational expression such as r=α*p+β (α and β are coefficients) can be created to represent the relationship of pressure value p and resistivity r in a small region on the PQDc body. In this case, the pressure value p can be calculated from the resistivity r based on p=(1/α)*(β−r). If the pressure distribution ρ and resistivity distribution γ are discretely modeled, p=(1/α)*(β−r) can be provided for the elements of this discrete model to uniquely convert γ to ρ. As a result, ρ←Tpr(γ) can be calculated.

(Direct ρ Estimation Method)

The direct ρ estimation method is described.

Since ρ estimation based on the direct ρ estimation method is also a type of normal inverse problem analysis, it can be explained in a manner similar to γ estimation. Here, methods to estimate ρ corresponding to the forward model iteration type method, linear approximation type method, learning type method, etc., explained in connection with γ estimation are explained below. Note that the calculation routine for a forward problem relating to ρ is expressed as Fp, while the routine of an inverse problem calculation to estimate ρ is expressed as Ip. For example, a forward problem can be expressed as V←Fp<ρ, A, μ>, while an inverse problem can be expressed as ρ←Ip<Vm, A, μ>.

An approach using the forward model iteration type method is suitable when the conversion formula γ←Trp(ρ) to uniquely convert ρ to γ can be set. First, an appropriate value of ρi is set and converted to resistivity distribution γi based on γi←Trp(ρi). Then, the whole computed electric potential distribution data Vi is computed by Vi←Fr<γi, A, μ> and the increment of ρi is calculated based on the comparison of this Vi and Vm, etc. By iterating the aforementioned steps of γ←Trp(ρi), Vi←Fr<γi, A, μ>, comparison of Vi and Vm, and update of ρi, ρ is estimated. The forward problem Vi←Fp<ρi, A, μ> regarding ρ can be established by combining γi←Trp(ρi) and Vi←Fr<γi, A, μ>. To calculate the increment of ρi, the Jacobian matrix relating to the ρ of Fp, or Jp=∂Fp/∂ρ, can be used, for example, to compute δρ=(JT*J)~*Jt*(Vm−Vc) and then ∂ρ is added to ρi to update ρi. As is the case with γ estimation, various methods can be used to calculate the increment of ρi, such as various gradient methods and methods using random values.

An approach using the linear approximation type method is also suitable when γ←Trp<ρ> can be set. For the convenience of expression, first V←Fr<γ, A, μ> is expressed as V=Fr(γ), and γ←Trp<ρ> as γ=Trp(ρ). Here, A and μ are assumed as constant and therefore omitted for the purpose of simplification. When γ=Trp(ρ) is assigned to V=Fr(γ), V=Fr(Trp(ρ)) is obtained, which is expressed as V=Fp(ρ). In general, linear approximation of the non-linear equation Fp( ) around ρ0 derives Fp(ρ+δρ)=Fp(ρ0)+L*δρ. L is obtained by using, for example, L=(Jt*J)~*Jt (J: Jacobian maγtrix at ρ0, or ∂Fp/∂ρ).

If $Vm=Fp(\rho+\delta\rho)$ and $V0=Fp(\rho 0)$, then $\delta\rho=L\sim^*(Vm-V0)$ holds water. Accordingly, $\rho$ can be estimated as $\rho 0+\delta\rho$.

The following explains the learning type method such as one using a neural network, etc. For example, assume that the physical quantity distribution $\rho k$ is known and the whole electric potential distribution data corresponding to A of this $\rho k$ is given as Vk. This Vk corresponding to $\rho k$ is obtained by measured values, simulation, etc. An inverse problem analysis system is established based on the learning type method using a neural network, etc., where the system, when sets of Vk corresponding to multiple sets of $\rho k$ are provided and these Vk and A are input, outputs the corresponding $\rho k$. This inverse problem analysis system computes an estimated solution of the target physical quantity distribution $\rho$ when new whole measured electric potential distribution data Vm and A are input. In other words, $\rho\leftarrow Ip<Vm, A>$ can be established through learning. As is the case with $\gamma$ estimation, data corresponding to model information $\mu$ can also be input under the learning type method to achieve $\rho\leftarrow Ip<Vm, A, \mu>$, etc., or if A is constant, A can be omitted to establish $\rho\leftarrow Ip<Vm>$.

Take note that, as explained in connection with $\gamma$ estimation, A and $\mu$ can be omitted if the same whole injection current data A and model information $\mu$ are always used, and therefore an expression where A and $\mu$ are omitted represents the upper-level expression format.

The foregoing basically explained $\rho$ estimation of resistivity distribution type where the shape of the PQDc body is assumed as fixed.

(Estimation Calculation for Current I/O Type)

The estimation calculation for current I/O type is described.

The current I/O type represents a constitution where the base medium is connected to the medium for current I/O via the sensing element. When the quantity of current passing through this current I/O element changes, the condition of current flowing through the base medium also changes and consequently the electric potential distribution of the base medium changes. Methods whereby the quantity of current passing through the sensing element is changed are largely classified into the following three types. The point at which current is input/output into/from the sensing element on the base medium is referred to as "current I/O point."

(1) Type $\kappa$: The sensing element is a resistive element that changes according to $\rho$.
(2) Type $\alpha$: The current passing through the sensing element is controlled so that it changes according to $\rho$.
(3) Type $\nu$: The electric potential at the current I/O point on the base medium is controlled so that it changes according to $\rho$.

First, the resistivity data of the sensing element under the type $\kappa$ method is expressed as resistivity data of current I/O $\kappa$, data of the current flowing through the sensing element under the type $\alpha$ method is expressed as current data of current I/O $\alpha$, and data of the voltage at the current I/O point under the type $\nu$ method is expressed as voltage data of current I/O $\nu$.

Under the type $\kappa$ method, the resistivities of the base medium and all sensing elements can be aggregated and modeled as the resistivity of the conductive body, and therefore calculation of resistivity distribution type can be applied. Accordingly, it is sufficient to perform $\gamma$ estimation and $\rho$ estimation in the same manner as with the resistivity distribution type, by using a fixed value of resistivity distribution for the base medium and a variable for $\kappa$ of the sensing element.

If $\rho\leftarrow Tpa<\alpha>$ to uniquely convert $\alpha$ to $\rho$ can be set under the type $\alpha$ method, the following calculation can be used. First, a sensing element model is created based on the resistive element to obtain $\kappa$ in the same manner as under the type $\kappa$ method. Since the electric potential distribution corresponding to $\kappa$ can be calculated by the forward problem calculation $v\leftarrow fr<\kappa, a, \mu>$, etc., the electric potential at the current I/O point can be obtained. The electric potential difference applied to the sensing element can be computed from the difference between this electric potential and the electric potential of the medium for current I/O, which means that the current $\alpha$ flowing through the sensing element can be computed based on $\kappa$. Once $\alpha$ has been obtained this way, an estimate value of $\rho$ is calculated by $\rho\leftarrow Tpa<\alpha>$.

Also, if a resistivity-distribution type model of the base medium alone is created, the current data of current I/O $\alpha$ can be regarded as part of injection current. In this case, the forward model iteration type method can be used. By determining an appropriate value of $\alpha i$ and including this $\alpha i$ in the whole injection current data Ai, the whole computed electric potential distribution data Vi can be calculated from $Vi\leftarrow Fr(y, Ai, \mu)$. Take note that $\gamma$ represents the resistivity distribution of the base medium. By updating $\alpha i$ this way, the value of Vi can be brought closer to the whole measured electric potential distribution data Vm and thus the value of $\alpha$ can be estimated. Then, the estimated $\alpha$ is used to calculate $\rho$ by $\rho\leftarrow Tpa<\alpha>$. This is an inverse problem calculation similar to what is used in $\gamma$ estimation or $\rho$ estimation of resistivity distribution type, meaning that various other calculation methods can be used such as the learning type method and linear approximation type method. The same is true with the cases explained below.

In a case where $\nu$ can be uniquely converted to $\rho$ based on $\rho\leftarrow Tpv<\nu>$ under the type $\nu$ method, the applicable method is basically the same as the one used under the type $\alpha$ method. First, if a $\kappa$ type model is created, $\kappa$ can be obtained via $\gamma$ estimation. Since $\nu$ can be obtained based on this $\kappa$ from the electric potential distribution calculated by the forward problem $v\leftarrow fr<\kappa, a, \mu>$, $\rho$ can be obtained by $\rho\leftarrow Tpv<\nu>$. If a resistivity-distribution type model of the base medium alone is created, the voltage data of current I/O $\nu$ can be modeled as injection current, and therefore the whole computed electric potential distribution data Vi can be calculated from $Vi\leftarrow Fr<\gamma, Ai, \mu>$ by determining an appropriate value of current I/O voltage vi and including this in the whole injection current data A. Since $\nu$ can now be estimated by iteratively updating vi, $\rho$ is obtained by $\rho\leftarrow Tpv<\nu>$.

In a case where $\rho$ can be uniquely converted to $\alpha$ based on $\alpha\leftarrow Tap<\rho>$ under the type $\alpha$ method, $\rho$ can be estimated by the method explained below. If the forward model iteration type method according to the direct $\rho$ estimation method is used, for example, the predicted current of current I/O $\alpha i$ can be calculated from $\alpha i\leftarrow Tap<\rho i>$ by determining the predicted physical quantity distribution $\rho i$. If a conductive body model is created based on the base medium alone, the predicted current data of current I/O can be regarded as part of injection current. Accordingly, the whole computed electric potential distribution data Vi can be calculated by $Vi\leftarrow Fr<\gamma, Ai, \mu>$ by including $\alpha i$ in the whole injection current data Ai. Here, $\gamma$ is the resistivity distribution of the base medium. Based on the above, the value of Vi can be brought closer to the whole measured electric potential distribution data Vm by updating $\rho i$ iteratively, which makes it possible to estimate the value of $\rho$.

The same method applicable to type $\rho$ can be used when $\nu\leftarrow Tvp<\rho>$ to uniquely convert $\rho$ to $\nu$ can be set under the type $\nu$ method. If the forward model iteration type method according to the direct $\rho$ estimation method is used, for example, an appropriate value of predicted physical quantity distribution $\rho i$ is determined and converted to predicted voltage data of current I/O vi based on $vi\leftarrow Tvp<\rho i>$. If a conductive body model is created based on the base medium alone, the predicted voltage data of current I/O vi can be regarded as part of injection current.

Accordingly, the whole computed electric potential distribution data Vi can be calculated by Vi←Fr<γ, Ai, μ> by including vi in the whole injection current data Ai. Here, γ is the resistivity distribution of the base medium. Based on the above, the value of Vi can be brought closer to the whole measured electric potential distribution data Vm by updating ρ iteratively, which makes it possible to estimate the value of ρ.

Take note that if the individual sensing elements are not divided and one continuous sensing element is constituted by a pressure-sensitive rubber sheet, etc. (such as a structure where three sheets including a base medium sheet, sensing element sheet and sheet constituting the medium for current I/O are layered), such constitution can be handled in the same manner as when individual sensing elements are used based on discrete modeling.

As mentioned above, with the current I/O type ρ estimation is possible basically in the same manner as estimation calculation under the resistivity distribution type or by estimating injection current.

(Handling Process for Stretch Effect of PQDc Body)

The handling process for the stretch effect of the PQDc body is described.

The foregoing assumed cases where basically the PQDc body does not stretch or deform or such impact is ignored. However, the greatest feature of the sensor proposed by the present invention lies in the high stretchability and deformability of the PQDc body. When the PQDc body stretches or deforms significantly, the regional shape of the conductive body and mutual position relationships of electrodes change, and therefore these changes must be reflected in the electromagnetic model or inverse problem analysis of the PQDc body. To do this, information of the shape change must be acquired somehow and the acquired information must be of a level at which model information μ can be computed. This information is referred to as "μ-computable information." Acquiring μ-computable information does not necessarily mean computing μ, but it only means acquiring information of a level at which μ can be computed. Methods to acquire μ-computable information can be basically classified into the following three cases:

(1) Case Cθa: Data regarding the shape is acquired from an external sensor, etc., where μ-computable information can be obtained from this information alone.
(2) Case CVm: μ-computable information can be obtained based on measured Vm data, as is the case with a stretch distribution sensor.
(3) Case CVmθp: A case between Cθa and CVm, where μ-computable information can be obtained when information from an external sensor, etc., and Vm data are available.

In case Cθa, information regarding the shape is acquired from an external sensor, etc., measuring the shape of the PQDc body, where μ-computable information can be obtained from this externally acquired information alone. In many cases, the sensor proposed by the present invention belongs to this case. The simplest example is where the PQDc body is used in a condition where it stretches uniformly in both the vertical direction and horizontal direction. In this case, model information μ can be computed by installing two one-dimensional distance sensors vertically and horizontally and then acquiring the vertical and horizontal lengths of the PQDc body from the distance sensors, and accordingly this distance data represents μ-computable information. If a PQDc body is installed at a robot's knee, etc., for example, a configuration is possible where the stretch condition of the PQDc body is uniquely determined once the angle of the knee joint is determined. In this case, the joint angle provides the information based on which to uniquely determine the shape of the PQDc body, so this joint angle represents μ-computable information.

The aforementioned data regarding the shape, which is acquired from an external sensor, is referred to as "externally acquired shape data θ." If model information μ can be computed from a given θ alone, as is the case of the aforementioned example of distance sensors and joint angle, this θ is referred to as "externally acquired complete shape data θa." θa can be considered as μ itself, only expressed in a different manner. Sensors that generate externally acquired shape data θ include various types, such as sensors for measuring distance and length, sensors for measuring the shape of the PQDc body by taking its images using a camera, etc., and stretch distribution sensors explained later. Also, it is not always necessary to measure this data automatically using a sensor, and manually measured data or data obtained from design drawings, etc., can also be input from a file or terminal, and these cases are also included in θa. This is because the basic program configuration is the same and the only difference is how data is acquired. If ρ estimation is performed based on θa in case Cθa, the applicable expression takes the form of ρ←Ip<Vm, A, θa>, etc.

In case CVm, μ-computable information is acquired based on the Vm data obtained from the sensor itself, without using information from an external sensor, etc. This is the case of a stretch distribution sensor, etc., where the shape of the PQDc body itself represents the target physical quantity. Stretch distribution sensors have a PQDc body whose resistivity distribution changes as a result of stretching, so that the deformation condition can be grasped by means of Vm measurement. Among these stretch distribution sensors, those that permit computation of model information μ based on Vm, without requiring any other information such as externally acquired shape data θ, are referred to as "self-contained type stretch distribution sensors." Self-contained type stretch distribution sensors cannot always determine the shape of the PQDc body under all stretching and deformation conditions, but they allow for computation of μ required in the specific condition in which the sensor is used. For example, some stretch distribution sensors can estimate only the degree, but not the direction, of stretching. If such sensors are used in a condition where stretching occurs in both the vertical direction and lateral direction, μ cannot be computed based on Vm because the two directions cannot be differentiated, and therefore these sensors cannot be considered self-contained type stretch distribution sensors. If the same sensors are used in a condition where stretch distribution occurs only in the vertical direction, however, μ can be computed based on Vm and thus these sensors can be utilized as self-contained type stretch distribution sensors. As explained above, self-contained type stretch distribution sensors can be established when the stretch distribution information included in Vm matches the specific condition in which the sensor is used. Case CVm assumes such self-contained type stretch distribution sensors.

Now, consider an example of case CVm where the stretch distribution quantity ρ is estimated using the through-γ estimation method and forward model iteration type method for γ. Normally, whole computed electric potential distribution data Vi is calculated from Vi←Fr<γi, A, μ> after updating γi, where γi is updated in such a way as to bring Vi closer to Vm, and these steps are iterated to estimate γ. Here, updating γi means that the shape of the PQDc body changes as a result of change in stretch distribution. Accordingly, μ used in Vi←Fr<γi, A, μ> should be changed every time γi is changed, according to γi. The stretch distribution ρ can be calculated from the resistivity distribution γ, and μ can also be calculated because the stretch distribution ρ represents a regional shape. Therefore, it is possible to calculate model information μi by, for example, obtaining the stretch distribution ρi based on ρi←Tpr<γi> every time γi is updated, and then calculating μi from this stretch distribution ρi based on μi←Tmp<ρi>. This μi can now be used to calculate a forward model based on Vi←Fr<3, A, μi>. Here, the ρ estimation procedure becomes more complex than when μ does not change. Also, ρi←Tpr<γi> does not always provide a unique result, in which case the Tpr conversion itself may require a separate inverse problem analysis to further complicate the calculation. If the direct ρ estimation method and forward model iteration type method are used, on the other hand, model information μi can be obtained from the stretch distribution ρi, so ρ is estimated by iterative calculation using Vi←Fp<ρi, A, μi> based on μi←Tmp<ρi>. In this case, ρi←Tmp<ρi> must be uniquely converted. As explained above, in the case of CVm the direct ρ estimation method is likely to provide a simpler calculation process compared to the through-γ estimation method. Either way, attention should be paid to the point where, if ρ is estimated using the forward model iteration type method or other method where model information μ is explicitly used in case CVm, μ must be updated during the iterative calculation. It is desired to reduce the number of calculation steps by, for example, updating μ only when the amount of change is large.

Although use of the forward model iteration type method in case CVm makes the calculation more complex, in the learning type method, etc., where model information μ is not explicitly used, basically the same constitution can be used as when no stretching occurs. For example, assume that the stretch distribution ρk is known and the whole electric potential distribution data corresponding to A of this ρk is given as Vk. This Vk corresponding to ρk is obtained by measured values, simulation, etc. An inverse problem solution system is established by the learning type method using a neural network, etc., to output the corresponding ρk when sets of Vk and A corresponding to multiple sets of ρk are provided and these Vk and A are input. This inverse problem analysis system computes an estimated solution of the stretch distribution ρ when new whole measured electric potential distribution data Vm and A are input. As a result, ρ←Ip<Vm, A> that estimates ρ can be established through learning. Under this learning type method, a process equivalent to one that occurs when μ changes is performed simultaneously with the inverse problem analysis of ρ, so basically the same implementation can be used as when μ does not change. Take note that if A is fixed, A can be omitted. Also in case CVm, model information μ can be explicitly calculated from Vm within the estimation program comprising an estimation procedure, or a process equivalent to μ computation can be performed inside Ip without explicitly computing μ as is the case with the learning type method. Accordingly in CVm, computation of μ based on Vm, or performance of a process equivalent to μ computation, is referred to as "μ-computation equivalent process."

Also in case CVm, μ can be calculated only from Vm and A and thus computation of μ is expressed as μ←Im<Vm, A>. Since ρ estimation uses Vm and A alone, it can be expressed as ρ←Ip<Vm, A> in a similar manner. Methods can be considered where this ρ←Ip<Vm, A> is implemented by computing μ using μ←Im<Vm, A> and then applying ρ←Ip<Vm, A, μ>.

Case CVmθp is applied to stretch distribution sensors that are not of self-contained type. Since these sensors are not of self-contained type, I-computable information cannot be obtained from Vm and A alone. Accordingly, lacking information is compensated for by acquiring θ using an external sensor, etc., to allow for computation of μ. This θ is referred to as "externally acquired shape-complement data θp." In case CVmθp, μ can be computed only when Vm, A and θp are all available. Accordingly, normally μ is computed by μ←Im<Vm, A, θp>. Similarly, ρ estimation is calculated by ρ←Ip<Vm, A, θp>. This ρ←Ip<Vm, A, θp> can be implemented by computing μ by μ←Im<Vm, A, θp> and then applying ρ←Ip<Vm, A, μ>. Examples of case CVmθp include one involving a stretch distribution sensor capable of estimating only the intensity of stretch, as mentioned above, where the sensor is used in a condition where stretching occurs uniformly in the vertical direction but it occurs non-uniformly in the lateral direction. In this case, the uniform stretching in the vertical direction is measured using a distance sensor, etc., and this data is given as θp. If the forward model iteration type method according to the direct ρ estimation method is used here, then ρ is estimated by using the value of θp as the vertical-direction value of ρi and an estimate value as the lateral-direction value to update ρi.

For your information, what is called the "stretch distribution sensor" here refers to not only a sensor capable of estimating only the stretch distribution quantity as the target physical quantity, but also to a sensor capable of estimating both the stretch distribution quantity and other physical quantity. For example, a pressure-sensitive rubber sheet that has been processed in a manner applicable to a pressure distribution sensor can sense both the pressure distribution and stretch distribution.

Take note that in the example of Cθa at the knee joint, the knee joint angle θa was explained as representing the model information μ itself. However, this does not mean θa itself is equivalent to an electromagnetic model. To establish an electromagnetic model of a conductive body, needless to say a separate set of data, such as the initial shape of the base medium and how the shape changes when the joint angle is input, is needed. These data are included in the program and therefore θa can be characterized as the data needed to conclusively determine the parameters of the electromagnetic model. It should be noted that the aforementioned statement does not simply mean that θa includes all details of the electromagnetic model. The same is true with the model information μ.

The points made above are briefly summarized. Case Cθa is a process characterized in that, when the constitution is such that the externally acquired complete shape data θa can be acquired by the estimation program, the estimation program comprising an estimation procedure estimates the target physical quantity distribution ρ from θa and whole measured electric potential distribution data Vm. Case CVm is a process characterized in that, when the constitution is such that the whole measured electric potential distribution data Vm containing μ-computable information can be acquired by the estimation program, the estimation program comprising an estimation procedure performs a process equivalent to computation of model information μ from Vm, while also estimating the target physical quantity distribution ρ from Vm. Case CVmθp is a process characterized in that, when the constitution is such that the externally acquired shape-complement data θp can be acquired by the estimation program, the estimation program comprising an estimation procedure performs a process equivalent to computation of model information $\mu$ from Vm and $\theta p$, while also estimating the target physical quantity distribution $\rho$ from Vm and $\theta p$.

Take note that all structures explained above can be implemented in a manner omitting A, if the same whole injection current data A is always used, as is the case with $\gamma$ estimation and $\rho$ estimation.

(Dynamic Stretching)

Dynamic stretching is described.

In the tactile sensing by robots and measurement of physical quantity distributions, a general form of utilization is not one where $\rho$ estimation of the PQDc body is executed only once and then program ends, but one where $\rho$ estimation is repeated several times to observe the time-series data of $\rho$ that changes over time. For example, Vm measurement and $\rho$ estimation are repeated every 0.1 second and the estimated time-series data of $\rho$ is observed as movie. The unit of this repetition of measurement and estimation is hereinafter referred to as "frame." In the foregoing example, the frame is repeated every 0.1 second.

Figure 26:
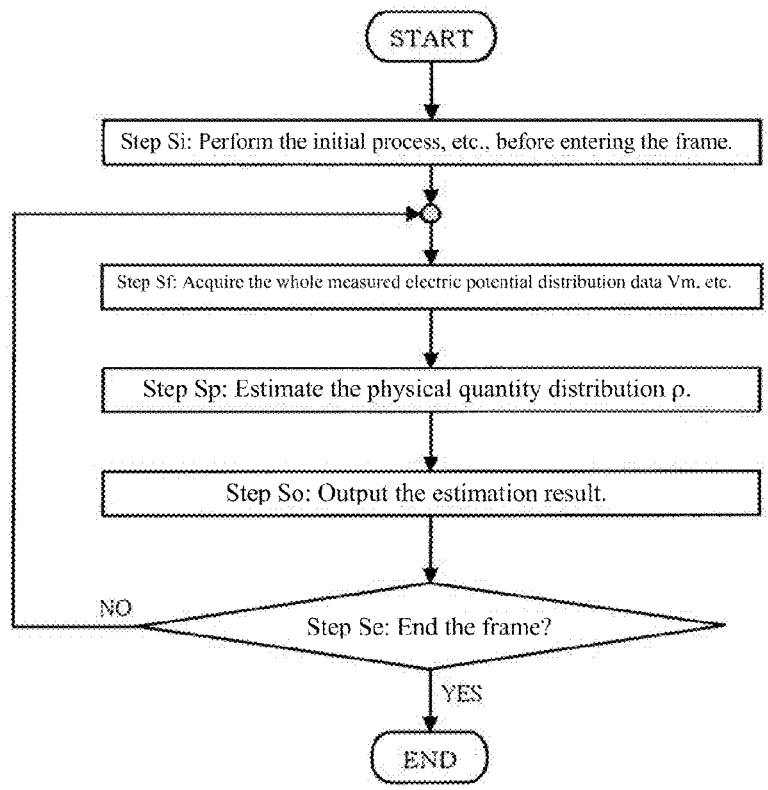
FIG. 26 is a Figure showing a constitution of a type conforming to the present invention, where a frame is repeated based on a frame-type flow.

FIG. 26 shows an example of a program flow that considers a frame. This flow is divided into step Si being the initial process performed immediately after the program is started, step Sf performed at the beginning of each frame process, step Sp where $\rho$ is estimated, step So where the estimation result is output, and step Se where frame branching judgment is made. In other words, a frame is executed in the sequence of Sf, Sp, So and Se, where Se is repeated until branching is completed at the end. FIG. 27 shows an example of performing $\rho$ estimation only once before the program ends, where all other processes are basically the same as those executed when no frame is available, except that step Se is not used. The above flow is referred to as "frame-type flow." The frame-type flow includes cases where the frame is implemented only once. If the flow is implemented only once, step Se where frame branching judgment is made is not required, and neither is the branch line that branches from Se and heads back to Sf. FIG. 26 shows a constitution where the frame-type flow is used to repeat a frame, while FIG. 27 shows a constitution where the frame-type flow is used to implement the frame only once.

As explained above, when the time-series data of $\rho$ is handled the sensor proposed by the present invention and characterized by stretching of the PQDc body generates various differences in the flow process according to the dynamic stretching of the PQDc body. For example, such differences occur in cases CVm, C$\theta$a and CVm$\theta p$ involving dynamic stretching. Accordingly, first of all these cases are classified into two types, dynamic stretching case Dd and non-dynamic stretching case Ds, based on whether or not the PQDc body stretches dynamically.

Dynamic stretching case Dd refers to a situation where basically the condition of stretching and deformation of the PQDc body changes in each frame and therefore the equivalent of $\mu$-computable information changes with each frame. With a tactile distribution sensor, etc., mounted on a robot's joint, for example, the joint angle changes dynamically while the robot is moving, and accordingly the change in the PQDc body shape must be reflected in the $\rho$ estimation in each frame.

Non-dynamic stretching case Ds refers to a situation where the condition of stretching of the PQDc body does not change, or specifically the $\mu$-computable information does not change with each frame. For example, a stretchable tactile distribution sensor made of a rubber cap, such as one used in swimming, can be considered. Such sensor, although being a single product, can be fitted on robot heads of various sizes and shapes and thus is very convenient and useful, and provides an important form of application of the sensor proposed by the present invention. Similarly, a cylindrically structured stretchable PQDc body, etc., is also convenient because, although being a single product, it can be fitted on robot arms and legs of various thicknesses. When used in these manners, the sensor can be installed in a manner fitting the applicable shape due to its stretchability. Once the sensor is installed, however, the stretch condition no longer changes and remains constant. These are the primary applications intended in non-dynamic stretching case Ds. Also, the basic assumption of Ds is that stretching does not change over time, and thus the process constitution is the same when the PQDc body is non-stretchable. For example, a PQDc body wrapped around a cylinder or prism for use is implemented in a manner utilizing the high flexibility of the sensor proposed by the present invention. However, $\mu$ does not necessarily change in this implementation. Ds also covers situations where stretching is small and therefore the impact of stretching is ignored.

Take note that in Ds, computation of model information $\mu$ becomes possible before the frame process, or specifically in step Si during the initial process. Accordingly, a calculation equivalent to $\mu$ need not be performed every time $\rho$ is estimated in the frame as long as $\mu$ is computed in Si and the computed data is stored in the memory, and this increases the calculation efficiency. Therefore, the program constitution changes depending on whether or not $\mu$ is computed in Si.

(Omission of A)

In the foregoing, whole injection current data A was always handled explicitly through $\rho \leftarrow$Ip<Vm, A, $\mu$>, etc. This is partly because A is used in the forward model iteration type method that is often utilized, and partly because use of multiple types of A is anticipated, where these cases can be explained more clearly when A is expressed explicitly.

If a fixed value is used for A, however, in some cases A is not handled explicitly because A may be implemented in a manner provided as internal variables of Fr, Fp, Ir and Ip or embedded in process routines. Particularly when a learning type method or database type method is used, a learning system or database system can be established without using A, if A is a fixed value. Based on the above, essentially an expression where A is omitted is regarded as the upper-level expression format, and therefore A is hereinafter omitted and the applicable expression is described in such way as $\rho \leftarrow$Ip<Vm, $\mu$>. To make doubly sure, the expression of ans$\leftarrow$func<x, y> is defined as a procedure to compute ans by referencing at least x and y, and therefore $\rho \leftarrow$Ip<Vm> is regarded as the upper-level expression of $\rho \leftarrow$Ip<Vm, A>.

(Estimation Program)

The most basic form of the estimation program comprising an estimation procedure is one that estimates the target physical quantity distribution $\rho$ based on the whole measured electric potential distribution data Vm.

The estimation program that handles case C$\theta$a basically acquires the externally acquired complete shape data $\theta$a and Vm to estimate $\rho$ based on $\rho \leftarrow$Ip<Vm, $\theta$a>. The estimation program that handles case CVm basically acquires Vm to estimate $\rho$ based on $\rho \leftarrow$Ip<Vm>. The estimation program used in case CVm$\theta p$ basically acquires the externally acquired shape-complement data $\theta p$ and Vm to estimate $\rho$ based on $\rho \leftarrow$Ip<Vm, $\theta p$>.

Furthermore, the estimation program comprising an estimation procedure and having a frame-type flow is established by considering, among others, the classification based on how the externally acquired shape data $\theta$ is handled, classification based on whether $\theta$ is acquired in Si during the initial process or in Sf inside the frame, and classification based on whether or not the model information μ is computed in Si during the initial process.

First of all, estimation programs comprising an estimation procedure and having a frame-type flow are classified into three cases of CVm, Cθa and CVmθp. CVm does not use θ and is therefore classified into two patterns including one where μ is not computed in Si and the other where μ is computed in Si. Cθa is classified into two patterns including one where θa is acquired in Si and the other where θa is acquired in Sf. CVmθp is classified into three patterns including one where θp is acquired in Si and μ is not computed in Si, another where θp is acquired in Si and μ is computed in Si, and yet another where θp is acquired in Sf. Based on the above, programs are classified into a total of seven patterns. By the way, Cθa does not have a pattern where μ is computed in Si because θa itself is equivalent to μ and thus μ need not be computed.

Type θa-1

First, θa is acquired in Si before the frame and the acquired value is stored in the memory. In the frame, Vm is acquired in Sf, after which Vm and θa are referenced in Sp to estimate ρ based on ρ←Ip<Vm, θa>, and these processes are repeated.

This type is suitable when Ds and Cθa are both applicable, or specifically in a non-dynamic stretching case where the externally acquired complete shape data θa is used. For example, this type is used in such a way that the shape of the PQDc body is determined before the frame is started, and θa being the information representing this shape is acquired from an external sensor, etc., and stored in the memory, so as to perform ρ estimation calculation in each frame always using the shape based on θa.

Take note that this case not only includes situations where θa is acquired from an external sensor, etc., but it also includes situations where manually measured values and values from design drawings, etc., are acquired through data in files, input from the keyboard, etc., data in the memory, and the like. This is because with these values, the only difference is how they are acquired and basically the timing of acquisition and overall program configuration remain the same. Also, θa represents the model information μ itself and therefore this case also applies to situations where μ is estimated beforehand using a different program that can estimate μ and the estimated μ is stored in a file or memory as θa. Take note that, although θa is normally acquired as a joint angle or other value, it may be converted to a PQDc body shape, etc., before the value is referenced in ρ estimation. In this case, too, θa is written as θa to indicate that it is a different expression of μ data.

Type θa-2

In the frame, Vm and θa are acquired in Sf, and then Vm and θa are referenced in Sp to estimate ρ based on ρ←Ip<Vm, θa>, and these processes are repeated.

This type is suitable when Dd and Cθa are both applicable, or specifically in a dynamic stretching case where the externally acquired complete shape data θa is used. It is used in situations where the stretch condition may change in each frame, where θa being the data representing the shape is acquired from an external sensor, etc., in each frame and this θa is used to estimate ρ based on ρ←Ip<Vm, θa>. For example, this type is used when attaching a stretchable tactile distribution sensor on the joint and obtaining the shape of the PQDc body from the joint angle.

Take note that this type can also be applied in cases where Ds and Cθa are both applicable, or specifically in a non-dynamic stretching case. However, the efficiency clearly drops in this application because fixed θa is acquired in each frame.

Type Vm-1

In the frame, Vm is acquired in Sf, after which ρ is estimated in Sp from Vm based on ρ←Ip<Vm>, and these processes are repeated.

This type is suitable when Dd and CVm are both applicable, or specifically in a dynamic stretching case where the shape is determined based on Vm without utilizing the externally acquired shape data θ. This type is used for self-contained type stretch distribution sensors, etc. Take note that although this type can be applied also in a non-dynamic stretching case where Ds and CVm are both applicable, in such case the process efficiency would be higher when type Vm-2 is used.

Type Vm-2

First, Vm is acquired in Si before the frame, after which model information μ is computed from Vm based on μ←Im<Vm> and the acquired μ is stored in the memory. In the frame, Vm is acquired in Sf, and then Vm and the stored μ are referenced in Sp to estimate ρ based on ρ←Ip<Vm, μ>, and these processes are repeated.

This type is suitable when Ds and CVm are both applicable, or specifically in a non-dynamic stretching case where the shape is determined based on Vm without using the externally acquired shape data θ. Since the model information μ is computed before the frame based on μ←Im<Vm> and all shape-related calculations are completed before the frame, the number of calculation steps associated with ρ estimation in the frame can be reduced.

Type Vmθp-1

First, θp is acquired in Si before the frame, after which the acquired θp is stored in the memory. In the frame, Vm is acquired in Sf, after which Vm and the stored θp are referenced in Sp to estimate ρ based on ρ←Ip<Vm, θp>, and these processes are repeated.

This type is suitable when Ds and CVmθp are both applicable, or specifically in a non-dynamic stretching case where the externally acquired shape-complement data θp is used. θp is acquired and stored in Si before the frame and this data is referenced subsequently in the frame for use in the ρ estimation calculation of ρ←Ip<Vm, θp>. Take note that although θp is normally acquired as an external sensor value, etc., as in the case of Cθa, etc., this information is described as θp even when it is converted to differently expressed data. The fact that I-computable information is obtained only when both θp and Vm are available remains the same. This case is intended to reduce the number of ρ estimation process steps by performing the θp pre-process before the frame.

Type Vmθp-2

First, Vm and θp are acquired in Si before the frame, after which model information μ is computed from Vm and θp based on μ←Im<Vm, θp> and the computed μ is stored in the memory. In the frame, Vm is acquired in Sf, after which Vm and μ are referenced in Sp to estimate ρ based on ρ←Ip<Vm, μ>, and these processes are repeated.

This type is suitable when Ds and CVmθp are both applicable, or specifically in a non-dynamic stretching case where the externally acquired shape-complement data θp is used. Because the model information μ is computed before the frame, the number of μ-related calculation steps needed to estimate ρ in the frame can be reduced.

Type Vmθp-3

In the frame, Vm and θp are acquired in Sf, after which ρ is estimated from Vm and θp in Sp based on ρ←Ip<Vm, θp>, and these processes are repeated.

This type is suitable when Dd and CVmθp are both applicable, or specifically in a dynamic stretching case where the externally acquired shape-complement data θp is used. Because the shape changes dynamically, in this case θp being the information used to determine the shape is acquired in each frame and this θp and Vm are used to estimate ρ.

This type can also be applied in a case where Ds and CVmθp are both applicable, or specifically in a non-dynamic stretching case. However, the efficiency clearly drops in this application because θp is fixed and this fixed θp is acquired in each frame.

(Others)

Other related technologies are described below.

(Layering)

If a PQDc body is constituted as a two-dimensional sheet, layering multiple PQDc bodies on top of one another provides a single sheet-like sensor. This layered sensor, while being a single sheet, can measure various physical quantities at the same time. Particularly when a large region where no electrodes and wirings are provided can be ensured, a sensor which is very thin and offers excellent flexibility and stretchability can be realized despite the layering. Here, the PQDc bodies must be electrically insulated from one another using a thin insulation sheet, etc.

For example, layering is effective when constituting a single sheet-like tactile distribution sensor by placing on top of one another three PQDc bodies constituting a contact distribution sensor, pressure distribution sensor and stretch distribution sensor, respectively. Here, the contact distribution sensor can detect the contact condition caused by tiny forces, the pressure distribution sensor can measure relatively large external forces, and the stretch distribution sensor can detect the stretching deformation of the sensor caused by pinching and rubbing. This way, a sensor capable of sensing complex tactile information that acts upon the sensor, despite the sensor having the shape of a single sheet, can be constituted. This tactile distribution sensor can be used to identify the region of contact with an external object using the contact distribution sensor, and this information can be utilized as prior information to improve the accuracy of estimation calculations performed by the pressure distribution sensor and stretch distribution sensor. If the sheet undergoes large stretching deformation, the shape of the PQDc body can be estimated using the stretch distribution sensor, and this information can be utilized as regional shape information of the contact distribution sensor or pressure distribution sensor. By allowing the sensors to utilize the physical quantities estimated by other sensors in this manner, the estimation accuracy and calculation speed of each sensor can be improved synergistically.

Take a stretch distribution sensor, for example. Instead of estimating the stretch distributions in the vertical direction and lateral direction based on measurement by a single PQDc body, measuring the stretch distribution in the vertical direction and stretch distribution in the lateral direction using two different sensors that are layered on top of each other is more effective in improving the estimation accuracy and calculation speed. Note, however, that in this case each PQDc body must be constituted in a manner providing high sensitivity in a given direction, but this can be realized by, for example, using a porous PQDc body having many anisotropically shaped holes. Details are explained later.

Also, take a pressure distribution sensor, for example. When constituting a sensor with a wide dynamic range capable of accurately measuring pressures of varying degrees from low to high using a single PQDc body, low pressures tend to be affected by noise, etc., and the detection accuracy drops as a result. However, if low pressures and high pressures are received separately by two PQDc bodies that are layered on top of each other, a sensor that can also measure low pressures accurately can be constituted.

Also, take a fluid velocity distribution sensor, for example. By constituting the sensor by layering two PQDc bodies including one reacting to the fluid velocity distribution in the X direction and the other reacting to the fluid velocity distribution in the Y direction, a fluid velocity distribution sensor capable of measuring forces in two directions can be constituted using a single sheet sensor. Since the PQDc bodies can be made porous, the bottom PQDc body in the two-layered sensor structure can directly measure the fluid flowing on the top face through the holes provided in the top PQDc body. This is an example of layering where the effect of porosity functions effectively. Also when constituting a PQDc body layer having greater sensitivity to the fluid velocity in the X direction than in the Y direction, small bars having an elliptical cross-section that is wider in the X direction and narrower in the Y direction can be erected on a pressure-sensitive rubber sheet. When the bars tilt, stress is applied to the pressure-sensitive rubber sheet and the resistivity around the base of the bars increases as a result. The bottom PQDc body is formed in a manner allowing these bars to project to the top side through the holes in the top PQDc body.

(Anisotropic Characteristics of PQDc Body)

A PQDc body used in a stretch distribution sensor can be constituted in such a way that, for example, the resistivity distribution that generates when the PQDc body is stretched in the X direction is different from the resistivity distribution that generates when the PQDc body is stretched in the Y direction, although the quantity of stretching is the same. Accordingly, a PQDc body producing a greater change in resistivity distribution when stretched in the X direction can be layered with another PQDc body producing a greater change in resistivity distribution when stretched in the Y direction, in order to constitute a stretch distribution sensor capable of differentiating the stretching direction between X and Y. These PQDc bodies can be implemented as follows.

For example, a circular hole is provided in a pressure-sensitive rubber sheet and the region surrounding this hole is stretched. Since areas near the hole provide an open end, the resistivity does not change around the hole and the resistivity changes in a region slightly away from the hole. Next, assume a case where an elliptical, laterally long hole is provided in a pressure-sensitive rubber sheet. If an area near this hole is stretched in the lateral direction, the change in resistivity distribution is basically the same as the change that occurs when no hole is present, because the width occupied by the hole is small. If the area is stretched in the vertical direction, on the other hand, the width occupied by the hole is wide and thus the percentage occupied by the region where the resistivity does not change becomes greater than when the area is stretched in the lateral direction. Based on the above, a PQDc body constituted by a pressure-sensitive rubber sheet having multiple elliptical, laterally long holes can realize different sensitivity characteristics in the lateral direction and vertical direction. Needless to say, the holes can have various shapes such as rectangle.

The same effect can also be realized by coating a porous pressure-sensitive rubber sheet with conductive paint in patterns. For example, assume a pressure-sensitive rubber sheet having many quadrangular holes in tile patterns. The porous sheet has a grid shape comprising grids arranged in the vertical direction and lateral direction. Now, conductive paint is coated over all lateral grids in the lateral direction, but not at the intersecting points of grids. In this case, stretching in the lateral direction causes little change in resistivity because current mainly passes through the area covered by conductive paint. However, stretching in the vertical direction changes the resistivity significantly because the effect of conductive paint is small. As explained above, a PQDc body with anisotropic characteristics can be constituted by coating a porous PQDc body with conductive paint in patterns.

(Conductive Tensor)

In general, a conductive body has different conductivities (or resistivities) in different directions of current flow. This characteristic is so-called "anisotropic conductivity." Anisotropic conductivity refers to a case, for example, where the resistivity in the lateral direction is different from the resistivity in the vertical direction. Since anisotropic conductivity is expressed as rank-2 conductivity tensor (or resistivity tensor), a two-dimensional sheet-like conductive body has three variables, while a three-dimensional solid conductive body has six variables. Visually, anisotropic conductivity is expressed in an elliptical shape. Needless to say, anisotropic conductivity can be expanded to electric impedance relative to AC.

This means that "multiple information can be embedded at a given one point on a conductive body." To be specific, three physical quantities in the case of a two-dimensional sheet-like conductive body, or six physical quantities in the case of a three-dimensional solid conductive body, can be measured through resistivity tensor at a given one point in the region of a conductive body. For example, assume that a PQDc body is constituted by a two-dimensional sheet-like conductive body where physical quantity A at a given point on the conductive body is converted to resistivity in vector direction a, physical quantity B is converted to resistivity in direction b orthogonal to a, and physical quantity C is converted to angle formed by a and X-axis. If the distribution of anisotropic conductivity of such PQDc body can be measured, a sensor capable of estimating three physical quantity distributions of A, B and C can be constituted using a single PQDc body, without increasing the numbers of electrodes, wirings, etc.

In the field of EIT, studies on estimation of anisotropic conductivity distribution are also conducted, where some studies mathematically demonstrate the feasibility of estimation under certain restrictions, while others indicate that mathematical calculation of approximate estimation is possible for resistivity tensor based on prior-assumption of the continuity of each component. However, these studies only consider a condition in which electrodes are placed only at the boundary, and therefore further studies to reveal whether current injection and electric potential measurement using internal electrodes is effective or not in the estimation of anisotropic conductivity will be required in the future.

As an example of PQDc body, causing a thin contact probe elongated in the X direction to contact a conductive sheet results in a higher conductivity in the X direction than in the Y direction in a region near the contact probe. Accordingly, a structure is formed by attaching bars having such contact probe on a conductive sheet, so that when a bar is tilted slightly in the X direction, the thin contact probe elongated in the X direction makes contact with the sheet, while tilting the bar in the Y direction causes the thin contact probe elongated in the Y direction to make contact with the sheet. When many such tiny bars are installed on a conductive sheet, a PQDc body can be constituted that increases the conductivity in the X direction near a force application area when the surface of the PQDc body is rubbed in the X direction, and increases the conductivity in the Y direction when the surface of the PQDc body is rubbed in the Y direction.

Also, when a simple pressure distribution sensor is constituted using a single PQDc body to constitute a sensor capable of measuring pressure over a wide dynamic range covering varying pressures from low to high, generally a difficulty is encountered in measuring low pressures accurately because they are affected by noise. To address this problem, one type of pressure-sensitive element corresponding to a low pressure range and another type of pressure-sensitive element corresponding to a high pressure range are prepared, both using elliptical-shaped pressure-sensitive elements whose resistivity drops when pressure is applied. Many of these pressure-sensitive elements are attached on a conductive sheet having resistivity distribution in such a way that the long axes of low-pressure elements align with the X direction, while the long axes of high-pressure elements align with the Y direction. Using this structure, a PQDc body can be constituted that allows the conductivity distribution in the X direction to change when low pressure is applied, and the conductivity in the Y direction to change when high pressure is applied.

(Wire-Saving by Frequency Band Division)

The sensor proposed by the present invention also covers AC resistivity, so a wire-saving constitution is also possible where multiple PQDc bodies share the electrodes by dividing the frequency bands into PQDc bodies. For example, consider a structure where three PQDc bodies of A, B and C are layered on top of one another, with the electrodes located at the same positions on each PQDc body connected to the common wirings. In other words, while 48 wirings (=16*3) are normally needed when each PQDc body has 16 electrodes, in the above case only 16 wirings are needed because one wiring is connected to three electrodes.

By the way, PQDc body A has frequency characteristics marked by a low decay rate near frequency fa and high decay rates in the remaining bands, or specifically frequency characteristics marked by a peak near fa. A also has characteristics where the overall decay rate changes when the physical quantity acting upon A changes. Similarly, PQDc body B has a peak near frequency fb, while PQDc body C has a peak near frequency fc. Here, fa, fb and fc are different and bands near the peaks are not overlapping. Since the three PQDc bodies share the electrodes, they are providing a condition of parallel resistivity. If current of frequency fa is injected into this constitution, current mainly flows to A because the decay rate is low at A and high at B and C. As a result, the electric potential distribution observed at each electrode becomes one mainly affected by the resistivity distribution in A. Similarly when current of frequency fb is injected, the effect of the resistivity distribution in B becomes dominant, while the effect of the resistivity distribution in C becomes dominant at frequency fc. In other words, a constitution where multiple PQDc bodies having different peak frequencies share the electrodes allows for independent measurement of the resistivity distributions of multiple PQDc bodies by changing the frequency of injection current.

By the way, not all PQDc bodies need to have peak characteristics. Similarly to the above example, a structure constituted by three PQDc bodies of D, E and G is considered. Here, D has frequency characteristics marked by high decay rates at fd and higher frequencies and low decay rates at fd and lower frequencies. On the other hand, G has low decay rates at fg or above, and high decay rates at fg or below. E has a peak frequency at fe. Also, the relationship of fd<fe<fg is established. If the frequency of injection current is fd or below, the resistivity distribution in D becomes dominant. If the frequency is fg or above, the resistivity distribution in G becomes dominant. If the frequency is fe, the resistivity distribution in E becomes dominant. Here, not only materials having a peak frequency like E, but also materials having frequency characteristics like D and G can also be used for PQDc bodies, and this will likely widen the selection of materials.

As explained above, use of multiple PQDc bodies having different frequency characteristics allows for independent measurement of the resistivity distributions of individual PQDc bodies according to the frequency of injection current. This way, sharing of electrodes among PQDc bodies becomes possible, and this contributes to wire-saving. Such wire-saving application is effective, particularly when PQDc bodies are layered.

As for materials that can be used for PQDc bodies having frequency characteristics, the simplest example is one where a PQDc body is constituted by sensing elements of the dispersed type each comprising a small LCR circuit. Also possible are methods where pressure-sensitive materials formed by means of dispersing micro-size coils over a rubber or urethane, or pressure-sensitive capacitors whose capacitance changes with pressure, are used as sensing elements. Also, pressure-sensitive materials, etc., having micro-size coils can be used to form a continuous PQDc body.
(Wire-Saving Using Filter Element)

As a wire-saving method based on sharing of wirings using frequency characteristics, small filter elements can also be used.

Normally, wirings are connected directly to the electrodes installed on the PQDc body, but here a constitution is considered where a filter element is inserted between each electrode and wiring. If a two-terminal filter element is used, for example, one terminal is connected to the electrode, while the other terminal is connected to the wiring. Such filter element is installed for all electrodes.

Now, assume a structure constituted by three PQDc bodies of A, B and C layered on top of one another. A filter is inserted at all electrode points on the PQDc bodies, and the wirings are shared by the three PQDc bodies. In other words, while 48 wirings (=16*3) are normally needed when each PQDc body has 16 electrodes, in the above case only 16 wirings are needed because one wiring is connected to three filter elements.

First, the frequency characteristics of the filter elements connected to PQDc body A are such that the decay rate is low near frequency fa and high in the remaining bands, or specifically these filter elements have band-pass characteristics with a peak at fa. A also has characteristics where the overall decay rate changes when the physical quantity acting upon A changes. Similarly, the filter elements connected to PQDc body B have a peak near frequency fb, while the filter elements connected to PQDc body C has a peak near frequency fc. Here, fa, fb and fc are different and the frequencies near the peaks are not overlapping. If current of frequency fa is injected into this constitution, current mainly flows to A because the decay rate is low at A and high at B and C. As a result, the electric potential distribution observed at each electrode becomes one mainly affected by the resistivity distribution in A. Similarly when current of frequency fb is injected, the effect of the resistivity distribution in B becomes dominant, while the effect of the resistivity distribution in C becomes dominant at frequency fc. In other words, a constitution where multiple PQDc bodies having filter elements of different peak frequencies share the electrodes allows for independent measurement of the resistivity distributions of multiple PQDc bodies by changing the frequency of injection current. Take note that the types of PQDc bodies can be increased as desired, unless the peaks overlap.

Similarly, a structure constituted by three PQDc bodies of D, E and G is considered. Here, the filter elements connected to D have frequency characteristics marked by high decay rates at fd and higher frequencies and low decay rates at fd and lower frequencies, or specifically these filter elements have low-pass characteristics. On the other hand, the filter elements connected to G have high-pass characteristics marked by low decay rates at fg or above, and high decay rates at fg or below. The filter elements connected to E have band-pass characteristics with a peak frequency at fe. Also, the relationship of fd<fe<fg is established. If the frequency of injection current is fd or below, D becomes dominant in the measured electric potential distribution. If the frequency is fg or above, G becomes dominant. If the frequency is fe, E becomes dominant. Here, not only filter elements having band-pass characteristics like the filter elements of E, but filter elements having low-pass characteristics like the filter elements of D or high-pass characteristics like the filter elements of G can also be used, and this will likely widen the selection of materials. Take note that the number of band-pass filters between fd and fg can be increased as desired, unless the peaks overlap.

Examples of filter elements include small LCR circuits and ceramic filters, among others. If electric power can be supplied, an active-type filter circuit, such as operational amplifier, can be used to constitute the filter element. Since in many cases wire-saving using filter elements is likely used in combination with layering, active-type filters can be used with greater ease because supply of electric power becomes easier when electric power supplies are layered. The filter element method is characterized in that it provides a wider selection of materials compared to when frequency characteristics are given to PQDc body materials. However, it is desired to keep filter elements as small as possible.
(Coordinated Operation of Electric Signal Processing Units)

When a more realistic operation is considered, it is desired that multiple electric signal processing units generate injection current for electrodes or measure voltage in a coordinated manner by means of communication. Due to the requirement for size reduction and cost limitations, the number of electrodes that can be handled by each electric signal processing unit is somewhat limited. However, there are still many situations where the ability to freely increase/decrease the number of electrodes is desired, such as when raising the resolution, measuring a wide region, handling a three-dimensional PQDc body, or simultaneously measuring multiple regions such as robot's arms and legs.

In these cases, it is very effective to use a constitution where one PQDc body is combined with multiple electric signal processing units and allow the electric signal processing units to coordinate the functions of electrodes for current injection as well as electrodes for electric potential measurement. Such constitution can be realized easily by equipping each electric signal processing unit with a communication function and transmitting commands for coordinated operation from an external computer connected by the communication lines.

In particular, the system proposed by the present invention is a very simple measurement system that impresses voltage on the electrodes on the PQDc body to perform measurement. Accordingly, an electronic signal processing unit that performs the aforementioned coordinated operation can be easily constituted using a single-chip microcomputer, etc., having AD converters, DA converters, serial communication function, etc. Ultra-compact CPUs having AD converters for electric potential measurement, DA converters for current signal generation, serial communication function, etc., are already available on the market, so the feasibility of the aforementioned electric signal processing unit is very high. Accordingly, not the electronic circuit itself, but the connectors and other components used for wiring connection may become a more dominant factor that determines the size of the electric signal processing unit.

For example, assume that 16 electrodes are needed on the PQDc body. If all 16 electrodes are to be handled by one electric signal processing unit, at least 16 wirings must be connected to the electric signal processing unit and thus the connector size increases, which is disadvantageous to size reduction, thickness reduction, etc. If four electrodes are handled by one electric signal processing unit and measurement is performed by using a total of four electric signal processing units, on the other hand, only four wirings are needed for the I/O of each electric signal processing unit and thus the connector of the electric signal processing unit becomes smaller. As a result, these smaller electric signal processing units can be distributed at the four corners of the PQDc body, and such constitution is effective in reducing the overall size and thickness of the sensor.

When this concept is advanced one step further, a constitution where one electric signal processing unit is assigned to one electrode can also be considered. Since one electrode requires only one AD converter and one DA converter, an ultra-compact CPU with a limited number of terminals can be used. Such ultra-compact CPUs can be installed directly at the electrodes. If the CPUs are connected serially using two power-supply lines and single communication line, for example, a relatively simple wiring structure can be realized where the electrodes are connected serially with three wirings. Since these ultra-compact CPUs with a limited number of terminals and having a quadrangular shape of several millimeters per side are already available on the market, feasibility of the aforementioned structure is high.

Such wire-saving constitution where ultra-compact CPUs are placed directly at the electrodes is very effective, particularly when multiple PQDc bodies are layered. Multi-layering is a very effective means for measuring diverse physical quantity distributions, but it also has a drawback in that the number of wirings increases in proportion to the number of PQDc bodies to be layered. However, normally the electrode positions on each PQDc body are the same, as a rule, and thus significant wire-saving can be realized by placing ultra-compact CPUs at the electrode positions on the layered PQDc bodies, with each CPU connected to the electrodes on multiple PQDc bodies. Also, serial communication can be implemented by a daisy-chain type serial communication method or bus-type serial communication method.

Furthermore, even the aforementioned three wirings become unnecessary if the wirings for electric power supply or communication are implemented on a conductive sheet and this conductive sheet layered with the PQDc bodies. The simplest constitution is one where ultra-compact CPUs are placed at the electrode positions and a very small number of wirings are provided in the layer direction for the applicable number of PQDc bodies. Since the conductive sheet for electric power supply or communication can be a simple conductive medium having no sensing function, a very thin, stretchable conductive film, conductive rubber, conductive fiber mesh, etc., of 0.1 mm or thinner can also be used. Accordingly, installation also becomes relatively easy.

When multiple electric signal processing units with communication function are operated in a coordinated manner, as explained above, the size and thickness can be reduced effectively due to the distribution of electric signal processing units and also the need for increasing/decreasing the number of electrodes can be accommodated flexibly. In addition, while only several electrodes are handled by one electric signal processing unit in general, constituting an electric signal processing unit having one ultra-compact CPU for one electrode achieves simple wirings and effective functioning of layered PQDc bodies.

(Other PQDc Bodies)

The sensor proposed by the present invention also covers AC resistivity. Accordingly, materials using capacitors, coils, etc, can be utilized effectively.

For example, a pressure-sensitive capacitor constituting a capacitance-type pressure sensor is a capacitor that sandwiches an elastic dielectric body between two electrodes, where application of pressure causes the dielectric body to crush and the distance between the two electrodes changes as a result, thus allowing pressure-to-capacitance conversion. The resistivity relative to AC also changes as the capacitance changes. Normally, the resistivity relative to AC decreases as the pressure increases. Such pressure-sensitive capacitor can be used to constitute a PQDc body. For example, 2-mm square pressure-sensitive capacitors are placed at the four corners of 10-mm square conductive sheet A. The electrode surface on one side of each pressure-sensitive capacitor is connected to sheet A. This unit is placed on conductive sheet B having resistivity distribution in a manner contacting the electrode surface different from the electrode surface connected to sheet A. To prevent contact between sheet A and sheet B, insulation film, etc., is provided between the two. In a no-load condition, the resistivity of the pressure-sensitive capacitor relative to AC of frequency f is higher than that of sheet B. Here, injecting current into sheet B causes the current to flow mainly through sheet B in a no-load condition.

Next, because the resistivity of the pressure-sensitive capacitor at f decreases when pressure is applied to the entire unit, the current flowing through sheet B passes through the pressure-sensitive capacitor and flows to sheet A, and also flows through a path that passes through a different downstream pressure-sensitive capacitor and eventually returns to sheet B. In other words, the resistivity of sheet B near the unit becomes smaller when pressure is applied to the unit. When multiple sets of this unit are installed on sheet B, a PQDc body can be constituted whose resistivity distribution relative to AC changes according to the pressure distribution. Take note that the region in which pressure is applied is sufficiently wider than the unit size. A PQDc body for pressure distribution sensor can also be constituted based on the same principle by installing pressure-sensitive rubbers at the four corners of the unit. The difference between a PQDc body comprising pressure-sensitive capacitors and one comprising pressure-sensitive rubbers is that while the PQDc body of pressure-sensitive rubber type tends to generate noise because conductive particles in the rubber make contact or otherwise produce negative effects due to deformation, etc., the PQDc body of pressure-sensitive capacitor type does not generate such noise easily.

Materials in which micro-size coils are distributed in a rubber or urethane can be used as pressure-sensitive elements because when the rubber deforms, the diameter, length and other characteristics of the distributed inner coils change to cause the frequency characteristics to change. These pressure-sensitive elements can be used in place of the aforementioned pressure-sensitive capacitors or pressure-sensitive rubbers containing conductive particles.

A pressure distribution sensor can be constituted with ease using a pressure-sensitive resistor sheet such as a pressure-sensitive rubber, pressure-sensitive foam, etc., because the resistivity of such sheet changes near a pressurized region when pressure is applied. Take note, however, that with a normal pressure-sensitive resistor, the resistivity changes significantly in the pressurized direction or direction vertical to the sheet, while the change in resistivity is relatively small in the direction vertical to the pressurized direction or direction horizontal to the sheet. Accordingly, a PQDc body constituted simply by a pressure-sensitive resistor sheet provides a non-practical pressure distribution sensor offering low sensitivity. Accordingly, ingenious measures can be taken to convert resistivity change in the pressurized direction to resistivity change in the horizontal direction, in order to constitute a pressure distribution sensor offering good sensitivity. To do this, first conductive paint is applied on the top and bottom faces of the pressure-sensitive resistor sheet in spot patterns.

At this time, the spot patterns on the top and bottom surfaces are staggered, with the ends of both patterns aligned between the top and bottom. The spots may have a circular, quadrangular or other desired shape. In a no-load condition, current mainly flows near the surface in the horizontal direction via the conductive paint patterns. When pressure is applied to the sheet and the resistivity in the vertical direction drops, current flows in a zigzag pattern by alternating the top and bottom patterns. In effect, resistivity change in the vertical direction is converted to resistivity change in the horizontal direction. This way, resistivity change in the vertical direction can be converted to change in the horizontal direction, and consequently such pressure-sensitive resistor sheet can be utilized as a pressure distribution sensor sheet offering higher sensitivity. Here, the pressure region should be sufficiently larger than the region of spot patterns.

One conductive sheet can also be combined. First, a conductive sheet of low resistivity is layered with a pressure-sensitive resistor sheet of high resistivity in no-load condition. Spot patterns are applied by conductive paint on one side of the pressure-sensitive resistor sheet, where the patterned side is opposite the side facing the conductive sheet. Also, the spot patterns are sufficiently smaller than the minimum detectable region. In a no-load condition, the resistivity of the pressure-sensitive resistor sheet is high and thus current flows mainly to the conductive sheet of low resistivity. When pressure is applied, however, the resistivity of the pressure-sensitive resistor sheet drops in the vertical direction and thus current travels from the conductive sheet through the pressure-sensitive resistor sheet into the spot patterns and then returns to the conductive sheet via the pressure-sensitive resistor sheet. This way, resistivity change in the vertical direction can be converted to change in the horizontal direction.

Normally, a pressure-sensitive resistor sheet constituted by conductive particles requires ingenious measures to be taken to convert resistivity change in the pressurized direction to change in the horizontal direction, as explained above. Now, a pressure-sensitive resistor sheet is considered which is constituted by very small, short conductive fibers that are dispersedly mixed with conductive particles during the manufacture of the pressure-sensitive resistor. The fibers are oriented in various directions, and many of them are overlapped in the direction vertical to the sheet. When pressure is applied to compress this sheet in the vertical direction, the resistivity in the vertical direction decreases and therefore the resistivities drop along the paths connecting the multiple fibers overlapping in the vertical direction. Since the fibers are oriented in all directions equally, the resistivity in the horizontal direction also decreases. Since the apparent resistivity in the horizontal direction is the sum of the resistivities along the paths traveling via the fibers and resistivities along the paths passing through the pressure-sensitive resistor, the rate of change can be increased over normal pressure-sensitive resistors constituted by conductive particles alone. Also, if these conducive fibers are magnetic bodies, a horizontal magnetic field line can be given to them during the manufacture to align the orientations of fibers within the horizontal plane, which will result in an even greater rate of change. Although pressure-sensitive materials containing conductive fibers are not currently found, feasibility of these materials is high because conductive materials in which metal fibers, carbon fibers, etc., are dispersedly mixed with resin or elastomer are already available.

One-dimensional stretch sensors using conductive paint mixed with conductive particles exist. These sensors have a thin coat of conductive paint containing carbon particles applied on the surface of a silicon rubber sheet offering high stretchability. In a no-load condition, the resistivity of the sheet is very low, and the resistivity increases as the sheet stretches. Since the principle of resistivity change is similar to that applicable to pressure-sensitive resistors, a planar rubber sheet with a thin coat of conductive paint applied on its surface is expected to function effectively also as a two-dimensional stretch distribution sensor. One key feature of this sheet is that in a no-load condition, its resistivity is lower than the level with a pressure-sensitive resistor.

In addition to methods where the resistivity distribution is changed based on material, methods where the resistivity is changed based on structure can also be considered. Examples include methods to change the resistivity by using the difference in elastic modulus. For example, consider a structure constituted by a soft conductive material of high resistivity with many relatively hard conductive spheres, etc., of low resistivity embedded inside. Because of the difference between the elastic modulus of the conductive material and that of the sphere, deforming the conductive material causes the density of spheres to change in the deformed region, and as a result the apparent conductivity around the deformed region changes. For example, compressing a part of the conductive material increases the density of spheres around the compressed region, and as a result the conductivity in the applicable region appears to increase. Take note that, for the apparent conductivity to change, the structure must be used in a condition where a sufficient number of spheres are present in the deformed region.

Application Examples

A stretch distribution sensor can be realized according to the present invention, but this stretch distribution sensor can be utilized in various ways other than simply to detect pinching, rubbing, etc. For example, attaching such stretch distribution sensor on a human or robot's elbow, shoulder, etc., causes the stretch condition of the sensor to change according to the movement of the joint, and therefore the joint angle can be measured from the stretch quantity. Also, use of a stretch distribution sensor at the shoulder where multiple joint axes are concentrated at a single point allows for simultaneous measurement of angles of multiple axes using a single sensor. In addition, a stretch distribution sensor can also be used to measure the torso whose measurement has traditionally been difficult because of its smooth surface and diverse, complex bending modes, which is different from the shoulder, elbow and other joints, for the reason that such sensor conforms to the complex bending conditions of the torso. Based on the above, various sensors for joint angle measurement can be created. When these stretch distribution sensors are applied to create a whole-body measurement suit resembling a wet suit, the posture of the body can be measured using this measurement suit alone. These measurement suits can be utilized in various applications such as capture of human body movement using CG, etc., measurement of kinetic state of athletes, and measurement of behaviors of animals, etc.

EMBODIMENTS OF THE INVENTION

Embodiments of the present invention are explained in detail below using drawings.

Example 1

Pressure Distribution Sensor

An example of a pressure distribution sensor that stretches dynamically is given.

In this example, a pressure distribution sensor is mounted around the elbow joint of a humanoid robot for the purpose of measuring the pressure distribution around the elbow joint. When the elbow joint moves, the stretch condition of the pressure distribution sensor also changes.

FIG. 29 is an explanation drawing showing an overall constitution of the pressure distribution sensor and a condition in which the pressure distribution sensor is mounted on the robot's elbow joint.

FIG. 30 (a) shows a condition where the pressure distribution sensor is not mounted on the elbow joint, while FIG. 30 (b) explains how the stretch condition of the pressure distribution sensor changes when the elbow joint is bent with the pressure distribution sensor mounted on it.

As shown in FIG. 30(b), large stretching occurs around the elbow when the elbow joint is bent. Although very large stretching occurs at the front and back of the elbow joint, no stretching occurs along the side line of the elbow joint even when the elbow is bent, and thus stretching in the region around the side is negligibly small. Also, areas near the center of the upper arm and forearm are also less vulnerable to the impact of stretching. Accordingly, the PQDc body is structured in such a way that an area near the center is defined as a main stretchable region, while areas around the side and near the top and bottom ends are defined as non-stretchable regions where electrodes and wirings are installed.

FIGS. 31(a), 31(b) and 31(c) are constitutional drawings of electrodes and wirings installed in non-stretchable regions around the side and near the top and bottom ends.

In the example shown in FIGS. 31(a), 31(b), and 31(c), FPC boards are used for wiring the electrodes, as shown in FIG. 31(a), where two circuit boards are provided, one for the upper arm and the other for the forearm, with the two circuit boards connected to separate electric signal processing parts 6. These electric signal processing parts 6 and host computation processing part 7 transmit and receive commands and data by means of communication.

The PQDc body shown in FIG. 31 (b) is constituted as a dispersed type, where a rubber sheet is used as the base medium and pressure-sensitive resistors are used as the pressure sensing elements. The sensing element shown in FIG. 31 (c) comprising the PQDc body shown in Fig. (b) which in turn is placed on the circuit board shown in FIG. 31 (a) is structured in such a way that the value of resistivity between the two terminals changes according to the pressure. Take note that ingenious measures must be taken on the pressure sensing element constituted by a pressure-sensitive resistor. With this pressure-sensitive resistor, the resistivity value changes in the pressurized direction or direction vertical to the sheet, while the resistivity value hardly changes in the direction horizontal to the sheet in which current flows. Accordingly, constituting a two-terminal type sensing element by providing electrodes at both of the horizontal ends of a pressure-sensitive resistor is not very practical. Instead, electrodes are arranged on the top and bottom faces of the pressure-sensitive resistor in line with the pressurized direction, and these electrodes are electrically connected to the horizontally arranged terminals connected to the base medium.

Figure 33:
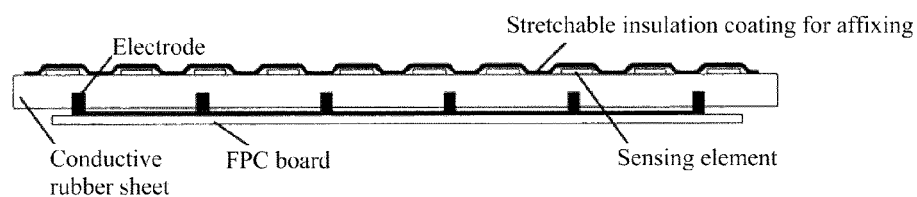
FIG. 33 is a Figure explaining a section structure of a pressure distribution sensor in FIG. 31.

FIGS. 32(a), 32(b) and 32(c) explain a sensing element structured in such a way as to connect the electrodes on the top and bottom faces of the pressure-sensitive resistor to the horizontally arranged terminals, as well as a condition of current flow when pressure is applied. FIG. 32(a) is a single unit drawing of the sensing element having a structure where conductive paint is applied on the top and bottom faces of the pressure-sensitive resistor as electrodes and where these conductive paint areas are connected to the terminals that in turn are connected to the base medium. Insulation coating is provided to insulate the conductive paint providing the electrodes on the bottom face, from the base medium, to prevent contact between the two. FIG. 32(b) explains how small the current flowing inside the sensing element is in a no-load condition, while FIG. 32(c) explains how the current flowing inside the sensing element increases when pressure is applied. Also, the sensing elements are arranged on a conductive foam and affixed by an adhesive and elastic insulation rubber sheet attached from above, and the terminals and conductive rubber sheet are caused to contact each other to provide electrical continuity. FIG. 33 is a section view showing the structure of this PQDc body.

The wirings of the PQDc body are divided into two—the top half and bottom half—where 24 electrodes are arranged in each half, for a total of 48 electrodes. Of the 24 electrodes, 16 are located at the outermost boundary and numbered 1 to 16 in the top half, and 17 to 32 in the bottom half, in the clockwise direction. Also, the remaining eight electrodes in the top half are numbered 33 to 40, while the remaining eight electrodes in the bottom half are numbered 41 to 48. The electrodes in the top half are connected to the electric signal processing part 6 for the upper arm, while those in the bottom half are connected to the electric signal processing part 6 for the forearm, respectively, via flexible wirings.

Figure 34:
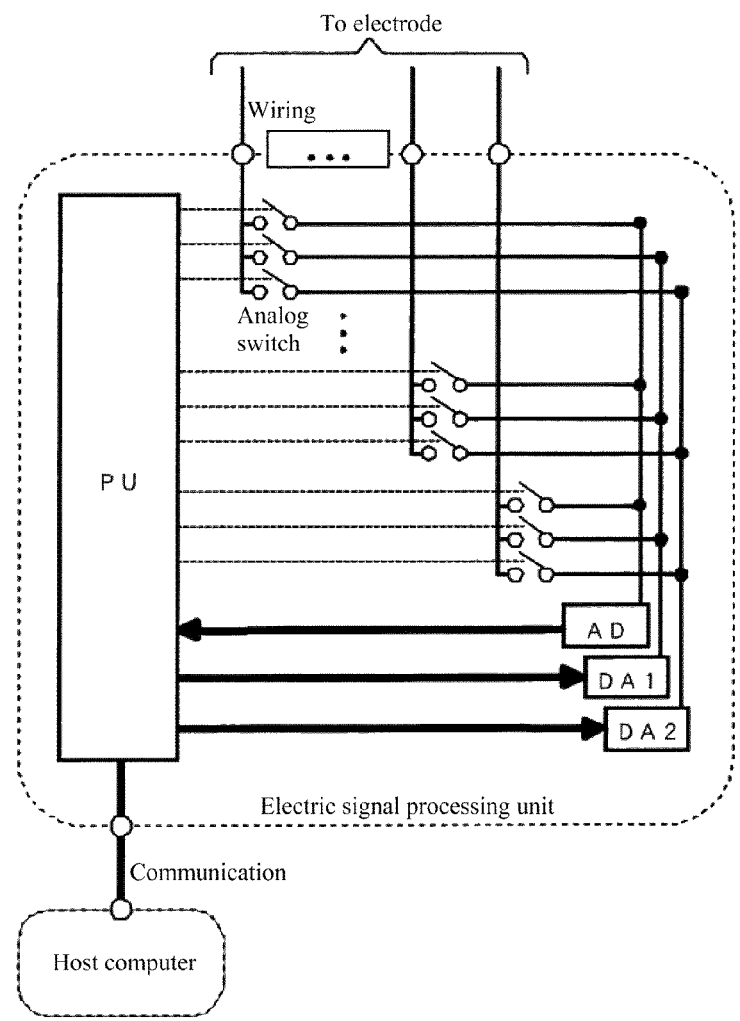
FIG. 34 is a Block diagram of an electric signal processing part used in an example of the present invention.

FIG. 34 is a block diagram of the electric signal processing part 6. Each electrode can be connected to a DA converter or AD converter via an analog switch. AD indicates an AD converter capable of measuring voltage values, DA1 indicates a DA converter of current-output type, and DA2 indicates a DA converter of voltage-output type. The processor unit PU in the electric signal processing part 6 issues commands to the analog switches to control connection conditions, issues commands to the AD to measure voltage values and read them into the PU, issues commands for output current to DA1, and issues commands for output voltage to DA2, among others. Here, electrodes remain in a high impedance state while not connected to the AD or DA.

The measurement program comprising a measurement procedure is executed on the host computer of the computation processing part 7. In other words, the host computation processing part has dual functions to also serve as the computation processing part for measurement 7, in order to allow for transmission and reception of commands and data via communication with the PU of the electric signal processing part 6. The measurement program comprising a measurement procedure first transmits commands to the electric signal processing part 6 connect electrode 1 to DA1 of the electric signal processing part 6 on the upper arm side, and connect electrode 2 to DA2, and so that +100 mA is output to DA1 and 0 V to DA2. At this time, the current +100 mA output from DA1 flows into electrode 2, and therefore the current of the electrode connected to DA2 becomes −100 mA. Next, the electrodes are connected to the AD one by one in the sequence of 1 to 16 and 33 to 40 on the upper arm side, with commands transmitted to perform a total of 24 voltage measurements. At the same time, the electrodes are connected to the AD one by one in the sequence of 17 to 32 and 41 to 48 on the forearm side, with commands transmitted to perform a total of 24 voltage measurements. This way, measured electric potential distribution data vm1 is measured. In the same manner, current is injected and voltage measured in a total of 32 patterns corresponding to combinations of electrodes 2 and 3, electrodes 3 and 4, . . . , electrodes 31 and 32, and electrodes 32 and 1.

Based on the above, measured voltage data becomes available for respective injection current patterns. The electric signal processing part 6 transmits these voltage data as requested by the estimation program comprising an estimation procedure in the host computer. Since Vm data is divided into two electric signal processing parts 6, the divided data are merged into Vm in the estimation program. Also, the whole injection current data A comprises data of 32 patterns, where the number of electrodes for current injection is 2 and the current values of electrodes for current injection are +100 mA and −100 mA, respectively. The measurement program comprising a measurement procedure and involving A is executed on the same computer where the estimation program comprising an estimation procedure is executed, and thus both programs exchange A via inter-program communication. Also, the joint angle sensor on the elbow is connected to the host computer, and thus the sensor is constituted in such a way that the joint angle θa can be read directly from the estimation program.

Based on Vm, A and θa above, ρ estimation calculation is performed in the estimation program comprising an estimation procedure. The target physical quantity distribution ρ is a pressure distribution. This is a condition of dynamic stretching case Dd and case Cθa where the externally acquired complete shape data θa is used. For the estimation program, type θa-2 is used.

The estimation program comprising an estimation procedure is implemented by combining the direct p estimation method with the forward model iteration type method. Accordingly, certain aspects of this combination, such as how the forward model is constituted, are explained. First, the shape of the PQDc body corresponding to the joint angle θa is computed via simulation by creating a mesh model. As shown in FIGS. 30(a) and 30(b), the shape is determined uniquely for each θa and thus the conversion process of μ←Tmta<θa> can be established with ease. For the pressure-sensitive resistor, a model that allows the resistivity value to be determined uniquely for each pressure value is used. In this case, determining the pressure distribution ρi determines the pressure value of each sensing element, and consequently the corresponding resistivity value is determined.

As a result, the composite resistivity distribution γi combining the resistivity values of all sensing elements and resistivity distribution γb of the base medium can be computed. This is expressed by γi←Trp<ρi, γb>. The conductive rubber sheet used for the base medium may generate slight change in resistivity distribution according to stretching. In consideration of this, a database is created using measured values beforehand so that the resistivity distribution γb can be computed by γb←Trm<μ> according to μ and this process is implemented in such a way that an interpolating value is computed for arbitrary θa. Take note that γb is a fixed value when the material is not affected by stretching. Also, as for the conductive body constituted by the base medium and sensing elements, the linear approximation expression aa=Y*vv is used based on finite element analysis of an electromagnetic model. aa is a vector indicating the current flowing into the mesh grid point, vv is a vector indicating the voltage value at the mesh grid point, and Y is a matrix computed from the mesh model and resistivity distribution γi based on μ. This linear approximation expression is rephrased as vv=Y~*aa using the inverse matrix Y~ of Y. Assigned to the elements of grid points corresponding to the electrodes for current injection of aa are +100 mA and −100 mA specified in the injection current data a, and the current values at all other grid points is 0. Also, vv is the voltage value at all grid points, and thus the voltage value at the grid point corresponding to each measurement electrode of vv is extracted as computed electric potential distribution data vi. Based on the above, vi←fr<γi, ai, μ> can be established, and accordingly the vi data for all 32 injection current patterns can be integrated to establish Vi←Fr<γi, A, μ> that computes whole computed electric potential distribution data Vi from the resistivity distribution γi, whole injection current data A and model information μ.

When the estimation program comprising an estimation procedure is started, the program immediately enters the first frame process because no special process is performed in step Si. First in step Sf, requests are issued to the two electric signal processing parts 6 to transmit measured data, in order to acquire whole measured electric potential distribution data Vm. Next, whole injection current data A is requested to the measurement program comprising a measurement procedure to acquire A. Also, the value of the joint angle sensor on the elbow is read and the read value is used as θa.

Next in step Sp, ρ estimation calculation is performed. ρ is estimated by combining the direct ρ estimation method with the forward model iteration type method. First, model information μ equivalent to the shape of the PQDc body is computed by μ←Tma<θa> based on θa acquired in step Sf, and this μ is used to compute the resistivity distribution γb of the base medium based on γb←Trm<μ>. Then, an appropriate estimated pressure distribution ρi is set and the composite resistivity distribution γ A is computed by γi←Trp<ρi, γb>, after which whole computed electric potential distribution data Vi is calculated by Vi←Fr<γi, A, μ> based on γI, μ and A. Based on this Vi, and Vm acquired in step Sf, the square sum of errors between predicted values and measured values, or e=(Vm−Vi)*(Vm−Vi), is computed. When e satisfies "e≧e0" where e0 is a reference value of the square sum of errors, ρi is updated and calculation and comparison of Vi and e are performed again. The above steps are iterated until "e<e0" is satisfied. For your reference, ρi is updated as follows. First, γb←Trm<μ>, γi←Trp<ρi, γb> and Vi←Fr<γi, A, μ> can be integrated into the expression Vi←Fp<ρi, A, μ>, and therefore the Jacobian matrix Ji relating to ρi of this Fp is computed as ∂Fp/∂ρ. From this Ji, the increment of ρi, or δρi, is computed based on δρi=(Jit*Ji)~*Jit(Vm−Vi), after which δρi is added to ρi to update ρi. Jit is a transposed matrix of Ji.

Based on the above, ρi at the end of iteration provides an estimate value of the pressure distribution ρ. The estimated result is output in step So, and the program proceeds to the next frame. Frame repetition ends when a command is received from the keyboard.

The foregoing explained an implementation example of a pressure distribution sensor that stretches dynamically.

Example

Stretch Distribution Sensor

Next, an example of a stretch distribution sensor is given.

When the skin is pinched with fingers, pushed or prodded with the fingertip, grabbed with three or four fingers, or rubbed to the left and right, the skin surface stretches. In this example, the intention is to sense the stretch condition of the skin resulting from these actions. Among these, pinching causes the PQDc body to deform three-dimensionally, and therefore a large error occurs along the path of current flow if planar model information is used. Accordingly, the shape of curved surface of the PQDc body itself is defined as the target of estimation.

A pressure-sensitive conductive foam sheet is used for the base medium of the PQDc body. The pressure-sensitive conductive foam has the characteristic of exhibiting lower electrical resistivity in the compressive direction when compressed, and higher electrical resistivity when stretched. Accordingly, the resistivity distribution of the pressure-sensitive conductive foam changes when the foam is pinched or rubbed. Also because of its foam-like state, the pressure-sensitive conductive foam can provide high stretchability and flexibility. Take note that a thin insulation sheet is attached at the back of the pressure-sensitive conductive foam sheet to prevent short-circuiting upon pinching.

Figure 35:
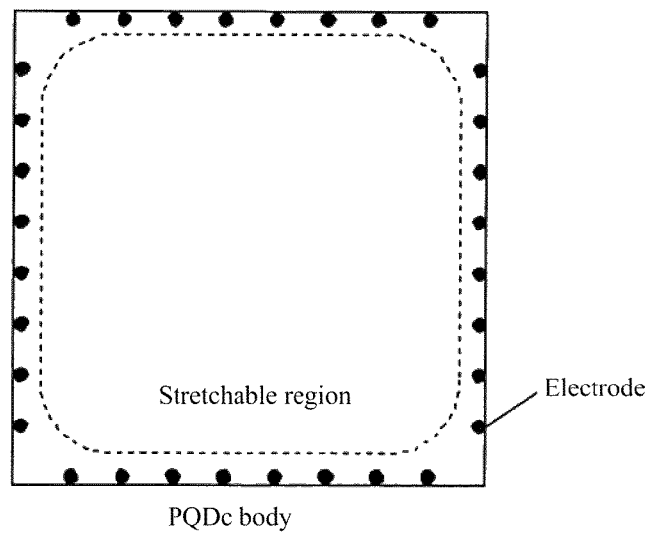
FIG. 35 is a Figure explaining an electrode arrangement and stretchable region of a PQDc body of a stretch distribution sensor conforming to the present invention.

The PQDc body has a rectangular shape, where areas near the boundary are defined as a non-stretchable region and a total of 32 electrodes, or eight per side, are wired using a FPC board. FIG. 35 shows the shape of this rectangular PQDc body and arrangement of electrodes.

The constitutions of the electric signal processing part 6, computation processing part 7, etc., are basically the same as in Example 1. Only one electric signal processing part 6 is used and 32 electrodes are connected to this one electric signal processing part, with current injected in 32 patterns of (1, 2), (2, 3), . . . , (31, 32), (32, 1) and voltage measured for all 32 electrodes.

Figure 36:
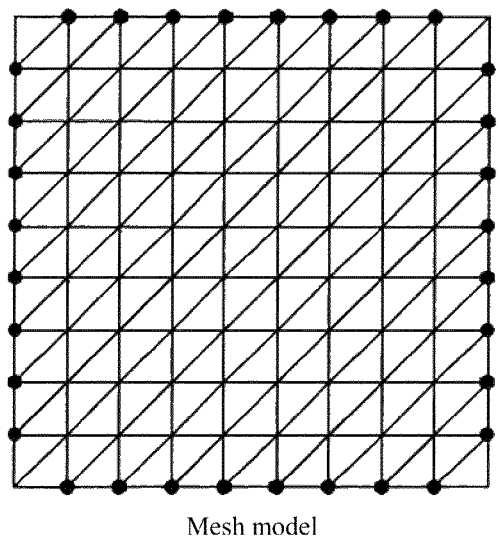
FIG. 36 is a figure explaining a mesh model of a PQDc body conforming to the present invention.
Figure 37:
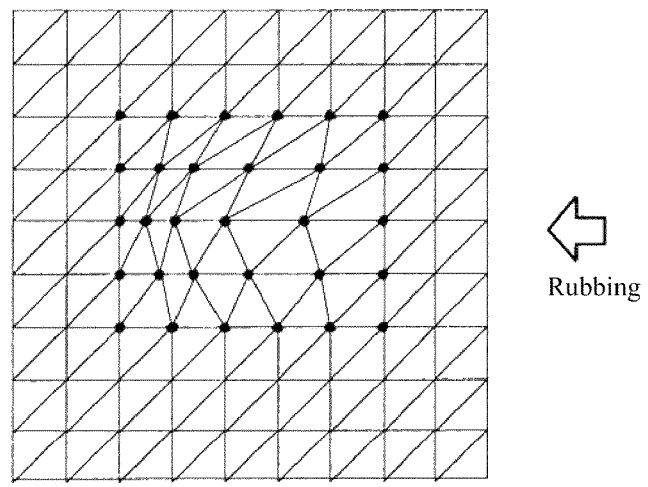
FIG. 37 is a Figure explaining a condition where a mesh model of a PQDc body conforming to the present invention is rubbed.
Figure 38:
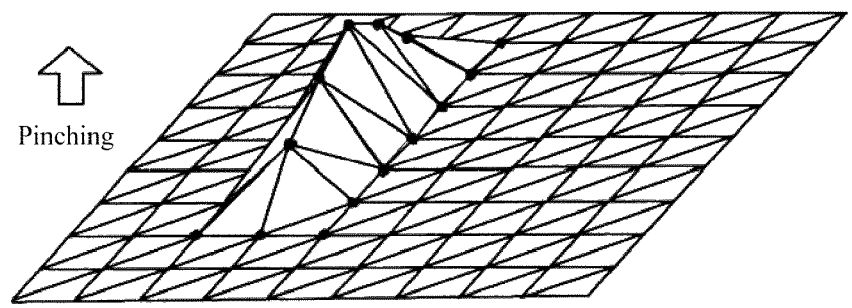
FIG. 38 is a Figure explaining a condition where a mesh model of a PQDc body conforming to the present invention is pinched.

A mesh model of the PQDc body is created. FIG. 36 shows this mesh model. When this PQDc body is rubbed, a region near the rubbed location of the PQDc body is deformed by means of stretching and compressing. FIG. 37 shows how the PQDc body deforms due to rubbing. The deformation occurs in a planar condition, and the rubbed point is compressed in the direction of the arrow and stretched in the direction opposite the arrow. Next, the three-dimensional deformation involving generation of curved surface, which results from pinching of the PQDc body, is considered. FIG. 38 shows how the PQDc body deforms due to pinching. In this case, both sides of the pinched point stretch notably, while the deformation is relatively small in the center part sandwiched by the two stretched sides. Take note that, although the shape of the boundary is not changed, generation of curved surface due to pinching and prodding causes the minimum distance path of current flow between two electrodes to change, and consequently the path of current flow also changes. Rubbing results in a deformation pattern where compressed areas and stretched areas are present side by side, while pinching results in a deformation pattern where two stretched areas are present side by side. Accordingly, the two patterns can be easily differentiated, in principle.

$\rho$ estimation calculation is performed as follows. First, a grid mesh model of the PQDc body is created where the model consists of 100×100 squares. Take note that the mesh model shown in FIG. 36 consists only of 10×10 squares because otherwise the figure becomes very busy. In reality, the mesh is cut at a density 10 times higher. The vector indicating the three-dimensional position of each grid point is given as $\rho i$ ($1 \leq i \leq 10000$). Integration of all $\rho i$ provides the physical quantity distribution $\rho$ to be estimated, where $\rho=[p1, p2, \ldots, p10000]$. Since the distance between two grid points is determined once each $\rho i$ is determined, the resistivity near $\rho i$ can be determined. In other words, a process that computes the resistivity distribution $\gamma i$ relative to $\rho i$ can be established as $\gamma i \leftarrow \mathrm{Trp}<\rho i>$. Also, $\rho i$ indicates the shape of the PQDc body itself, and thus $\mu\, i \leftarrow \mathrm{Tmp}<\rho i>$ that obtains the model information of an electromagnetic model can also be established.

Based on the above, $\rho$ is estimated by applying the forward model iteration type method to the direct $\rho$ estimation method. First, $\rho i$ indicating the initial condition without stretching is set, and this $\rho i$ is used to obtain the resistivity distribution $\gamma i$ based on $\gamma i \leftarrow \mathrm{Trp}<\rho i>$, while the model information $\mu i$ corresponding to $\rho i$ is obtained from $\mu\,i \leftarrow \mathrm{Tmp}<\rho i>$. The obtained results are then used to compute the whole computed electric potential distribution data Vi based on $Vi \leftarrow \mathrm{Fr}<\gamma i, A, \mu\, i>$ using the forward model. Next, the square sum of errors, or $e=(Vm-Vi)*(Vm-Vi)$, is obtained and the iterative calculation ends if e satisfies "$e \leq e0$" where e0 is a predetermined value. If "$e > e0$" is satisfied, $\rho i$ is updated and iterative calculation is performed with respect to $\mu i$, $\gamma i$ and Vi again. When updating $\rho i$, the least square method is applied. Since $\gamma i \leftarrow \mathrm{Trp}<\rho i>$, $\mu i \leftarrow \mathrm{Tmp}<\rho i>$ and $Vi \leftarrow \mathrm{Fr}<\gamma i, A, \mu\, i>$ can be integrated into the expression $Vi \leftarrow \mathrm{Fp}<\rho i, A>$, the Jacobian matrix Ji relating to $\rho i$ of this Fp is computed as $\partial \mathrm{Fp}/\partial \rho$, after which the increment of $\rho i$, or $\delta \rho i$, is computed based on $\delta \rho i = (Jit*Ji)^{-}*Jit(Vm-Vi)$, and then $\delta \rho i$ is added to $\rho i$ to update $\rho i$. Jit is a transposed matrix of Ji.

FIG. 26 is a flowchart of the estimation program comprising an estimation procedure.

Here, the estimation program comprising an estimation procedure is type Vm-1, because estimation is performed based on a dynamic stretching case without using externally acquired shape data. When the estimation program is started, the program immediately enters the first frame process because no special process is performed in step Si. First in step Sf, a request is issued to the electric signal processing part 6 to transmit measured data, in order to acquire whole measured electric potential distribution data Vm. Next, whole injection current data A is requested to the measurement program comprising a measurement procedure to acquire A. Next, the stretch distribution $\rho$ is estimated in step Sp and the estimated result is output in step So, after which the program proceeds to the next frame. Frame repetition ends when a command is received from the keyboard.

The foregoing explained an implementation example of a stretch distribution sensor. A sensor that senses the stretch condition of the skin surface, like the one explained above, has been difficult to realize using a conventional tactile distribution sensor prone to wiring problems. Under the present invention, however, a more innovative tactile distribution sensor is realized.

The least square method, despite being a simple estimation method, presents drawbacks such as the tendency to produce a greater estimation error of $\rho$ and vulnerability to poor settling. Particularly in the case explained above, the uniqueness of $\rho$ with respect to $\gamma$ is incomplete, and thus these undesirable tendencies become readily pronounced. Accordingly, a method to use prior information to improve settling and accuracy, which is also widely used in general inverse problem analysis, is briefly explained. In most cases, the deformation that generates in the PQDc body is due to pinching, rubbing, prodding and other relatively limited patterns that act upon the PQDc body. Accordingly, many parameters are created beforehand to represent the positions on the PQDc body, intensities and other aspects of representative deformations caused by pinching or rubbing, and these parameters are stored in a database along with the whole computed electric potential distribution data Vc in each pattern. When estimating $\rho$, first the deformation data having Vc closest to Vm is extracted from the database, and this data is used as the initial value of ρi when the least square method, etc., is applied. This way, settling instability and estimation error can be reduced significantly.

Example

Porous Stretch Distribution Sensor

The actual result of implementing a porous stretch distribution sensor using a conductive rubber sheet is given.

This porous stretch distribution sensor is constituted as follows. First, the PQDc body used a pressure-sensitive conductive rubber sheet cut to a circular shape of 190 mm in diameter. This sheet, manufactured by PCR, had a volume-specific resistivity of approx. 0.76 kΩcm and thickness of 0.5 mm in a no-load condition. Also, many holes of 5 mm in diameter were made in this circular sheet to provide a porous structure like the one described in paragraph 0212 of the instant application as published as U.S. Pre-Grant Publication No. 2010/0049450 (which paragraph is included in paragraph 0065 of the instant application as filed). The holes were arranged so that the length of a surrounding area of a hole, or a wall provided between adjacent holes, became 2.4 mm and the distance between the centers of adjacent holes became 7.4 mm (=5 mm+2.4 mm). These settings were adopted to increase the stretchability of the PQDc body and sensitivity to resistivity change upon stretching.

In this embodiment of the sensor, four layers of urethane foams of 5 mm in thickness were wrapped around a resin pipe of 76 mm in diameter, and this foam-wrapped pipe was used to simulate the skin surface of robot's arm, while the aforementioned circular porous pressure-sensitive conductive rubber sheet was attached on the surface to simulate the tactile sensing action of the robot's arm.

Figure 42:
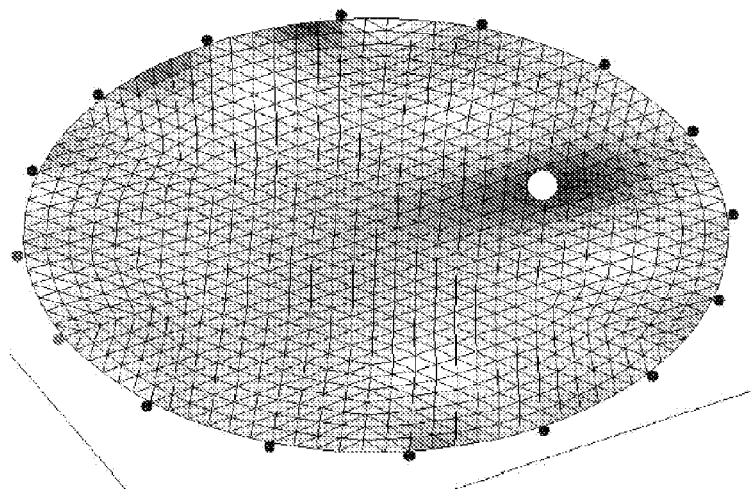
FIG. 42 is a Resistivity distribution diagram based on actual estimation in a condition where the PQDc body in FIG. 41 is prodded with a small force.
Figure 43:
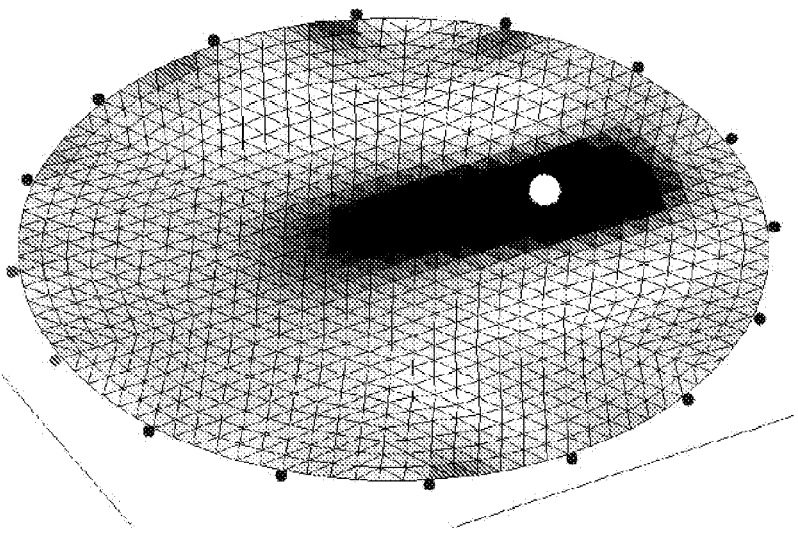
FIG. 43 is a Resistivity distribution diagram based on actual estimation in a condition where the PQDc body in FIG. 41 is prodded with a strong force.

For example, as shown in FIGS. 42 and 43, 16 electrodes 4a were mounted at a uniform interval at the boundary of this circular porous pressure-sensitive conductive rubber sheet 3f. For the electrodes 4a, stainless steel screws with a head diameter of 5 mm were used. Each electrode 4a was connected to a 12-bit AD converter of 5-V scale (not illustrated) via a wiring (not illustrated), so that the voltage of each electrode 4a could be measured. Take note that the circuit from the electrodes 4a constituting the system, to the computer that processes measurement signals, is not illustrated.

Also, these wirings were connected to the 3-V power supply and GND, via respective switches, in order to inject current. By operating these switches, one electrode was connected to 3 V, while the adjacent electrode was connected to GND. The output from the AD converter was read by a single-chip microcomputer, from which the output was read, via serial communication, by the computer that performed inverse problem analysis.

The adjacent method, which is the most standard EIT approach, was used to inject current. Under this method, voltage is sequentially applied between adjacent electrodes. First, the 16 electrodes were numbered 1 to 16. Next, the switches were operated so that electrode 1 would connect to 3 V and electrode 2 to GND, in order to apply voltage between the two electrodes to inject current. The voltages that generated in other electrodes were measured to obtain the first data matrix consisting of 13 sets of electric potential difference data, where the first element consisted of the data of the electric potential difference between electrodes 3 and 4, the second element consisted of the electric potential difference between electrodes 4 and 5, . . . , and the 13th element consisted of the electric potential difference between electrodes 15 and 16. For your information, the electric potential difference refers to the value calculated as the difference between the measured voltages of two electrodes. Next, the switches were operated so that electrode 2 would connect to 3 V and electrode 3 to GND, in order to inject current and measure the voltages of electrodes, thereby obtaining, in a similar manner, the second data matrix consisting of 13 sets of electric potential difference data, where the first element consisted of the data of the electric potential difference between electrodes 4 and 5, the second element consisted of the electric potential difference between electrodes 5 and 6, . . . , and the 13th element consisted of the electric potential difference between electrodes 16 and 1. This process was repeated in a similar manner by sequentially changing the combination of electrodes connected to 3V and GND, and 16 data matrixes were measured by 16 current injections. Sixteen data matrixes were thus obtained from the above processes, and since each data matrix consisted of 13 elements, a total of 208 (=13×16) data elements were acquired. These elements were bundled into a single data frame and used in the estimation calculation.

The computer received this data frame via serial communication to perform the estimation calculation. In the estimation calculation, the increment was computed using the least square method where an evaluation function to be minimized was the sum of the square sum of errors in electric potential distributions, and regularization terms used to reduce ill-posedness. The normalized matrix used a Laplace filter. Take note that, to simplify the calculation, the following calculation results are based on a first-order approximate solution where update was performed only once.

Based on the above system, the resistivity distribution of the PQDc body could be estimated. An experiment of stretch condition detection of PQDc body was conducted where this PQDc body simulating the arm surface was prodded and pinched to cause the surface to stretch, and the corresponding resistivity distributions were estimated.

Figure 41:
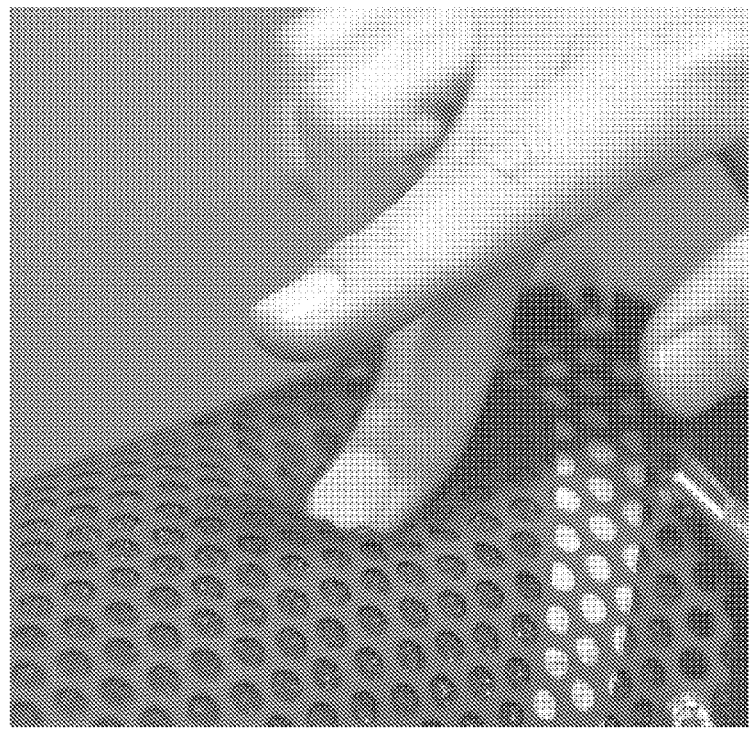
FIG. 41 is a Photograph image of a condition where a PQDc body conforming to the present invention is prodded with a fingertip.

FIG. 41 is a photograph showing a condition of prodding, or specifically a condition of the PQDc body when it was prodded with the fingertip. FIG. 42 shows the resistivity distribution actually estimated in a condition where the PQDc body was prodded with small force, while FIG. 43 shows the resistivity distribution actually estimated in a condition where the PQDc body was prodded with strong force. Each white dot indicates a prodded point, and the dark area around the dot indicates a region where the PQDc body was stretched as a result of prodding. It is clear that the stretch conditions of the PQDc body resulting from prodding were detected clearly and stretching around the prodded point increased according to the degree of prodding.

Figure 44:
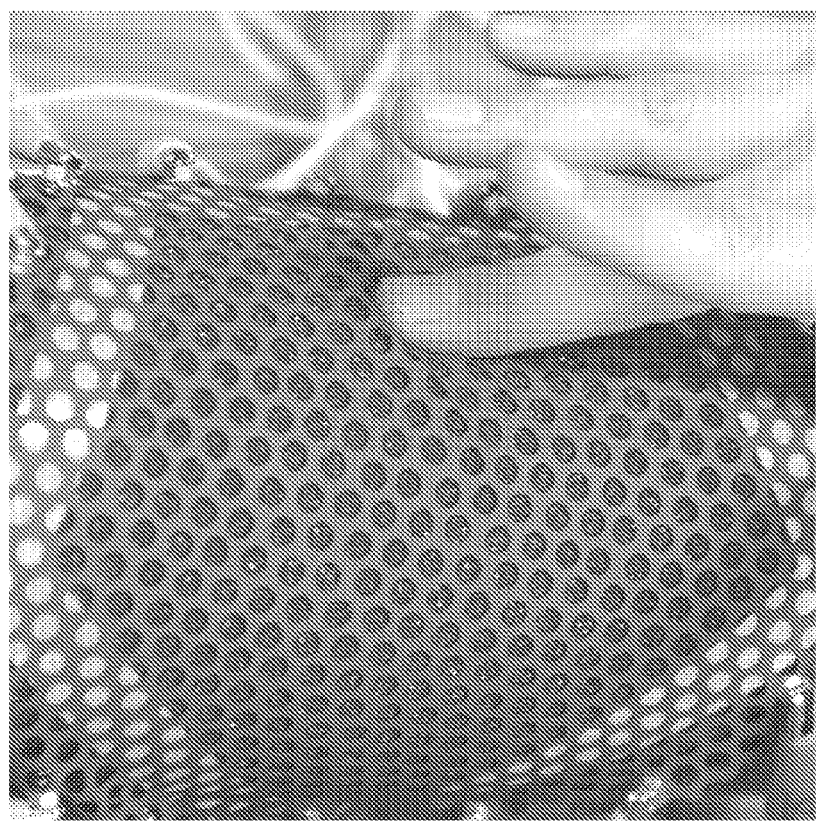
FIG. 44 is a Photograph image of a condition where a PQDc body conforming to the present invention is rubbed with a pulp of a finger.
Figure 45:
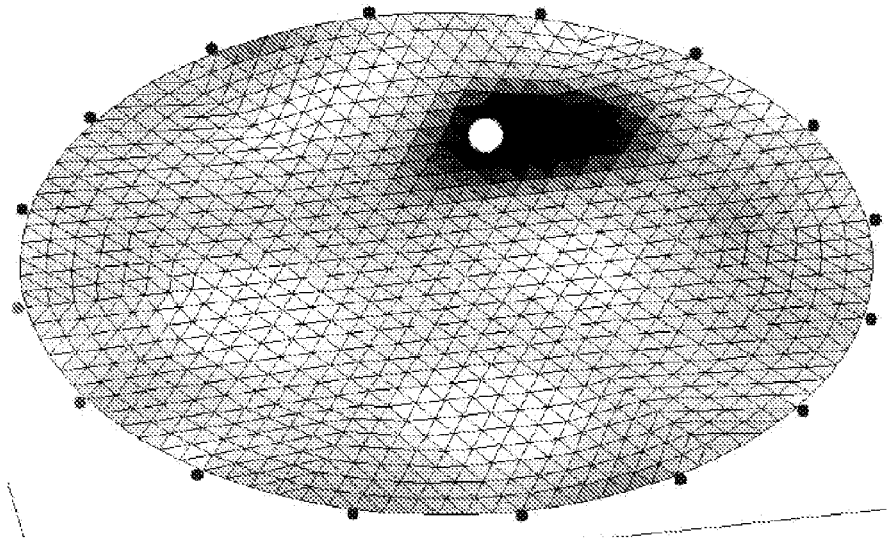
FIG. 45 is a Resistivity distribution diagram based on actual estimation in the condition in FIG. 44.

FIG. 44 shows a condition of rubbing, or specifically a condition where the PQDc body was rubbed with the pulp of a finger. FIG. 45 shows the resistivity distribution actually estimated in the condition in FIG. 44. The PQDc body was rubbed by moving the pulp of the finger slightly toward the fingertip in a condition where the pulp of the finger was stationary and in contact with the PQDc body by means of static friction. This way, the PQDc body shrank on the fingertip side of the area near the contact point between the finger and PQDc body, while the PQDc body stretched on the opposite side. From the estimation calculation results, it is shown that the area around the white dot indicating the fingertip is darkened on the opposite side of the fingertip, indicating that the PQDc body was stretched strongly on this side compared to the fingertip side.

Figure 46:
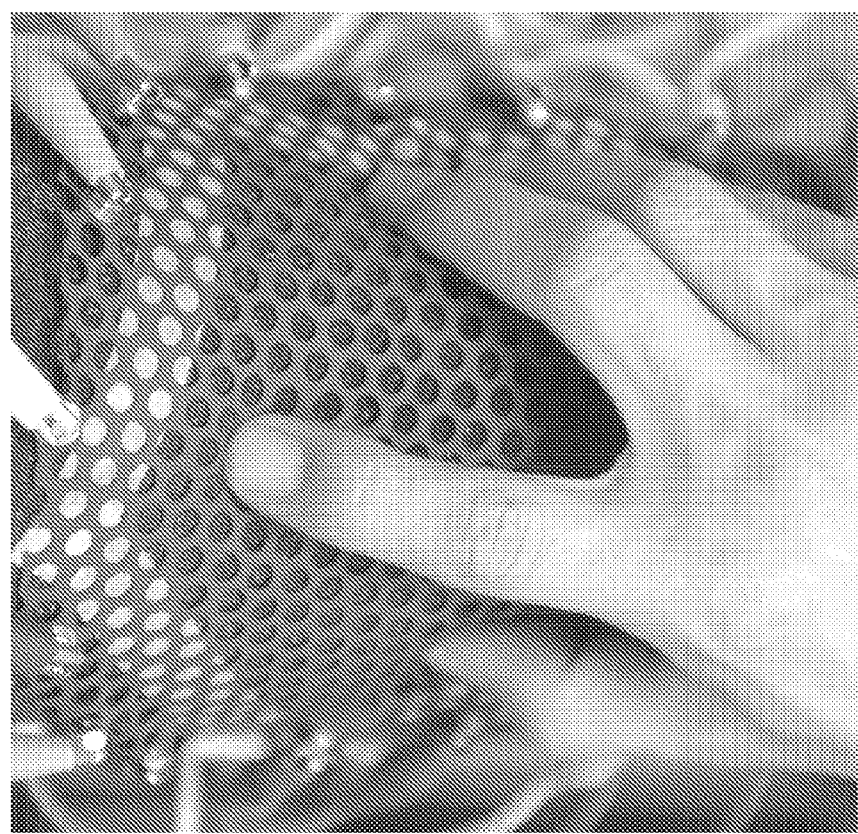
FIG. 46 is a Photograph image of a condition where a PQDc body conforming to the present invention is grabbed with three fingers.
Figure 47:
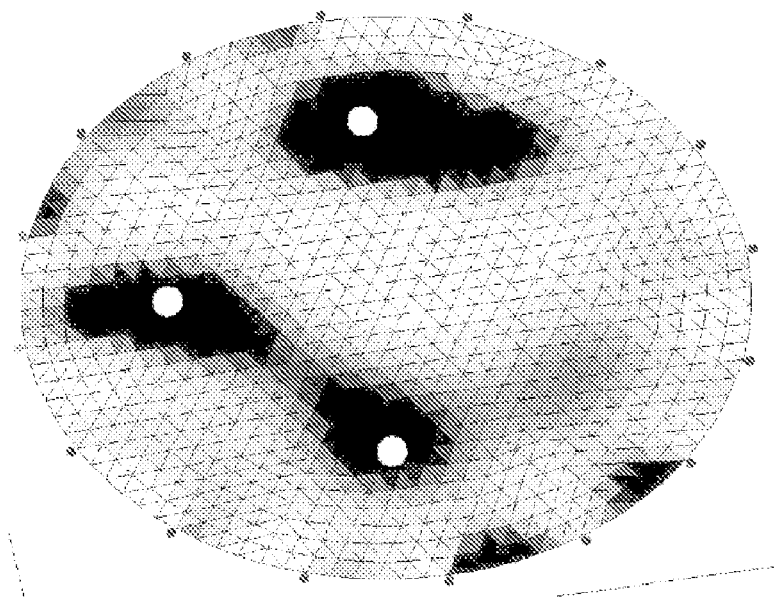
FIG. 47 is a Resistivity distribution diagram based on actual estimation in the condition in FIG. 46.

FIG. 46 indicates a condition of grabbing, or specifically a condition where the PQDc body was grabbed with three fingers. This condition is similar to one where three points are prodded simultaneously. FIG. 47 shows the resistivity distribution actually estimated in the condition in FIG. 46. The white dots indicate rough fingertip positions. It is shown that even when three points were prodded simultaneously, the three points could be differentiated to some extent.

Figure 48:
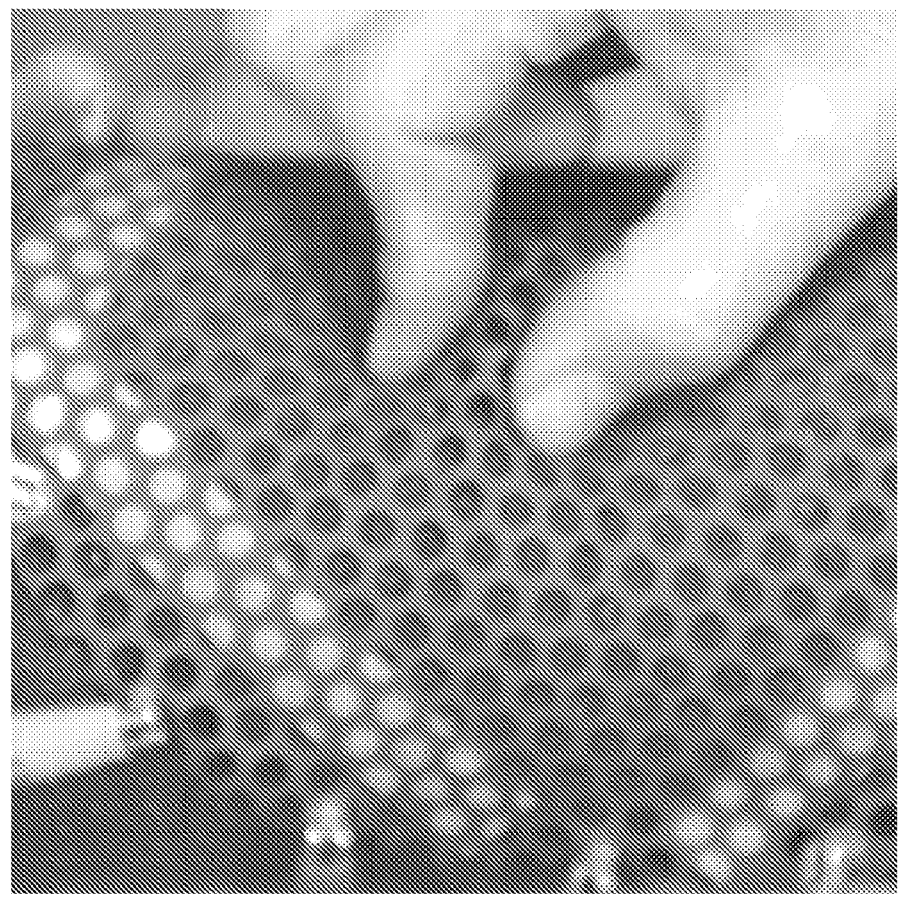
FIG. 48 is a Photograph image of a condition where a PQDc body conforming to the present invention is pinched with two fingers, specifically between an index finger and thumb.

FIG. 48 shows a condition of pinching, or specifically a condition where the PQDc body was pinched by two fingers including the index finger and thumb.

Figure 49:
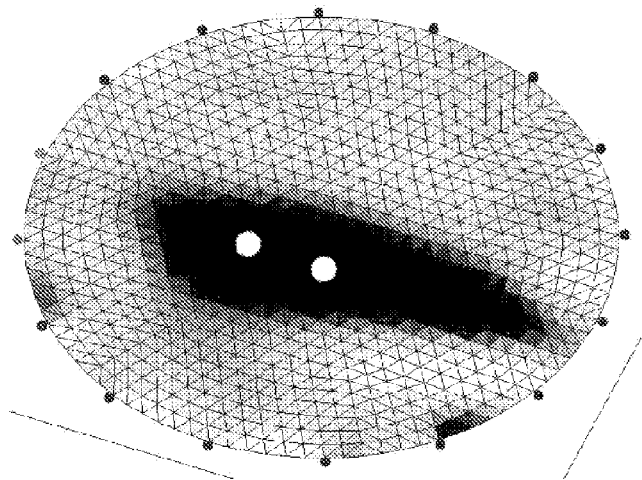
FIG. 49 is a Resistivity distribution diagram based on actual estimation in the condition in FIG. 48.

FIG. 49 shows the resistivity distribution actually estimated in the condition in FIG. 48. The white points indicate the rough positions of the fingertips of two pinching fingers. Since the two pinched points were very close to each other, the two points could not be differentiated. However, it is shown that the stretch condition around the pinched points could be detected clearly.

The actual experiment explained above confirmed that by using a porous pressure-sensitive conductive rubber sheet, pinching, rubbing and other actions exerted upon the skin could be detected sufficiently. Conventional tactile sensors are basically used to measure pressure distribution, where the measurement is performed mainly on a relatively hard base where a non-stretchable FPC board can be installed without problem. This is likely the reason why no tactile sensors that are soft and have stretchable surface like the one in this example, nor examples of using these sensors to detect the stretch condition itself, have been reported.

The tactile sensor proposed by the present invention has no wirings at all in most of the measurement region, and therefore a more advanced tactile sensing capable of sensing pinching, rubbing and other actions demonstrated in the experience can be implemented, which could not be achieved in conventional studies or using commercially available tactile sensors.

Also, the aforementioned results of experiment confirmed that it was feasible to actually provide many holes in the PQDc body. This porosity improved stretchability and flexibility, and the improved sensitivity to stretchability could also be confirmed from the results of experiment. In addition, the many holes provided in the porous structure create more favorable air flows, which allows for efficient discharge of heat generated inside the robot. With conventional tactile sensors where air is not exchanged at all between the bottom face and top face of the sensor, heat generated by the motors and electronic circuits inside the robot cannot be discharged and thus problems occur easily. This heat discharge is expected to present a serious problem as robotic tactile sensors become more advanced in the future. The porous structure proposed by the present invention realizes characteristics that make it clearly different from conventional tactile sensors in the area of heat discharge.

In this example, simply the stretch condition was estimated and it was not possible to differentiate specific actions, such as prodding and rubbing. However, a sensor capable of measuring contact and stretching simultaneously can be constituted by providing a separate contact distribution sensor according to the method explained in paragraph 0176 of the instant application as published as U.S. Pre-Grant Publication No. 2010/0049450 (which paragraph corresponds to paragraph 0046 of the instant application as filed) or using a pressure-sensitive conductive rubber sheet that reacts to very small pressure, and then layering this separate sensor on top of the porous stretch distribution sensor used in this example. This way, the actual fingertip positions corresponding to the white dots in the figure can be measured simultaneously to allow for differentiation of prodding and rubbing, etc.

Example

Pressure Distribution Sensor of Complex Shape

The actual result of implementing a pressure distribution sensor whose region and electrode arrangement do not conform to a simple shape such as circle or ellipse, is explained.

In general, circular conductive bodies are often used under EIT. In principle, however, the conductive body that estimates the resistivity distribution can have any regional shape and any arrangement of electrodes. However, the freedom of regional shape and arrangement of electrodes have a trade-off relationship with the estimation accuracy, because the estimation accuracy is lower at points farther away from the electrodes.

Figure 50:
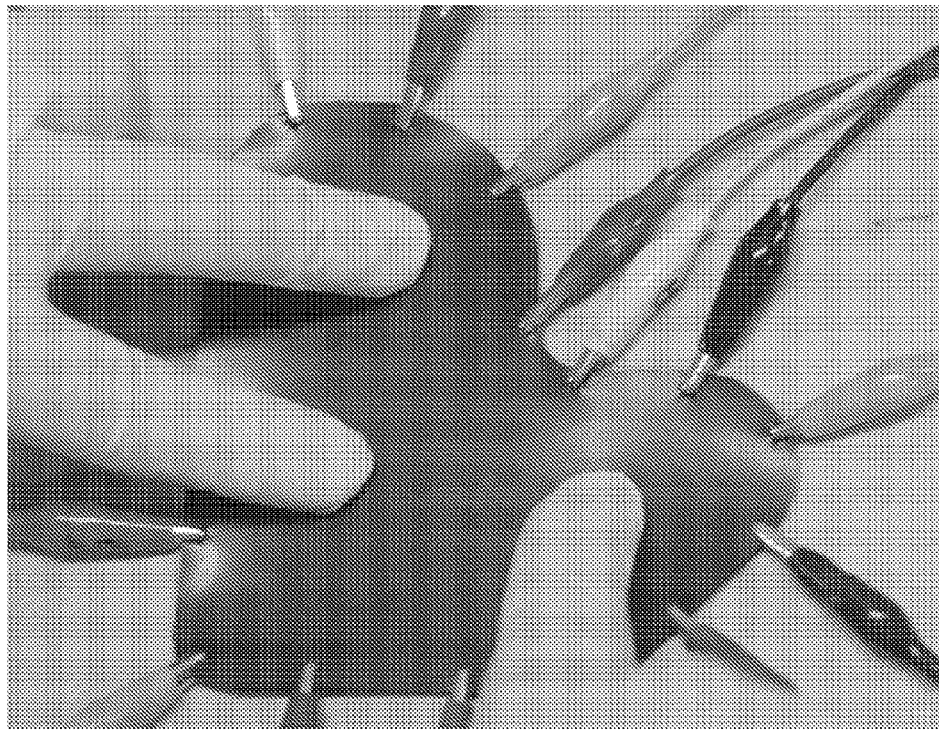
FIG. 50 is a Photograph image of a condition where a PQDc body conforming to the present invention, which is constituted by a conductive rubber sheet of non-monotonous shape, is given pressure with three fingers.

FIG. 50 is an example of a PQDc body constituted by a conductive rubber sheet formed in a distorted, non-monotonous heart shape. This conductive rubber sheet is a commercially available product and carbon is mixed into rubber. When pressure is applied, the resistivity in the horizontal direction increases in the pressurized region. As shown in the figure, pressure was applied at three points using fingertips.

Figure 51:
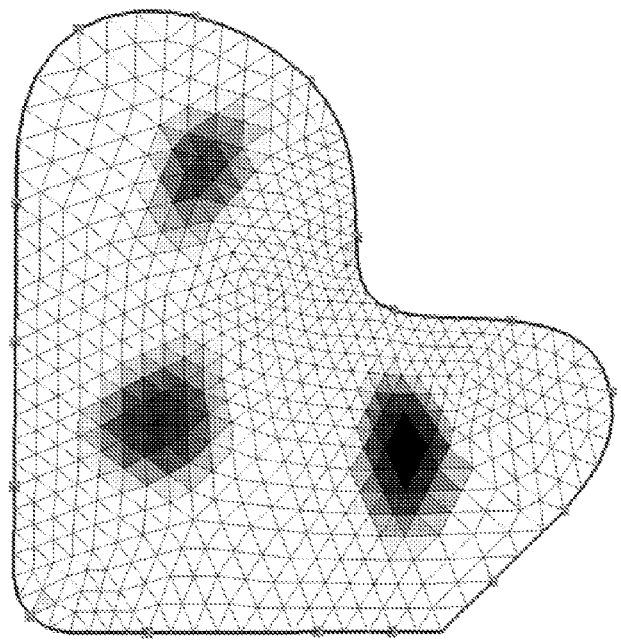
FIG. 51 is a Resistivity distribution diagram based on actual estimation in the condition in FIG. 50.

FIG. 51 shows the estimation result of pressure distribution in this example. As you can see, the three points were clearly detected. This demonstrates that the present technique functions effectively even with a complex shape.

Conventional tactile sensors have many wirings filling inside the region, and thus adopting a special sensor shape gives rise to a need to design the internal wirings according to the shape, in which case a custom specification becomes necessary depending on the shape. Such custom specification results in high cost. Under the present invention, on the other hand, the shape of the conductive rubber sheet constituting the PQDc body can be easily adjusted using scissors, etc., so the cost can be lowered substantially.

Figure 52:
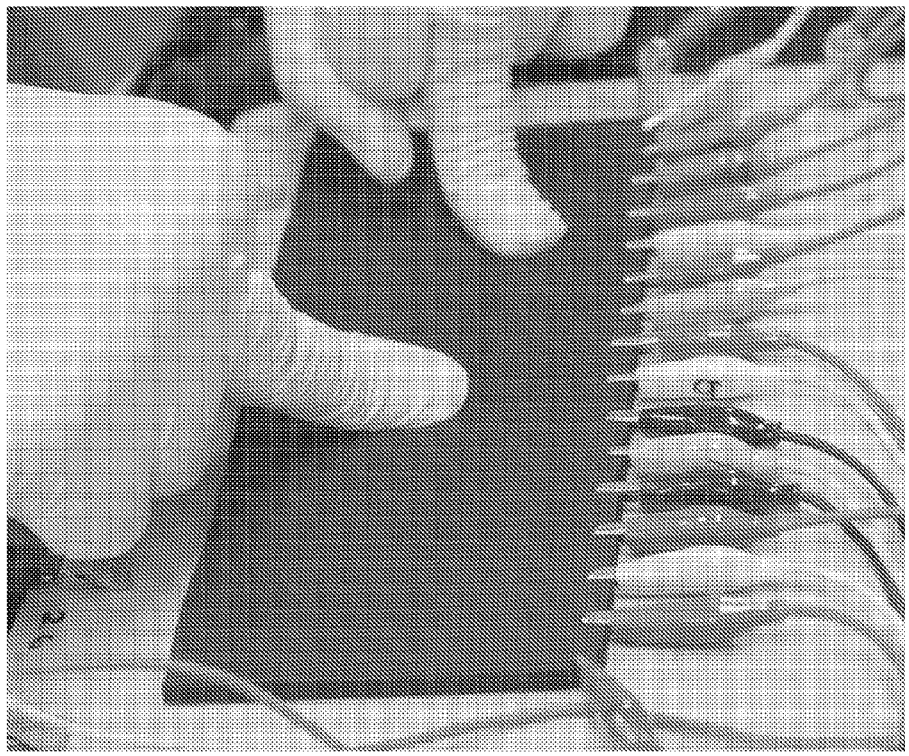
FIG. 52 is a Photograph image of a condition where a rectangular PQDc body conforming to the present invention, where electrodes are arranged unevenly along one side, is given pressure with two fingers.

FIG. 52 shows an example of experiment where 16 electrodes were arranged unevenly along one side of a rectangular PQDc body. Normally it is desirable, from the viewpoint of accuracy, to arrange the electrodes uniformly around the boundary of the rectangle. If the electrodes are arranged unevenly, as shown in FIG. 52, the region of high stretchability and flexibility can be increased significantly, which is effective in such implementations where functionality is more important than accuracy. The conductive body constituting the PQDc body uses a conductive foam urethane sheet. When pressure is applied to this sheet, the resistivity in the horizontal direction increases in the pressurized region. Pressure was applied by pressing two points via fingertips, as shown in FIG. 52.

FIG. 53 shows the estimation result of pressure distribution. Although the PQDc body was not surrounded by the electrodes at the boundary and the electrodes were arranged unevenly along one side, the two points were correctly detected. However, an estimation error occurred, indicated by the shadow on the opposite side of the electrodes. This is due to the general characteristic that the estimation error becomes greater at points farther away from the electrodes. Although the estimation error worsens, as shown here, a significantly advantageous feature can be realized that stretchability and flexibility can be improved at the boundary where no electrodes are present.

Although 16 electrodes were installed at the boundary of the region, in the same manner explained under "Example: Porous stretch distribution sensor," the intervals between two adjacent electrodes were not constant. Also, the electric signal processing part was different from the one explained in "Example: Porous stretch distribution sensor" in that the electric signal processing unit used in this example adopted ADS1258 manufactured by Analog Devices (24 bits, 16 channels, 16 MHz, ΣΔ conversion, approx. 23 ksps of conversion time) as the AD converter for electric potential measurement, and current was injected by impressing voltage on each electrode directly from the IO terminals of the single-chip microcontroller C8051 manufactured by Silicon Laboratories that permits selection of power-supply voltage, GND or high-impedance state. The output from the AD converter was read by this C8051 and the data was then transferred to the computer using SMBUS, which is the serial communication function of C8051. Data was acquired using the Adjacent method in the same manner as explained in paragraph 0438 of the instant application as published as U.S. Pre-Grant Publication No. 2010/0049450 (which paragraph is included in paragraph 0220 of the instant application as filed), and the estimation calculation was also based on the same least square method including regularization terms. Needless to say, forward models of heart shape and rectangular shape were used, where the respective shapes were created in CAD and then meshed using the automatic meshing software (Meshing Library by Netgen), with the meshed models used as FEM models. The number of mesh elements was 2048.

Example

Pressure Distribution Sensor on Complex Curved Surface Using Conductive Knitted Fabric The actual result of implementing a pressure distribution sensor on a complex curved surface using a highly stretchable PQDc body constituted by a conductive knitted fabric is explained.

Although conductive rubbers are a representative example of stretchable conductive body, conductive rubber materials having enough stretch characteristics to conform to very high degrees of stretching, like those generated by the skin around joints, are limited and difficult to obtain. Materials achieving higher degrees of stretching than conductive rubbers include knitted fabrics used for general clothes. Many knitted fabrics can stretch up to 150% or more, and a far greater deformation can be achieved with a smaller force compared to conductive rubbers, etc. Since knitted fabrics are not conductive on their own, a conductive knitted fabric was developed by adding conductivity to a knitted fabric.

One possible method to add conductivity to a knitted fabric is to use conductive fibers. In this example, however, an original method was used. To be specific, conductive paint was spray-coated on a knitted fabric constituted by normal non-conductive fibers, to allow the conductive paint to permeate through the fibers and consequently add conductivity to the knitted fabric. In this example, a mixture of water, carbon powder, and binder to fix carbon onto the fabric, was used as conductive paint. Examples of carbon powder that can be used include carbon black and acetylene black, while examples of binders that can be used include resin binder and glue. The fabric can be knitted in various ways, such as flat knitting. The knitted fabric used in this example was a general flat-knitted fabric made of 100% cotton fibers, and the fabric was approx. 1 mm thick and the pitch of knitted stitches was approx. 1 mm in a no-load condition. When conductive paint is sprayed, conductive paint permeates through the cotton fibers. When the water evaporates, the carbon powder is fixed in the fibers by means of binder to add conductivity to the fibers. Since the binder for fixing carbon acted like glue, the stretchability worsened after conductive paint was coated. However, the stretch ratio in the horizontal direction was approx. 190% while that in the vertical direction was approx. 150% after conductive paint was coated. These figures show that higher stretchability was achieved with a smaller force compared to conductive rubbers. Although the resistivity of a conductive knitted fabric is normally adjusted based on the concentration of conductive paint, number of coatings, etc., the knitted fabric used in this example had a resistivity value of approx. 50 kΩ in a no-load condition when measured in the lengthwise direction using a band of 2 cm wide and 8 cm long.

When the conductive knitted fabric thus created was stretched, the condition of fiber contacts at knitted stitches and condition of fibers both changed, and consequently the resistivity changed. With knitted fabrics such as flat-knitted fabrics, basically the fibers run in the horizontal direction and in the vertical direction the top and bottom fibers intersect with each other via knitted stitches. Accordingly, this difference in the mechanism of stretching between the vertical direction and horizontal direction also causes resistivity change in the two directions. In general, the resistivity drops as a result of stretching in the horizontal direction of knitted stitches. As for stretching in the vertical direction, the resistivity gradually increases when stretching is started and when a certain level of stretching is reached, the resistivity starts to decrease. With the knitted fabric used in this example, the resistivity increased to approx. three times when the fabric was stretched in the vertical direction. When the fabric was further stretched from this condition, the resistivity started to decrease and dropped to approx. ½ the initial level at the maximally stretched condition. The ratio of this rise and fall in resistivity varies significantly from one fabric to another, where uneven coating of conductive paint, etc., and other irregularities during fabrication are considered as factors of such large variation. As explained above, conductive knitted fabrics exhibit slightly complex behaviors when it comes to stretching.

Having these characteristics, conductive knitted fabrics also have the characteristic of exhibiting lower resistivity in the horizontal direction when pressure is received in the surface direction. This is likely due to the increase in conductivity caused by the higher density of fibers around the pressurized point. Another notable characteristic of conductive knitted fabrics is that the hysteresis is small upon resistivity change with respect to pressure. It is widely known that pressure-sensitive conductive rubbers produce hysteresis (residual resistivity) when the resistivity changes relative to pressure. For example, applying pressure to a pressure-sensitive conducive rubber sheet in a non-pressurized condition causes the resistivity in the horizontal direction to decrease due to the pressure. When the pressure is removed and the pressure-sensitive conducive rubber sheet is brought back to a non-pressurized condition, the resistivity is different from the value in the initial non-pressurized condition. This is an example of hysteresis. On the other hand, the conductive knitted fabric used in this example exhibited lower resistivity in the horizontal direction when pressure was applied in a non-pressurized condition, and when the pressure was removed to bring the conductive knitted fabric to a non-pressurized condition, the resistivity immediately recovered to a level near the resistivity in the initial non-pressurized condition. In a sense, having a very small hysteresis compared to conductive rubbers and pressure-sensitive conductive rubbers is one feature of conductive knitted fabrics.

FIGS. 54(a) and 54(b) show how the resistivity value in the horizontal direction changes when pressure is applied to a conductive rubber and conductive knitted fabric from the direction vertical to the surface. Among the graphs in FIGS. 54(a) and 54(b), one relating to the conductive rubber is referred to as FIG. 54(a), while the other relating to the conductive knitted fabric is referred to as FIG. 54(b). The horizontal axis and vertical axis represent time and resistivity value, respectively. Take note that the values shown along the horizontal axis are the same as the values used in the calculation program, where 30 corresponds to approx. 1 second. With the vertical axis, the resistivity unit such as ohm is not directly indicated, but indicator values indicating the ratio of change in resistivity value over time are shown in order to help observe how the condition changes. Also, the conductive rubber used in FIG. 54(a) exhibited higher resistivity value when pressure was applied, while the conductive knitted fabric used in FIG. 54(b) exhibited lower resistivity value when pressure was applied.

The section from time 0 to approx. 130 represents a condition where no pressure was applied, as shown by the resistivity indicator values, which are all approx. 0 along the vertical axis. When time reached approx. 130, a specified pressure was given to each surface. As a result, the conductive rubber in FIG. 54 (a) changed its condition to one of higher resistivity value, while the conductive knitted fabric in FIG. 54 (b) changed its condition to one of lower resistivity value. When time subsequently reached approx. 250, the pressure was removed to 0. As you can see, the resistivity indicator values again changed to values closer to 0 in both graphs.

One important point to note here is that with the conductive rubber in FIG. 54 (a), the resistivity indicator value recovered only to approx. 30% of the pressurized condition even after removal of pressure. This is explained by the hysteresis phenomenon, which is well known for conductive rubbers and pressure-sensitive conductive rubbers. On the other hand, the resistivity indicator value of the conductive knitted fabric in FIG. 54 (b) quickly recovered to "0," although some slight overshooting less than 10% was observed. This low level of resistivity hysteresis and quick recovery of resistivity after removal of pressure are undoubtedly favorable features compared to conductive rubbers and pressure-sensitive conductive rubbers.

As explained above, the conductive knitted fabric developed under the present invention has the possibility, if used as a PQDc body of a tactile distribution sensor conforming to the present invention, of achieving high-accuracy measurement producing less hysteresis compared to when conductive rubber sheets, etc., are used. In fact, good physical quantity distribution measurement was realized in the example of pressure distribution sensing explained later, where large hysteresis associated with conductive rubbers was absent and the resistivity value recovered quickly after removal of pressure.

Take note that the aforementioned characteristic of small hysteresis may also make the conductive knitted fabric usable as an alternative to the pressure-sensitive elements of conventional pressure distribution sensors constituted by pressure-sensitive rubbers, pressure-sensitive inks, etc.

Figure 56:
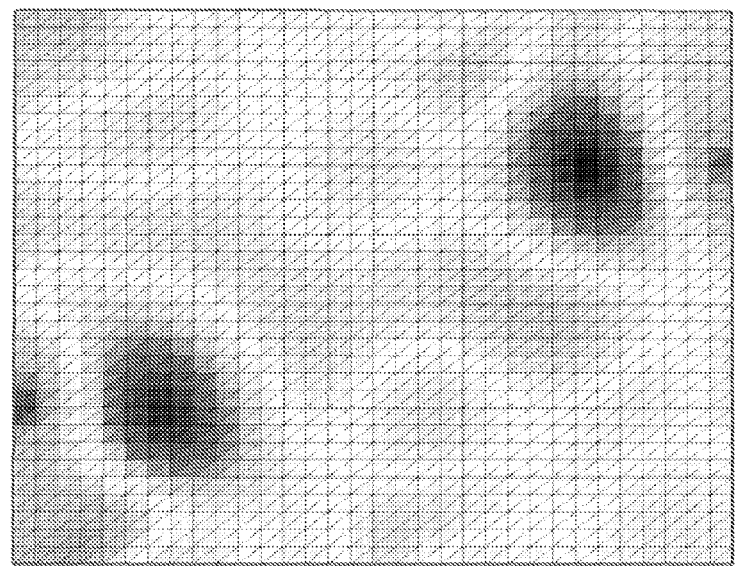
FIG. 56 is a Resistivity distribution diagram based on actual estimation in the condition in FIG. 55.

FIG. 55 is a photograph showing a rectangular PQDc body constituted by a conductive knitted fabric, with a 300-g weight placed at each of two points on the PQDc body. FIG. 56 shows the result of estimation calculation of resistivity distribution. Here, 16 electrodes were installed at the boundary of this PQDc body and the same electric signal processing unit described in "Example: Pressure distribution sensor of complex shape" was used. Also, the voltage impression, voltage measurement and other procedures as well as the estimation calculation method were the same as those described in "Example: Porous stretch distribution sensor." Note, however, that the forward model used had a rectangular shape, not circular shape. As you can see, pressures at the two points on the fabricated conductive knitted fabric were measured clearly, which confirms the effectiveness of the conductive knitted fabric for use in a pressure distribution sensor.

Since very high stretchability is one feature of the conductive knitted fabric, a PQDc body made of the conductive knitted fabric, even when it has a simple rectangular shape, can be implemented on complex curved surfaces by taking advantage of this stretchability. This is equivalent to non-dynamic stretching case Ds described in Paragraph 0139.

Figure 57:
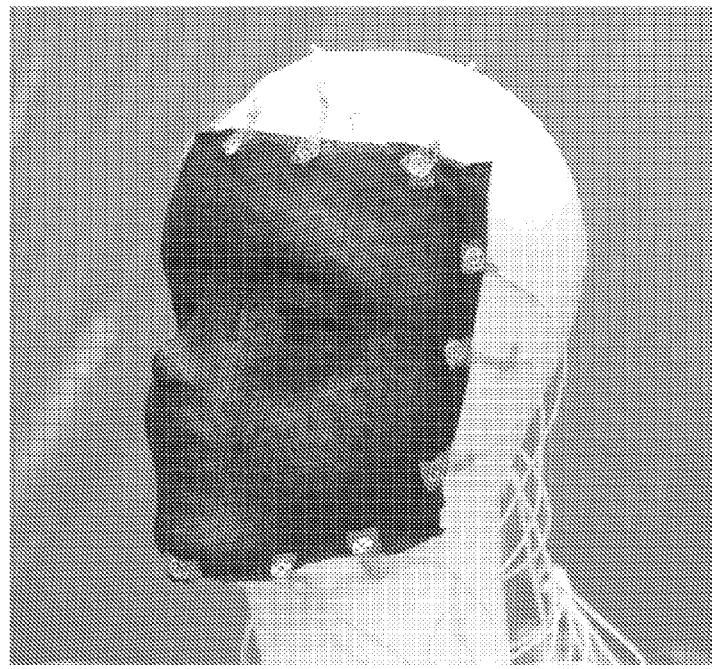
FIG. 57 is a Photograph image of a condition where a conductive knitted fabric conforming to the present invention is attached on a surface of a model simulating a human head.

FIG. 57 shows a conductive knitted fabric attached on the surface of a model created by simulating a human head. This face model has a very complex shape, featuring the nose, jaw and other projected parts, as well as large concaves around the eyes, etc. The conductive knitted fabric was attached after double-sided adhesive tape was attached over a wide range of the face model, in order to affix the conductive knitted fabric in a manner closely adhering to the complex curved surfaces of the face model. Since its stretchability allows the knitted conductive fabric to conform to the projections and concaves, the knitted conductive fabric could be attached in a manner forming a smooth surface over the curved surfaces without wrinkles, etc.

FIGS. 58(a), 58(b) and 58(c) show the result of an experiment where the pressure distribution was actually measured with the conductive knitted fabric attached on the surface of the face model. The images are divided into FIG. 58(a) which is a group including nine images in the top three levels, FIG. 58(b) which is a group including the left and center images in the fourth level, and FIG. 58(c), which is a group including the fight image in the fourth level.

In FIG. 58(a), the images in the first level corresponding to conditions where the three points, namely the left side of the forehead, center of the forehead and fight side of the forehead, were pushed, from the left. Also in FIG. 58(a), the three images in the second level correspond to conditions where three points, namely below the left eye, nose, and below the fight eye, were pushed, from the left. Still in FIG. 58(a), the three images in the third level correspond to conditions where the three points, namely the left jaw, center jaw and fight jaw, were pushed, from the left. The two images in FIG. 58(b) show conditions of pushing the concaved eyes, while the image in FIG. 58(c) shows a condition of pressing two points. As shown in the respective images, the pressure points were detected clearly, even in locations of sharp projections such as the nose and concaves around the eyes below the eyebrows. It should be noted that the pressure distribution was measured without problem despite the complexity of stretch condition. The conductive knitted fabric changed its shape to one slightly different from the original rectangle as a result of stretching. However, the shape change of the PQDc body was not reflected in the forward model and thus the distribution positions shown in these images are approximate positions.

Most of conventional tactile sensors provide no stretchability because they are constituted by a FPC board, etc. Therefore, it is extremely difficult to install conventional pressure distribution sensors on complex curved surfaces, such as those represented by the face model used here. Accordingly, a special sensor shape must be customized, which tends to increase the cost significantly. If the conductive knitted fabric developed under the present invention is used, on the other hand, its stretchability can be utilized to easily install the sheet on such complex curved surfaces, even when the sheet itself has a simple shape. This is an extremely useful and original feature not available in conventional tactile distribution sensor. Although not as much as the face, various parts of the body of a humanoid robot, etc., also have many complex curved surfaces, and therefore the conductive knitted fabric is also considered extremely effective in implementations involving these areas. In addition, the conductive knitted fabric is basically a fabric, so sensor using it can be used with much less unpleasant feeling compared to conventional film-like sensors, even when the sensor directly contacts the human body such as in the measurement of pressure distribution on the sole or in a prosthetic leg.

The conductive knitted fabric can be created not only by spray-coating conductive paint over a normal non-conductive knitted fabric, but also by soaking a normal non-conductive knitted fabric directly in paint or coating conductive paint using a brush, etc. Also, a conductive knitted fabric having similar characteristics can also be created directly using conductive fibers, instead of using conductive paint. Examples of these conductive fibers include conductive fibers made of a material for synthetic fiber mixed with carbon, conductive fibers constituted by sulfuric copper such as Thunderon, metal-plated synthetic fibers (polyester, nylon, etc., plated by silver, copper, nickel, gold, etc.), and metal fibers made by shaping stainless steel, copper and other metals into fiber shape, or alternatively normal non-conductive fibers (polyester, nylon and other synthetic fibers or cotton, hemp and other plant fibers, etc.) can be mixed with the aforementioned conductive fibers.

Example

Implementation of Stretchable Contact Distribution Sensor Around Elbow Joint

Since the surface area around a robot's joint changes significantly as the joint angle changes, conventional non-stretchable tactile sensors cannot sufficiently cover regions near joints. Accordingly, it has been very difficult to measure tactile sensing condition around the elbow, knee, etc. Using a stretchable tactile distribution sensor conforming to the present invention, however, tactile sensing near joints, which has been difficult, becomes possible. The conductive knitted fabric described in "Example: Pressure distribution sensor on complex curved surface using conductive knitted fabric" provides stretchability of 150% or more, just like general knitted fabrics, and thus can be mounted around moving joints. In this example, a stretchable rectangular conductive knitted fabric was installed on the elbow joint based on the concept illustrated in FIGS. 30(*a*) and 30(*b*).

Next, a contact distribution sensor using a conductive knitted fabric is explained. Although a conductive knitted fabric also functions as a pressure sensor, small pressures, such as slight touches, weak contacts, etc., cannot be detected with sufficient sensitivity. To address this problem, a contact distribution sensor capable of detecting minor pressures can be constituted by placing a thin net-like or porous insulation sheet on a conductive knitted fabric and then placing a conductive sheet on top. The principle is as follows. In a normal condition, the conductive sheet and conductive knitted fabric are separated by a porous insulation sheet. When minor contact force is applied, the conductive knitted fabric makes contact with the conductive sheet through the holes provided in the insulation sheet, and consequently the resistivity becomes very low around the contacted region. The contact condition can be converted to resistivity distribution of the conductive knitted fabric based on this mechanism. Porous insulation sheets that can be used include coarse insulation sheets such as gauze, or very fine insulation sheets such as tissue paper. Another feature of this method is that the sensitivity to contact force can be adjusted according to the degree of porosity and thickness of the insulation sheet. As a result, the sensitivity range can be adjusted freely in a manner suitable for very sensitive contact sensors as well as relatively large pressure sensors. In this example, gauze was used as an insulation sheet, and silver-coated polyester net was used as a conductive sheet. Minor contact forces of approx. 100 g, applied by fingertips, could be detected.

Since 16 electrodes are arranged uniformly, together with wirings, at the boundary of the rectangular conductive knitted fabric, the boundary cannot be stretched significantly. However, as shown in FIGS. 30(*a*) and 30(*b*), the side of the joint and near the center of the link are locations less vulnerable to change in surface area due to change in joint angle, and thus electrodes and wirings are arranged in these areas. FIG. 59 shows an actual installation on the elbow. In this figure, a sensor is also installed on the shoulder joint. However, the following explains only the application to the elbow for the purpose of simplification. The implementation used a dummy's elbow joint whose angle can be changed, instead of a robot. Since the dummy's elbow joint had surface irregularities, around three soft foamed urethane sheets were wrapped around it to simulate a smooth surface shape like that of a human, and then a rectangular conductive knitted fabric of 12.5 cm in length and 8.5 cm in width was attached and affixed on this elbow, and also on the shoulder. The conductive knitted fabric was affixed using double-sided adhesive tape attached to the boundary of the rectangle. On top of the conductive knitted fabric, an insulation sheet and conductive sheet were layered to constitute a contact distribution sensor. The electric signal processing unit, measurement procedure, estimation calculation method, etc., were the same as those described in "Example: Pressure distribution sensor on complex curved surface using conductive knitted fabric."

Take note that if one simple conductive sheet alone is layered on top, applying pressure at two points causes the two points on the conductive knitted fabric to form electrical continuity via the conductive sheet, and consequently the pressure at only one point can be measured. By constituting the conductive sheet using many dots, however, simultaneous measurement of multiple points becomes possible. For example, many small circular dot patterns can be coated on an insulation sheet using conductive paint. Since individual dot patterns are not electrically contacting one another, formation of electrical continuity can be prevented. The patterns should be made as fine as possible because the size of an individual dot corresponds to the minimum resolution in the contact area to be measured.

Figure 60:
FIG. 60 is a Photograph image of a condition where a contact distribution sensor conforming to the present invention is installed on an elbow and the contact distribution sensor is pressed gently with a fingertip with the elbow bent.

FIG. 60 shows a condition where the contact distribution sensor is gently pushed with a fingertip with the elbow bent.

Figure 61:
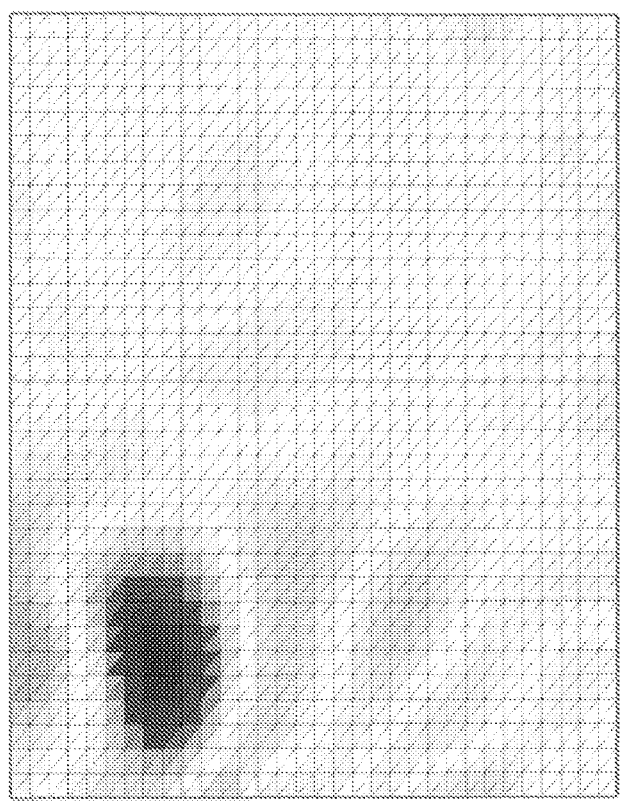
FIG. 61 is a Resistivity distribution diagram based on actual estimation in the condition in FIG. 60.

FIG. 61 shows the result of estimation calculation of resistivity distribution in the condition in FIG. 60. As you can see, the contact distribution generated by touching with the fingertip was detected clearly.

Figure 62:
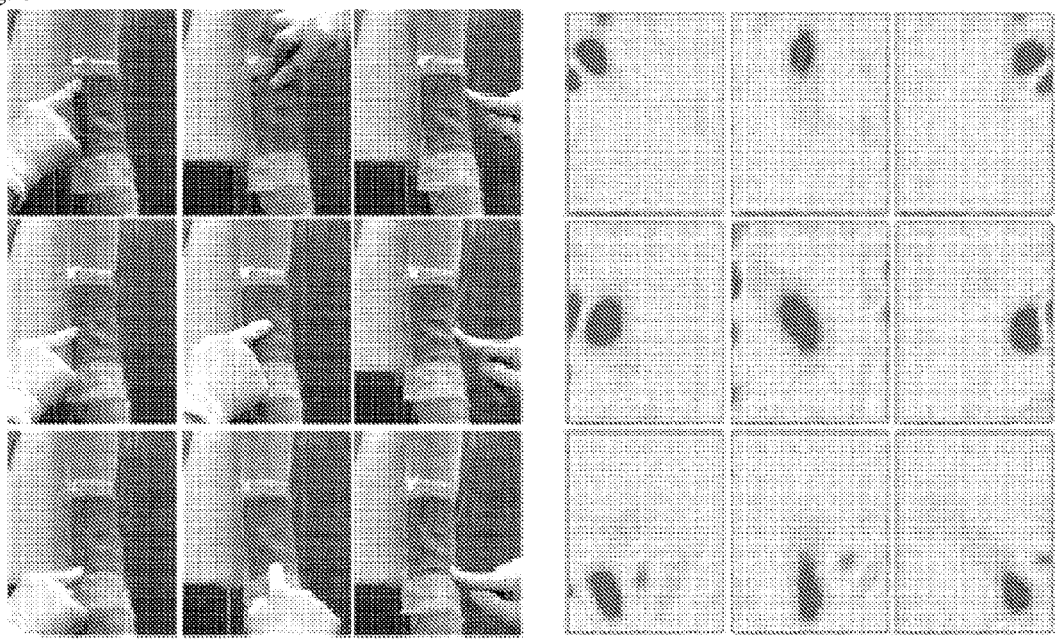
FIG. 62 is a Photograph image of measurements at nine points taken in a condition where a contact distribution sensor conforming to the present invention is installed on an elbow and the elbow is straightened, as well as resistivity distribution diagram based on actual estimation in this condition.
Figure 63:
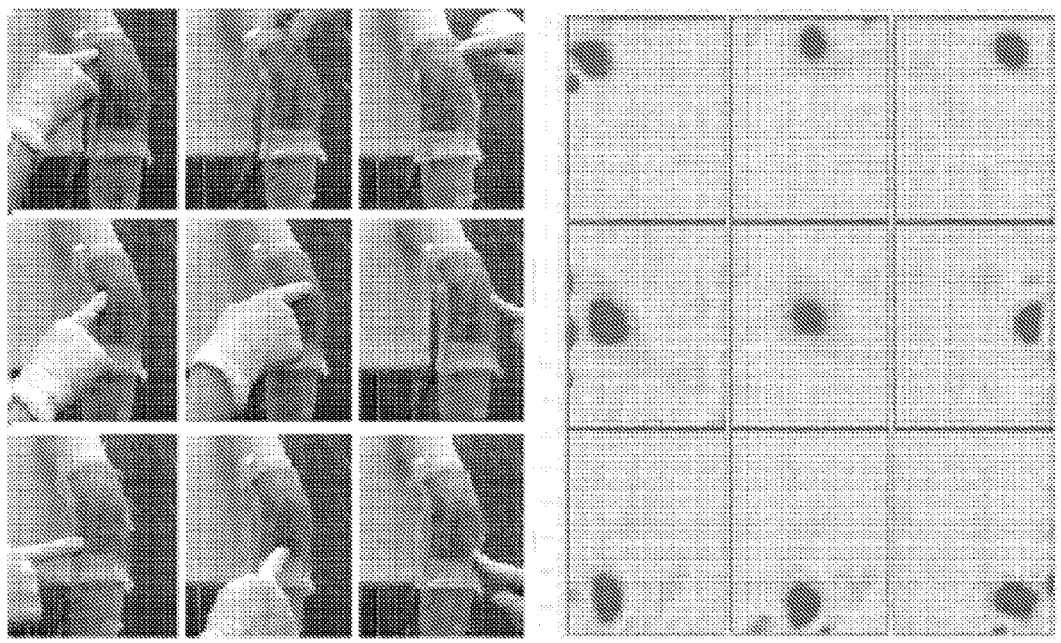
FIG. 63 is a Photograph image of measurements at nine points taken in a condition where a contact distribution sensor conforming to the present invention is installed on an elbow and the elbow joint is bent slightly by 45 degrees, as well as resistivity distribution diagram based on actual estimation in this condition.
Figure 64:
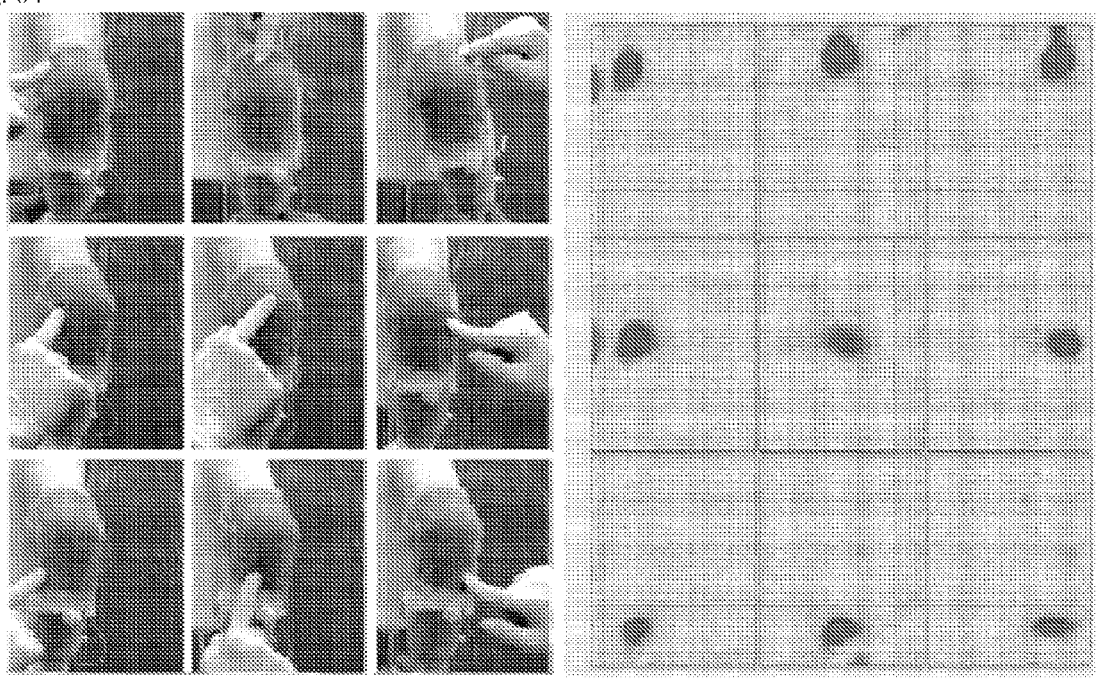
FIG. 64 is a Photograph image of measurements at nine points taken in a condition where a contact sensor conforming to the present invention is installed on an elbow and the elbow joint is bent considerably by 90 degrees, as well as resistivity distribution diagram based on actual estimation in this condition.

Next, it is shown that the contact distributions generated when a total of nine points on this rectangular PQDc body, including three at the top, three at the center and three at the bottom, could be detected even when the joint angle was changed. FIG. 62 shows the measured results at the nine points with the elbow joint straightened, FIG. 63 shows the measured results at the nine points with the elbow joint bent slightly by 45 degrees, and FIG. 64 shows the measured results at the nine points with the elbow joint bent considerably by 90 degrees. The nine photographs including three each in the three levels on the left show conditions of fingertip contact at the respective points, while the nine figures including three each in the three levels on the right show the results of estimation calculation of resistivity distribution of in conditions at left. In all cases, the contact point was detected clearly. When the elbow joint was not bent, the conductive knitted fabric was slightly wrinkled. When the elbow joint was bent by 90 degrees, the contact condition could be detected, without notable worsening of the detection condition, although the PQDc body was stretched fairly significantly.

There seem to be no examples where a conventional tactile sensor was used to detect some tactile sensing condition while accommodating very significant stretching like that exhibited by the elbow joint. With a stretchable contact distribution sensor using the conductive knitted fabric developed under the present invention, a tactile distribution sensor can be implemented even at joints where sensor installation is extremely difficult. Such sensor will likely prove very effective in the advancement of robotics and measurement technologies for human kinetics analysis and medical purposes.

Take note that the conductive knitted fabric used here is created by spray-coating conductive paint onto a normal knitted fabric. Accordingly, a PQDc body for tactile sensor conforming to the present invention can be integrated with clothes by preparing tights for the lower body, tights for the upper body in the form of long-sleeved T-shirts, or whole-body tights, all made of knitted fabrics, and then spray-coating conductive paint over quadrangular regions around the elbows, as shown in the example. Needless to say, a PQDc body for tactile sensor can be mounted in various locations across the whole body covered by the whole-body tights, such as shoulders, waist, knees, thighs, shins, upper arms, forearms, and chest. This is because a suit comprising whole-body tights, etc., can be integrated with tactile sensors conforming to the present invention. Because the structure becomes simpler, manufacturing cost can be lowered and smooth, natural surfaces can be achieved.

What is claimed is:

1. A measurement system comprising:
   a sensor for physical quantity distribution (PQD sensor) comprising a body for converting physical quantity distribution (PQDc body) that has a base medium, at least six electrodes connected to the base medium, and wirings that connect the electrodes to an electric signal processing part;
   a processing part comprising the electric signal processing part and a computation processing part; and
   a measurement procedure and an estimation procedure that are executed in the processing part;
   said measurement system being characterized in that:
   the base medium is an electrically continuous conductive body and has an electric impedance distribution relative to direct current or alternating current,
   the PQDc body has a regional shape upon which an external force acts and has a structure wherein the condition of injection current flowing through the base medium changes according to a change in distribution of the external force or deformation by the external force, which is a physical quantity of interest,
   the electric signal processing part has the functions of: generating injection current for the base medium through the electrodes; measuring voltage values of electric potential distributions occurring in the PQDc by using the electrodes; and transmitting/receiving measurement data to/from the computation processing part,
   the measurement procedure issues commands to the electric signal processing unit to generate injection current using at least two of the electrodes, to generate at least six patterns of the injection current, and to measure as electric potential distribution data the voltage values occurring in the PQDc body due to the injection current by using at least four of the electrodes, and also processes all of the electric potential distribution data in the patterns into measurement data, and
   the estimation procedure reads the measurement data and performs an estimation calculation where the measurement data is used to obtain a distribution of the external force or deformation by the external force acting upon the PQDc body, which is the physical quantity of interest.

2. The measurement system according to claim 1, characterized in that the structure of the PQDc body to change the condition of current flowing through the base medium is of a dispersed type based on a structure where sensing elements, which are elements changing at least any one of a resistivity value between terminals, current value between the terminals, or potential at the terminals according to the change of the physical quantity of interest, are arranged inside or on the surface of the base medium that expands regionally, wherein said structure is classified as that of a resistivity distribution type designed to change the resistivity distribution of the PQDc body according to the external force acting upon the PQDc body.

3. The measurement system according to claim 1, characterized in that the structure of the PQDc body to change the condition of current flowing through the base medium is of a contact type having a configuration where the base medium and a conductive material are caused to be regionally contacted to change the resistivity near the contacted area according to the change of the physical quantity of interest, wherein said structure is classified as that of a resistivity distribution type designed to change the resistivity distribution of the PQDc body according to the external force acting upon the PQDc body.

4. The measurement system according to claim 1, characterized in that the structure of the PQDc body to change the condition of current flowing through the base medium is of a continuous type having a configuration where the resistivity distribution of the base medium itself changes according to the change of the physical quantity of interest when the base medium itself directly receives action of the physical quantity of interest, wherein said structure is classified as that of a resistivity distribution type designed to change the resistivity distribution of the PQDc body according to the external force acting upon the PQDc body.

5. The measurement system according to claim 1, characterized in that the structure of the PQDc body to change the condition of current flowing through the base medium is of a connected type having a configuration where terminal-type sensing elements which changes a resistivity value between terminals according to the change of the physical quantity of interest are used and the terminals of these sensing elements are connected directly or using connection bodies constituted by a conductive material in order to constitute a single regional PQDc body, wherein said structure is classified as that of a resistivity distribution type designed to change the resistivity distribution of the PQDc body according to the external force acting upon the PQDc body.

6. The measurement system according to claim 1, characterized in that the structure of the PQDc body to change the condition of current flowing through the base medium is of a current I/O type having a configuration where current is inputted/outputted from a given point inside the region of the base medium and through a conductive medium which is different from the base medium, thereby changing the quantity of the inputting/outputting current according to the change of the physical quantity of interest.

7. The measurement system according to claim 1, characterized in that the PQDc body is structured in a stretchable manner.

8. The measurement system according to claim 7, characterized in that the structure of the PQDc body to change the condition of current flowing through the base medium is of a dispersed type based on a structure where sensing elements, which are elements changing at least any one of a resistivity value between terminals, current value between the terminals, or potential at the terminals according to the change of the physical quantity of interest, are arranged inside or on the surface of the base medium that expands regionally, wherein said structure is classified as that of a resistivity distribution type designed to change the resistivity distribution of the PQDc body according to the external force acting upon the PQDc body.

9. The measurement system according to claim 7, characterized in that the structure of the PQDc body to change the condition of current flowing through the base medium is of a contact type having a configuration where the base medium and a conductive material are caused to be regionally contacted to change the resistivity near the contacted area according to the change of the physical quantity of interest, wherein said structure is classified as that of a resistivity distribution type designed to change the resistivity distribution of the PQDc body according to the external force acting upon the PQDc body.

10. The measurement system according to claim 7, characterized in that the structure of the PQDc body to change the condition of current flowing through the base medium is of a continuous type having a configuration where the resistivity distribution of the base medium itself changes according to the change of the physical quantity of interest when the base medium itself directly receives action of the physical quantity of interest, wherein said structure is classified as that of a resistivity distribution type designed to change the resistivity distribution of the PQDc body according to the external force acting upon the PQDc body.

11. The measurement system according to claim 7, characterized in that the structure of the PQDc body to change the condition of current flowing through the base medium is of a connected type having a configuration where terminal-type sensing elements which changes a resistivity value between terminals according to the change of the physical quantity of interest are used and the terminals of these sensing elements are connected directly or using connection bodies constituted by a conductive material in order to constitute a single regional PQDc body, wherein said structure is classified as that of a resistivity distribution type designed to change the resistivity distribution of the PQDc body according to the external force acting upon the PQDc body.

12. The measurement system according to claim 7, characterized in that the structure of the PQDc body to change the condition of current flowing through the base medium is of a current I/O type having a configuration where current is inputted/outputted from a given point inside the region of the base medium and through a conductive medium which is different from the base medium, thereby changing the quantity of the inputting/outputting current according to the change of the physical quantity of interest.

13. A method for measuring physical quantity distribution used in a measurement system comprising:
  a body for converting physical quantity distribution (PQDc body) that has a regional shape upon which an external force acts, has a base medium being a continuous conductive body with an electric impedance distribution, and has a structure wherein the condition of injection current in the base medium changes according to a change in distribution of the external force or deformation by the external force, which is a physical quantity of interest;
  at least six electrodes connected to the base medium;
  wirings that connect the electrodes to an electric signal processing part;
  a sensor for physical quantity distribution (PQD sensor) having the PQDc body, electrodes and wirings;
  the electric signal processing part that is connected to the wirings, capable of generating injection current for the electrodes, capable of measuring the voltage values of the electrodes, and capable of transmitting/receiving measurement data to/from a computation processing part;
  the computation processing part capable of transmitting/receiving measurement data to/from the electric signal processing part; and
  a processing part comprising the electric signal processing part and computation processing part;
  said method being characterized by a measurement method executed in the processing part comprising:
  a measurement procedure comprising: issuing a command to the electric signal processing unit to generate injection current using at least two of the electrodes; issuing a command to generate at least six patterns of the injection current; issuing a command to measure, as electric potential distribution data, voltage values occurring in the PQDc body due to the injection current by using at least four of the electrodes; and also processing all of the electric potential distribution data in the patterns into measurement data; and
  an estimation procedure comprising: reading the measurement data; and performing an estimation calculation where the measurement data is used to obtain a distribution of the external force or deformation by the external force acting upon the PQDc body, which is the physical quantity of interest.

* * * * *